US008440444B2

(12) United States Patent
Svendsen et al.

(10) Patent No.: US 8,440,444 B2
(45) Date of Patent: May 14, 2013

(54) HYBRID ENZYMES

(75) Inventors: Allan Svendsen, Hoersholm (DK);
Carsten Andersen, Vaerloese (DK);
Tina Spendler, Maaloev (DK); Anders Viksoe Nielsen, Slangerup (DK);
Henrik Oestdal, Virum (DK)

(73) Assignee: Novozymes A/S, Bagsvoerd (DK)

( * ) Notice: Subject to any disclaimer, the term of this patent is extended or adjusted under 35 U.S.C. 154(b) by 0 days.

(21) Appl. No.: 13/289,634

(22) Filed: Nov. 4, 2011

(65) Prior Publication Data
US 2012/0083025 A1    Apr. 5, 2012

Related U.S. Application Data

(63) Continuation of application No. 11/315,801, filed on Dec. 22, 2005, now abandoned.

(60) Provisional application No. 60/717,274, filed on Sep. 14, 2005, provisional application No. 60/639,181, filed on Dec. 22, 2004.

(30) Foreign Application Priority Data

Dec. 22, 2004  (DK) ................ 2004 01976
Sep. 9, 2005   (DK) ................ 2005 01261

(51) Int. Cl.
| C12N 9/26 | (2006.01) |
| C12N 9/28 | (2006.01) |
| C12P 21/06 | (2006.01) |
| C12P 7/06 | (2006.01) |
| C12P 19/14 | (2006.01) |
| C07H 21/04 | (2006.01) |
| A21D 2/00 | (2006.01) |
| C07K 1/00 | (2006.01) |

(52) U.S. Cl.
USPC .......... 435/201; 435/202; 435/69.1; 435/161; 435/99; 536/23.2; 536/23.4; 426/20; 530/350

(58) Field of Classification Search ........... 435/201, 435/202, 69.1, 161, 99; 536/23.2, 23.4; 426/20; 530/350
See application file for complete search history.

(56) References Cited

U.S. PATENT DOCUMENTS

| 4,009,074 A | 2/1977 | Walon |
| 4,316,956 A | 2/1982 | Lutzen |
| 4,474,883 A | 10/1984 | Yamamoto et al. |
| 4,514,496 A | 4/1985 | Yoshizumi et al. |
| 4,591,560 A | 5/1986 | Kainuma et al. |
| 4,727,026 A | 2/1988 | Sawada et al. |
| 6,054,302 A | 4/2000 | Shi et al. |
| 6,143,708 A | 11/2000 | Svendsen et al. |
| 7,306,935 B2 * | 12/2007 | Hoff et al. ............... 435/202 |
| 7,618,795 B2 * | 11/2009 | Vikso-Nielsen et al. ....... 435/41 |
| 2003/0013172 A1 | 1/2003 | Gerendesh |
| 2003/0018607 A1 | 1/2003 | Lennon et al. |
| 2003/0125534 A1 | 7/2003 | Callen et al. |
| 2003/0138786 A1 | 7/2003 | Callen et al. |
| 2003/0170634 A1 | 9/2003 | Callen et al. |
| 2004/0219649 A1 | 11/2004 | Olsen et al. |
| 2004/0234649 A1 | 11/2004 | Lewis et al. |
| 2005/0042737 A1 | 2/2005 | Vikso-Nielsen |
| 2005/0176000 A1 | 8/2005 | Callen et al. |
| 2006/0234280 A1 | 10/2006 | Callen et al. |
| 2006/0294620 A1 | 12/2006 | Gray et al. |
| 2007/0157329 A1 | 7/2007 | Callen et al. |
| 2007/0161099 A1 | 7/2007 | Callen et al. |

FOREIGN PATENT DOCUMENTS

| EP | 0 140 410 B2 | 5/1985 |
| EP | 0 171 218 B1 | 2/1986 |
| RU | 2 085 590 | 5/1995 |
| WO | 98/16633 A1 | 4/1998 |
| WO | 01/88107 A2 | 11/2001 |
| WO | 02/068589 A2 | 9/2002 |
| WO | 03/066816 A2 | 8/2003 |
| WO | 03/066826 A2 | 8/2003 |
| WO | 03/068976 A2 | 8/2003 |
| WO | 2004/091544 A2 | 10/2004 |
| WO | 2004/113551 A1 | 12/2004 |
| WO | 2005/003311 A2 | 1/2005 |
| WO | 2005/045018 A1 | 5/2005 |
| WO | 2005/092015 A2 | 10/2005 |

OTHER PUBLICATIONS

Abe et al., Carbohydrate Research, vol. 175, pp. 85-92 (1988).
Arasaratnam et al., Starch, vol. 50, No. 6, pp. 264-266 (1998).
Chica et al., Current Opinion in Biotechnology, vol. 16, pp. 378-384 (2005).
Del Rio et al., FEBS Letters, vol. 416, pp. 221-224 (1997).
Fujio et al., Biotechnology and Bioengineering, vol. XXVI, No. 4, pp. 315-319 (1984).
Fujio et al., Biotechnology and Bioengineering, vol. XXVI, No. 8, pp. 1270-1273 (1985).
Haska et al., Starch, vol. 43, No. 3, pp. 102-107 (1991).
Haska et al., Starch, vol. 45, No. 7, pp. 241-244 (1993).
Hayashida et al., Agric. Biol. Chem., vol. 39, No. 11, pp. 2093-2099 (1975).
Hayashida et al., Agric. Biol. Chem., vol. 40, No. 1, pp. 141-146 (1976).
Hayashida et al., Agric. Biol. Chem., vol. 42, No. 5, pp. 927-933 (1978).
Hayashida et al., Agric. Biol. Chem., vol. 45, No. 12, pp. 2675-2681 (1981).
Hayashida et al., Agric. Biol. Chem., vol. 46, No. 6, pp. 1639-164 (1982).
Hayashida et al., Agric. Biol. Chem., vol. 46, No. 7, pp. 1947-1950 (1982).
Hayashida et al., Applied and Environmental Microbiology, vol. 54, No. 6, pp. 1516-1522 (1988).
Iefuji et al., Pub Med PMID 8836148, 1-2 (1996).
Itkor et al., Agric. Biol. Chem., vol. 53, No. 1, pp. 53-60 (1989).
Itkor et al., Biochemical and Biophysical Research Communications, vol. 166, No. 2, pp. 630-636 (1990).
Janecek et al., Eur. J. Biochem., vol. 270, pp. 635-645 (2003).

(Continued)

*Primary Examiner* — Ganapathirama Raghu
(74) *Attorney, Agent, or Firm* — Elias Lambiris

(57) ABSTRACT

The present invention relates to hybrid polypeptides having a first amino acid sequence having endo-amylase activity and a second amino acid sequence having carbohydrate binding activity. The present invention also relates to the use of the hybrid polypeptides in starch processing and baking.

40 Claims, No Drawings

OTHER PUBLICATIONS

Jorgensen et al., Biotechnology Letters, vol. 19, No. 10, pp. 1027-1031 (1997).
Labout et al., Starch, vol. 37, pp. 157-161 (1985).
Lin et al., Database Swall, Accession No. Q59222 (1996).
Machovic et al., FEBS Journal, vol. 272, pp. 5497-5513 (2005).
Mikuni et al., Biotechnology and Bioengineering, vol. XXIX, No. 6, pp. 729-732 (1987).
O et al., Kor. J. Appl. Microbiol. Bioeng., vol. 14, No. 5, pp. 415-420 (1986).
Oh et al., Kor. J. Appl. Microbiol. Bioeng., vol. 15, No. 6, pp. 408-413 (1987).
Park et al., Biotechnology and Bioengineering, vol. XXIV, No. 2, pp. 495-500 (1982).
Pranamuda et al., ISHS Acta Horticulturae 389, V International Sago Symposium, Abstract, www.actahort.orgbooks3893 89_15.htm (2004).
Richardson et al., JBC Online—J. Biol. Chem., vol. 277, No. 29, pp. 1-16 (2002).
Robertson et al., Journal of Agricultural and Food Chemistry, vol. 54, pp. 353-365 (2006).
Saha et al., Biotechnology and Bioengineering, vol. XXV, No. 4, pp. 1181-1186 (1983).
Saha et al., J. Ferment. Technol., vol. 61, No. 1, pp. 67-72 (1983).
Seffernick et al., Journal of Bacteriology, vol. 183, No. 8, pp. 2405-2410 (2001).
Shiau et al., Applied and Environmental Microbiology, vol. 69, pp. 2383-2385 (2003).
Singh et al., J. Basic Microbiol., vol. 35, No. 2, pp. 117-121 (1995).
Southall et al., FEBS Letters, vol. 447, pp. 58-60 (1999).
Suresh et al., Bioprocess Engineering, vol. 21, No. 1, pp. 165-168 (1999).
Ueda et al., Die Starke, vol. 26, No. 11, pp. 374-378 (1974).
Ueda et al., Starch, vol. 27, No. 4, pp. 123-128 (1975).
Ueda et al., Biotechnology and Bioengineering, vol. XXIII, No. 2, pp. 291-299 (1981).
Ueda et al., Microbiological Sciences, vol. 1, vo. 1, pp. 21-24 (1984).
Witkowski et al., Biochemistry, vol. 38, pp. 11643-11650 (1999).
Yasmeen et al., Poster Presentation 6-23, National Institute for Biotechnology and Genetic Engineering, 1 (2004).
Abstract of JP 5-8005 (Jan. 12, 1983).
Abstract of JP 7099979, WPI Accession No. 1995-182071/199524 (1995).
Abstract of JP 57018991, WPI Accession No. 1982-1878E/198210 (1982).

* cited by examiner

HYBRID ENZYMES

CROSS-REFERENCE TO RELATED APPLICATIONS

This application is a continuation of U.S. application Ser. No. 11/315,801 filed on Dec. 22, 2005, now abandoned, which claims, under 35 U.S.C. 119, priority of Danish application nos. PA 2004 01976 and PA 2005 01261 filed on Dec. 22, 2004 and Sep 9, 2005, respectively, and the benefit of U.S. provisional application Nos. 60/639,181 and 60/717,274 filed on Dec. 22, 2004 and Sep. 14, 2005, respectively, the contents of which are fully incorporated herein by reference.

SEQUENCE LISTING

This application contains a sequence listing. A computer readable form containing the sequence listing accompanies this application, and the computer readable form of the sequence listing is hereby incorporated by reference.

FIELD OF THE INVENTION

The present invention relates, inter alia, to hybrid enzymes comprising a carbohydrate binding module and having endo-amylase activity. The enzymes may be applied in processes comprising starch modification and/or degradation, or in dough making processes.

BACKGROUND OF THE INVENTION

Bacterial endo-amylases are used in a large number of processes, e.g., for liquefaction of starch in processes where starch is modified, and/or degraded to smaller polymers or monomers of glucose. The degradation products may used in the industry, e.g., as maltose and/or fructose syrups or further processed in a fermentation step to a fermentation product, e.g., ethanol. The bacterial endo-amylases are used in baking to give additional softness and a better moistness of the bread crumb. However, the endo-amylases are easy to overdose which may results in gumminess and an undesirable loss in elasticity in the baked product.

There is a need for endo-amylases with improved properties for use in various processes, e.g., within starch processing and baking.

SUMMARY OF THE INVENTION

The present inventors have now surprisingly discovered that by addition of a carbohydrate binding module (CBM) to an endo-amylase the catalytic activity of the endo-amylase can be modified thereby resulting in an increased baking performance compared to the wild type enzyme. There is no significant change in the taste or smell of the baked product. Without being bound by theory it is suggested that the effect is due to an increased activity towards raw starch in the dough conferred by the CBM, and/or a reduced activity towards the heated starch in the baking bread conferred by the CBM. The endo-amylase with a CBM can be used as a baking enzyme with less risk of overdosing compared to the enzyme without a CBM. Such hybrids consisting of a polypeptide having endo-amylase activity and a carbohydrate binding module, primarily having affinity for starch like, e.g., the CBM20, have the advantage over existing endo-amylases that by selecting a catalytic domain with desire properties, e.g., the pH profile, the temperature profile, the oxidation resistance, the calcium stability, the substrate affinity or the product profile can be combined with a carbohydrate binding module with stronger or weaker binding affinities, e.g., specific affinities for amylose, specific affinities for amylopectin or affinities for specific structure in the carbohydrate. The hybrid may be used as a baking additive, e.g., as an anti-staling enzyme.

The present inventors have further surprisingly discovered that by adding a carbohydrate-binding module (CBM) to an endo-amylase the activity and specificity can be altered thereby increasing the efficacy of various starch degrading processes, e.g., comprising degradation of raw, e.g., ungelatinized starch as well as gelatinized starch. Due to the superior hydrolysis activity of these endo-amylases having a CBM the overall starch conversion process can be performed without having to gelatinize the starch, i.e., the endo-amylases having a CBM hydrolyses granular starch in a raw starch process as well as fully or partially gelatinized starch in a traditional starch process.

Accordingly the invention provides in a first aspect a polypeptide which polypeptide is a hybrid comprising; a first amino acid sequence having endo-amylase activity and a second amino acid sequence comprising a carbohydrate-binding module. Preferably said first amino acid sequence and/or said amino acid second sequence is derived from a bacterium. The second amino acid sequence has preferably at least 60% identity to the amino acid sequence shown as amino acid residues 485 to 586 in SEQ ID NO:2 and/or the first amino acid sequence has at least 60% identity to the amino acid sequence shown in SEQ ID NO:35.

In a second aspect the invention provides a process for preparing a dough or an edible product made from a dough, which process comprises adding the polypeptide of the first aspect to a dough.

In a third and a fourth aspect the invention provides a composition comprising the polypeptide of the first aspect, and a dough- or bread-improving additive in the form of a granulate or agglomerated powder comprising the polypeptide of the first aspect.

In a fifth aspect the invention provides a process for designing a polypeptide suitable for baking, said process comprising; providing a first amino acid sequence having endo-amylase activity, and a second amino acid sequence comprising a carbohydrate-binding module; wherein said first amino acid sequence is derived from a bacterium; providing a second amino acid sequence comprising a carbohydrate-binding module; and constructing a polypeptide comprising said first amino acid sequence with said second amino acid sequence.

In a sixth aspect the invention provides a process for preparing composition, e.g., a bread improving additive, is produced in a process comprising the steps of; a) providing a first amino acid sequence having endo-amylase activity; b) providing a second amino acid sequence comprising a carbohydrate-binding module; c) and constructing a polypeptide comprising said first amino acid sequence and second amino acid sequence; d) providing a DNA sequence encoding said polypeptide; e) expressing said DNA sequence in a suitable host cell and recovering said polypeptide; f) adding said polypeptide to flour or to a granulate or agglomerated powder.

In a seventh aspect the invention provides a process for preparing a dough or an edible product made from a dough, which process comprises; providing a first amino acid sequence having endo-amylase activity; providing a second amino acid sequence comprising a carbohydrate-binding module; and constructing a polypeptide comprising said first amino acid sequence and second amino acid sequence; providing a DNA sequence encoding said polypeptide; expressing said DNA sequence in a suitable host cell and recovering said polypeptide; and adding said polypeptide to a dough.

In a eighth aspect the invention provides a process for saccharifying starch, wherein a starch is treated with the polypeptide according to the first aspect.

In a ninth aspect the invention provides a process comprising; contacting a starch with a polypeptide comprising a first amino acid sequence having endo-amylase activity, and a second amino acid sequence comprising a carbohydrate-binding module; wherein said first amino acid sequence and/or said second amino acid sequence is derived from a bacterium; incubating said starch with said polypeptide for a time and at a temperature sufficient to achieve conversion of at least 90% w/w of said starch substrate into fermentable sugars; fermenting to produce a fermentation product, and optionally recovering the fermentation product, wherein said polypeptide may be a polypeptide according to the first aspect.

In a tenth aspect the invention provides a process comprising; a) contacting a starch substrate with a yeast cell transformed to express a polypeptide comprising a first amino acid sequence having endo-amylase activity, and a second amino acid sequence comprising a carbohydrate-binding module; b) holding said starch substrate with said yeast for a time and at a temperature sufficient to achieve conversion of at least 90% w/w of said starch substrate into fermentable sugars; c) fermenting to produce ethanol; optionally recovering ethanol; wherein steps a, b, and c are performed separately or simultaneously and wherein said polypeptide may be a polypeptide according to the first aspect In an eleventh aspect the invention provides a process of producing ethanol from starch-containing material by fermentation, said process comprises: a) liquefying said starch-containing material with a polypeptide comprising a first amino acid sequence having endo-amylase activity, and a second amino acid sequence comprising a carbohydrate-binding module; wherein said first amino acid sequence and/or second amino acid sequence is derived from a bacterium; b) saccharifying the liquefied mash obtained; c) fermenting the material obtained in step (b) in the presence of a fermenting organism.

In still further aspects the invention provides a DNA sequence encoding a polypeptide according to the first aspect, a DNA construct comprising said DNA sequence, a recombinant expression vector which carries said DNA construct, a host cell which is transformed with said DNA construct or said vector, said host cell being a bacterium or a fungal cell, a plant cell, or a yeast cell.

DETAILED DESCRIPTION OF THE INVENTION

Hybrid Enzymes

The polypeptide of the invention may be a hybrid enzyme comprises a first amino acid sequence having endo-amylase activity, and a second amino acid sequence comprising a carbohydrate-binding module (CBM). The hybrid may be produced by fusion of a first DNA sequences encoding a first amino acid sequences and a second DNA sequences encoding a second amino acid sequences, or the hybrid may be produced as a completely synthetic gene based on knowledge of the amino acid sequences of suitable CBMs, linkers and catalytic domains.

The terms "hybrid enzyme" (also referred to as "fusion protein", "hybrid", hybrid polypeptide" or "hybrid protein) is used herein to characterize the polypeptides of the invention comprising a first amino acid sequence comprising at least one catalytic module having endo-amylase activity and a second amino acid sequence comprising at least one carbohydrate-binding module wherein the first and the second are derived from different sources. The term "source" being understood as e.g., but not limited to, a parent enzyme, or a variant thereof, e.g., an amylase or glucoamylase, or other catalytic activity comprising a suitable catalytic module and/or a suitable CBM and/or a suitable linker. However the CBM may also be derived from a polypeptide having no catalytic activity. The first and the second amino acid sequence may be derived from the same bacterial strain, from strains within the same species, from closely related species or less related organisms. Preferably the first and the second amino acid sequence of the hybrids derived from different sources, e.g., from different enzymes from the same strain and/or species, or e.g., from strains within different species.

Enzyme classification numbers (EC numbers) referred to in the present specification are in accordance with the *Recommendations of the Nomenclature Committee of the International Union of Biochemistry and Molecular Biology* (www.chem.qmw.ac.uk/iubmb/enzyme/).

Hybrid enzymes as referred to herein include species comprising an amino acid sequence of an endo-amylase, i.e., an alpha-amylase (EC 3.2.1.1) which is linked (i.e., covalently bound) to an amino acid sequence comprising a carbohydrate-binding module (CBM). The hybrid enzyme is thus an enzyme capable of catalyzing hydrolysis of starch in an endo-fashion.

CBM-containing hybrid enzymes, as well as detailed descriptions of the preparation and purification thereof, are known in the art [see, e.g., WO 90/00609, WO 94/24158 and WO 95/16782, as well as Greenwood et al., 1994, *Biotechnology and Bioengineering* 44: 1295-1305]. They may, e.g., be prepared by transforming into a host cell a DNA construct comprising at least a fragment of DNA encoding the carbohydrate-binding module ligated, with or without a linker, to a DNA sequence encoding the enzyme of interest, and growing the transformed host cell to express the fused gene. The linker may be a bond (i.e., comprising 0 residues), or a short linking group comprising from about 2 to about 100 carbon atoms, in particular of from 2 to 40 carbon atoms. However, the linker is preferably a sequence of 0 amino acid residues (e.g., just a bond) or it is from about 2 to about 100 amino acid residues, more preferably of from 2 to 40 amino acid residues, such as from 2 to 15 amino acid residues. Preferably the linker is not sensitive to or at least has low sensitivity towards hydrolysis by a protease, which e.g., may be present during production of the hybrid and/or during the industrial application of the hybrid. The CBM in a hybrid enzyme of the type in question may be positioned C-terminally, N-terminally or internally in the hybrid enzyme. In an embodiment a polypeptide may comprise more than one CBM, e.g., two CBMs; one positioned C-terminally, the other N-terminally or the two CBMs in tandem positioned C-terminally, N-terminally or internally. However, polypeptides with more than two CBMs are equally contemplated.

Polypeptide Identity

The term polypeptide "identity" is understood as the degree of identity between two sequences indicating a derivation of the first sequence from the second. The identity may suitably be determined by means of computer programs known in the art such as GAP provided in the GCG program package (Program Manual for the Wisconsin Package, Version 8, August 1994, Genetics Computer Group, 575 Science Drive, Madison, Wis., USA 53711) (Needleman and Wunsch, 1970, *Journal of Molecular Biology* 48: 443-453. The following settings for amino acid sequence comparison are used: GAP creation penalty of 3.0 and GAP extension penalty of 0.1. The relevant part of the amino acid sequence for the identity determination is the mature polypeptide, i.e., without the signal peptide.

Carbohydrate-Binding Modules

A carbohydrate-binding module (CBM), or as often referred to, a carbohydrate-binding domain (CBD), is a polypeptide amino acid sequence which binds preferentially to a poly- or oligosaccharide (carbohydrate), frequently—but not necessarily exclusively—to a water-insoluble (including crystalline) form thereof.

CBMs derived from starch degrading enzymes are often referred to as starch-binding modules or SBMs (CBMs which may occur in certain amylolytic enzymes, such as certain glucoamylases, or in enzymes such as cyclodextrin glucanotransferases, or in endo-amylases). SBMs are often referred to as SBDs (Starch Binding Domains). Prefered for the invention are CBMs which are Starch Binding Modules.

CBMs are found as integral parts of large polypeptides or proteins consisting of two or more polypeptide amino acid sequence regions, especially in hydrolytic enzymes (hydrolases) which typically comprise a catalytic module containing the active site for substrate hydrolysis and a carbohydrate-binding module (CBM) for binding to the carbohydrate substrate in question. Such enzymes can comprise more than one catalytic module and one, two or three CBMs, and optionally further comprise one or more polypeptide amino acid sequence regions linking the CBM(s) with the catalytic module(s), a region of the latter type usually being denoted a "linker". CBMs have also been found in algae, e.g., in the red alga *Porphyra purpurea* in the form of a non-hydrolytic polysaccharide-binding protein.

In proteins/polypeptides in which CBMs occur (e.g., enzymes, typically hydrolytic enzymes), a CBM may be located at the N or C terminus or at an internal position.

That part of a polypeptide or protein (e.g., hydrolytic enzyme) which constitutes a CBM per se typically consists of more than about 30 and less than about 250 amino acid residues.

The "Carbohydrate-Binding Module of Family 20" or a CBM-20 module is in the context of this invention defined as a sequence of approximately 100 amino acids having at least 45% identity to the Carbohydrate-Binding Module (CBM) of the polypeptide disclosed in FIG. 1 by Joergensen et al., 1997, *Biotechnol. Lett.* 19:1027-1031. The CBM comprises the last 102 amino acids of the polypeptide, i.e., the subsequence from amino acid 582 to amino acid 683. The numbering of Glycoside Hydrolase Families applied in this disclosure follows the concept of Coutinho, P. M. & Henrissat, B. (1999) CAZy—Carbohydrate-Active Enzymes server at URL: afmb.cnrs-mrs.fr/~cazy/CAZY/index.html or alternatively Coutinho, P. M. & Henrissat, B. 1999; The modular structure of cellulases and other carbohydrate-active enzymes: an integrated database approach. In "*Genetics, Biochemistry and Ecology of Cellulose Degradation*", K. Ohmiya, K. Hayashi, K. Sakka, Y. Kobayashi, S. Karita and T. Kimura eds., Uni Publishers Co., Tokyo, pp. 15-23, and Bourne, Y. & Henrissat, B. 2001; Glycoside hydrolases and glycosyltransferases: families and functional modules, *Current Opinion in Structural Biology* 11:593-600.

Examples of enzymes which comprise a CBM suitable for use in the context of the invention are endo-amylases (i.e., alpha-amylases in EC 3.2.1.1), maltogenic alpha-amylases (EC 3.2.1.133), glucoamylases (EC 3.2.1.3) or from CGTases (EC 2.4.1.19).

Preferred for the invention is CBMs of Carbohydrate-Binding Module Family 20. CBMs of Carbohydrate-Binding Module Family 20 suitable for the invention may be derived from beta-amylases of *Bacillus cereus* (SWISSPROT P36924), or from CGTases of *Bacillus circulans* (SWISSPROT P43379). Also preferred for the invention is any CBM having at least 60%, at least 70%, at least 80% or even at least 90% identity to any of the afore mentioned CBM amino acid sequences. Further suitable CBMs of Carbohydrate-Binding Module Family 20 may be found at URL: afmb.cnrs-mrs.fr/~cazy/CAZY/index.html).

Once a nucleotide sequence encoding the substrate-binding (carbohydrate-binding) region has been identified, either as cDNA or chromosomal DNA, it may then be manipulated in a variety of ways to fuse it to a DNA sequence encoding the enzyme of interest. The DNA fragment encoding the carbohydrate-binding amino acid sequence and the DNA encoding the enzyme of interest are then ligated with or without a linker. The resulting ligated DNA may then be manipulated in a variety of ways to achieve expression.

CBMs deriving from bacteria will generally be suitable for use in the context of the invention, however, preferred are CBMs of bacillus origin, such as a CBM20 from *Bacillus flavothermus* (Syn. *Anoxybacillus contaminans*), preferably from amylase AMY1048 (SEQ ID NO:2 herein), AMY1039, or AMY1079 (disclosed as respectively SEQ ID NOS: 1, 2 and 3 in PCT/US2004/023031 [NZ10474]), the *Bacillus* amylases disclosed in WO 2002/068589 from Diversa, *Bacillus* sp. TS23 (Korea) (Lin, L.-L.; Submitted (1 Mar. 1995) to the EMBL/GenBank/DDBJ databases. Long-Liu Lin, Food Industry Research Institute, Culture Collection and Research Center, 331 Food Road, Hsinchu, Taiwan 300, Republic of China).

In a particular embodiment the CBM sequence has the amino acid sequence shown as amino acid residues 485 to 586 in SEQ ID NO:2 or the CBM sequence has an amino acid sequence having at least 60%, at least 70%, at least 80% or even at least 90% identity to the afore mentioned amino acid sequence.

In another preferred embodiment the CBM sequence has an amino acid sequence which differs from the amino acid sequence shown as amino acid residues 485 to 586 in SEQ ID NO:2 in no more than 10 positions, no more than 9 positions, no more than 8 positions, no more than 7 positions, no more than 6 positions, no more than 5 positions, no more than 4 positions, no more than 3 positions, no more than 2 positions, or even no more than 1 position.

Endo-Amylase Sequence

Endo-amylases which are appropriate as the basis for CBM/amylase hybrids of the types employed in the context of the present invention include those of bacterial origin and having endo-amylase activity. The endo-activity of the amylase may be determined according to the assay in the "Materials and methods" section of the present application. Preferred are endo-amylase derived from *Bacillus* sp., particularly from *B. licheniformis, B. amyloliquefaciens, B. stearothermophilus* or *B. flavothermus*. The endo-amylase is preferably an endo-amylase having at least 60%, at least 70%, at least 80% or even at least 90% identity to the amylase from *Bacillus licheniformis* (BLA, SEQ ID NO:8 in WO 2002/010355) shown in SEQ ID NO:35 herein. This includes but are not limited to the amylase from *B. licheniformis* variant LE429 (WO 2002/010355) shown in SEQ ID NO:41 herein, the amylase from *B. stearothermophilus* (BSG, SEQ ID NO:6 in WO 2002/010355) shown in SEQ ID NO:36 herein, the amylase from *B. amyloliquefaciens* (BAN, SEQ ID NO:10 in WO 2002/010355) shown in SEQ ID NO:37 herein, the amylase from *B. halodurance* SP722 (SEQ ID NO:4 in WO 2002/010355) shown in SEQ ID NO:38 herein, SP690 (WO 95/26397) shown in SEQ ID NO:39 herein, the amylase from AA560 (SEQ ID NO:12 in WO 2002/010355) shown in SEQ ID NO:40 herein, the amylase from alkaline *Bacillus* strains like e.g., SP707 (Tsukamoto et al., 1988, *Biochemical and Biophysical Research Communications* 151: 25-31), the amylase KSM-AP1378 (WO 97/00324, KAO), the amylases KSM-K36 and KSM-K38 (EP 1,022,334-A/KAO), the amylase SP7-7 (WO 02/10356, Henkel), and the amylase AAI-6 (WO 00/60058), AMRK385 (PCT/DK01/00133)—fragments, variants or truncated forms of above. The endo-amylase sequence may also be derived from *Pseudomonas saccharophilia*, such as from the amylase disclosed as SEQ ID NO:1 in WO 2004/111217. Preferably endo-amylase sequence comprises the amino acid residues 1 to 417 shown in SEQ ID NO:42 herein.

Preferably the endo-amylase is a wild type enzyme or the endo-amylase is a variant endo-amylases comprising amino acid modifications leading to increased activity and/or increased protein stability at low pH, and/or at high pH, increased stability towards calcium depletion, and/or increased stability at elevated temperature. Chemically or genetically modified mutants of such endo-amylases are included in this connection.

The *B. licheniformis* endo-amylase BLA shown in SEQ ID NO:35 is a wild type amylase made up of a catalytic fragment of 483 amino acid. The catalytic domain can be divided into the central core-domain harboring the catalytic center and a C domain c-terminal to the catalytic domain. In Seq. ID 8/NN10062 the catalytic core domain consist of the first 396 amino acids and the C domain is defined as the amino acids from 397 to 483.

The variant of the *B. licheniformis* endo-amylase, LE429 shown in SEQ ID NO:41 consist of a catalytic fragment of 481 amino acid. The catalytic domain can be divided into the central core-domain harboring the catalytic center and a C domain c-terminal to the catalytic domain. In SEQ ID NO:41 the catalytic core domain consist of the first 394 amino acids and the C domain is defined as the amino acids from 395 to 481.

The *B. amyloliquefaciens* endo-amylase, BAN shown in SEQ ID NO:37 is a wild type amylase made up of a catalytic fragment of 483 amino acid. The catalytic domain can be divided into the central core-domain harboring the catalytic center and a C domain c-terminal to the catalytic domain. In SEQ ID NO:37 the catalytic core domain consists of the first 396 amino acids and the C domain is defined as the amino acids from 397 to 483.

The *B. stearothermophilus* endo-amylase, BSG shown in SEQ ID NO:36 is a wild type amylase made up of a catalytic fragment of 483 amino acid and in addition a c-terminal extension. The catalytic domain can further be divided into the central core-domain harboring the catalytic center and a C domain c-terminal to the catalytic domain. In SEQ ID NO:36 the catalytic core domain consist of the first 396 aa, the C domain is defined as the amino acids from 397 to 483 and the c-terminal extension is defines as amino acids 484 to 515.

The *B. halodurance* endo-amylase SP722 shown in SEQ ID NO:38 is a wild type amylase made up of a catalytic fragment of 485 amino acid. The core domain can further be divided into the central AB-domain harboring the catalytic center and a C domain c-terminal to the catalytic domain. In SEQ ID NO:38 the catalytic core domain consist of the first 398 amino acids and the C domain is defined as the amino acids from 399 to 485.

The alkaline *Bacillus* endo-amylase, AA560 shown in SEQ ID NO:40 herein is a wild type amylase made up of a catalytic fragment of 485 amino acid. The core domain can further be divided into the central AB-domain harboring the catalytic center and a C domain C-terminal to the catalytic domain. The catalytic core domain consists of the first 398 amino acids and the C domain is defined as the amino acids from 399 to 485. The catalytic core domain is encoded by nucleotide 1-1194 and the C domain is encoded by the nucleotides 1189-1455.

In a particular embodiment of the first aspect the endo-amylase sequence has the amino acid sequence shown in SEQ ID NO:35, SEQ ID NO:36, SEQ ID NO:37, SEQ ID NO:38, SEQ ID NO:39, SEQ ID NO:40, SEQ ID NO:41, SEQ ID NO:42 or the endo-amylase sequence has an amino acid sequence having at least 60%, 65%, 70%, 75%, 80%, 85%, 90%, 95%, 97% or even at least 99% identity to any of the afore mentioned amino acid sequences.

In yet another preferred embodiment of the first aspect the endo-amylase sequence has an amino acid sequence which differs from any of the amino acid sequence amino acid sequences shown in SEQ ID NO:35, SEQ ID NO:36, SEQ ID NO:37, SEQ ID NO:38, SEQ ID NO:39, SEQ ID NO:40, SEQ ID NO:41, SEQ ID NO:42 in no more than 10 positions, no more than 9 positions, no more than 8 positions, no more than 7 positions, no more than 6 positions, no more than 5 positions, no more than 4 positions, no more than 3 positions, no more than 2 positions, or even no more than 1 position.

In a preferred embodiment of the first aspect the endo-amylase sequence has an amino acid sequence as shown in SEQ ID NO:40 (AA560), and comprising one or more of the following alterations R118K, D183*, G184*, N195F, R320K and R458K.

In another particularly preferred embodiment of the first aspect the endo-amylase sequence has an amino acid sequence as shown in SEQ ID NO:40, and comprising one or more, e.g., such as all, of the following alterations R118K, D183*, G184*, N195F, R320K, R458K, N33S, D36N, K37L, E391I, Q394R, K395D, T452Y and N484P.

In another particularly preferred embodiment of the first aspect the endo-amylase sequence has an amino acid sequence as shown in SEQ ID NO:40, and comprising one or more, e.g., such as all, of the following alterations R118K, D183*, G184*, N195F, R320K, R458K and N484P.

In yet another highly preferred embodiment of the first aspect the endo-amylase sequence has an amino acid sequence as shown in SEQ ID NO:37 and comprises one or more, e.g such as all of the following alterations: S31A, D32N, I33L, E178*, G179*, N190F, K389I, K392R, E393D, V508A Preferred Hybrids In a particular embodiment the hybrid of the invention has an amino acid sequence shown in SEQ ID NO:4, SEQ ID NO:6, SEQ ID NO:8, SEQ ID NO:10, SEQ ID NO:12, SEQ ID NO:14 or the hybrid of the invention has an amino acid sequence having at least 60%, at least 70%, at least 80% or even at least 90% identity to any of the aforementioned amino acid sequences.

In yet another preferred embodiment the hybrid of the invention has an amino acid sequence which differs from the amino acid sequence shown in SEQ ID NO:4, SEQ ID NO:6, SEQ ID NO:8, SEQ ID NO:10, SEQ ID NO:12, SEQ ID NO:14 in no more than 10 positions, no more than 9 positions, no more than 8 positions, no more than 7 positions, no more than 6 positions, no more than 5 positions, no more than 4 positions, no more than 3 positions, no more than 2 positions, or even no more than 1 position.

In a preferred embodiment the polypeptide of the invention comprises a) the catalytic domain shown in SEQ ID NO:40 or a homologous catalytic domain, and b) the CBM shown as residue 485 to 585 of SEQ ID NO:2, wherein one or more, or preferably all, of the following substitutions have been introduced: R118K, D183*, G184*, N195F, R320K, R458K, N33S, D36N, K37L, E391I, Q394R, K395D, T452Y and N484P, using the numbering of SEQ ID NO: 40.

In another preferred embodiment the polypeptide of the invention comprises the catalytic domain shown in SEQ ID NO:40 or a homologous catalytic domain, and b) the CBM shown as residue 485 to 585 of SEQ ID NO:2, wherein one or more, or preferably all, of the following substitutions have been introduced: R118K, D183*, G184*, N195F, R320K, R458K and N484P, using the numbering of SEQ ID NO: 40.

In yet another preferred embodiment the polypeptide of the invention comprises the catalytic domain shown in SEQ.ID: 37 and comprise one or more, e.g., such as all of the following alterations: S31A, D32N, I33L, E178*, G179*, N190F, K389I, K392R, E393D, V508A and a CBM having the amino acid sequence shown as amino acid residues 485 to 586 in SEQ ID NO:2.

Stabilization of Hybrids

A hybrid of the invention may be volatile to proteolytic attack if the CBM and catalytic domain proteins do not form sufficiently tight protein-protein interactions. However, the stability of the hybrid can be improved by introducing substitutions on the surface of either of the proteins to create a stable hybrid.

The present inventors have identified the following amino acid residues on the surface of bacterial endo-amylases, e.g., such polypeptides having at least 60% identity to the amylase from *Bacillus licheniformis* (SEQ ID NO:8), to be in close contact with the CBM when comprised in the hybrid of the invention, i.e., within less than 5.0 Å distance. These residues are suitable targets for mutations in order to make a stable hybrid: 12, 29, 30, 32, 33, 34, 35, 36, 37, 38, 368, 371, 372, 381, 383, 384, 386, 387, 388, 389, 390, 391, 392, 394, 395, 396, 422, 423, 448, 449, 450, 451, 452, 453, 454, 455, 456, 458, 459, 460, 461, 483, 484, 485 using the numbering of SEQ ID NO: 40. Preferably the catalytic domain of the hybrid of the invention comprises one or more substitutions in positions corresponding to these residues.

In a preferred embodiment the hybrid of the invention comprises a) the catalytic domain shown in SE ID NO:40 or a homologous catalytic domain, and b) the CBM shown as residue 485 to 585 of SEQ ID NO:2, wherein one or more, or preferably all, of the following substitutions have been introduced: N33S, K35S/A, D36A/N/S, K37L, E391I, Q394R, K395D, N484A/P using the numbering of SEQ ID NO: 40.

On the surface of the CBM protruding towards the catalytic domain of the hybrid the following residues are found in close contact with the catalytic domain, i.e., within 5.0 Å distance, and these residues are suitable targets for mutations in order to make a stable hybrid: 485, 486, 487, 488, 507, 512, 513, 514, 515, 516, 517, 518, 519, 520, 521, 522, 523, 524, 526, 538, 539, 540, 541, 553, 554, 555, 556, 557, 558, 559 using the numbering of SEQ ID NO: 2.

Expression Vectors

The present invention also relates to recombinant expression vectors which may comprise a DNA sequence encoding the hybrid enzyme, a promoter, a signal peptide sequence, and transcriptional and translational stop signals. The various DNA and control sequences described above may be joined together to produce a recombinant expression vector which may include one or more convenient restriction sites to allow for insertion or substitution of the DNA sequence encoding the polypeptide at such sites. Alternatively, the DNA sequence of the present invention may be expressed by inserting the DNA sequence or a DNA construct comprising the sequence into an appropriate vector for expression. In creating the expression vector, the coding sequence is located in the vector so that the coding sequence is operably linked with the appropriate control sequences for expression, and possibly secretion.

The recombinant expression vector may be any vector (e.g., a plasmid or virus), which can be conveniently subjected to recombinant DNA procedures and can bring about the expression of the DNA sequence. The choice of the vector will typically depend on the compatibility of the vector with the host cell into which the vector is to be introduced. The vectors may be linear or closed circular plasmids. The vector may be an autonomously replicating vector, i.e., a vector which exists as an extrachromosomal entity, the replication of which is independent of chromosomal replication, e.g., a plasmid, an extrachromosomal element, a minichromosome, a cosmid or an artificial chromosome. The vector may contain any means for assuring self-replication. Alternatively, the vector may be one which, when introduced into the host cell, is integrated into the genome and replicated together with the chromosome(s) into which it has been integrated. The vector system may be a single vector or plasmid or two or more vectors or plasmids which together contain the total DNA to be introduced into the genome of the host cell, or a transposon.

Host Cells

The host cell of the invention, either comprising a DNA construct or an expression vector comprising the DNA sequence encoding the polypeptide of the first aspect, e.g., a hybrid enzyme, is advantageously used as a host cell in the recombinant production of the hybrid enzyme, wild type enzyme or a genetically modified wild type enzyme. The cell may be transformed with an expression vector. Alternatively, the cell may be transformed with the DNA construct of the invention encoding the hybrid enzyme or a genetically modified wild type enzyme, conveniently by integrating the DNA construct (in one or more copies) in the host chromosome. Integration of the DNA construct into the host chromosome may be performed according to conventional methods, e.g., by homologous or heterologous recombination.

The host cell may be any appropriate prokaryotic or eukaryotic cell, e.g., a bacterial cell, a filamentous fungus cell, a yeast cell, a plant cell or a mammalian cell.

Isolating and Cloning a DNA Sequence Encoding a Parent Endo-Amylase

The techniques used to isolate or clone a DNA sequence encoding the polypeptide of the first aspect, e.g., a hybrid enzyme, are known in the art and include isolation from genomic DNA, preparation from cDNA, or a combination thereof. The cloning of the DNA sequences of the present invention from such genomic DNA can be effected, e.g., by using the well known polymerase chain reaction (PCR) or antibody screening of expression libraries to detect cloned DNA fragments with shared structural features. See, e.g., Innis et al., 1990, *PCR: A Guide to Methods and Application*, Academic Press, New York. Other DNA amplification procedures such as ligase chain reaction (LCR), ligated activated transcription (LAT) and DNA sequence-based amplification (NASBA) may be used.

The DNA sequence encoding a parent endo-amylase may be isolated from any cell or microorganism producing the endo-amylase in question, using various methods well known in the art. First, a genomic DNA and/or cDNA library should be constructed using chromosomal DNA or messenger RNA from the organism that produces the endo-amylase to be studied. Then, if the amino acid sequence of the endo-amylase is known, labeled oligonucleotide probes may be synthesized and used to identify endo-amylase-encoding clones from a genomic library prepared from the organism in question. Alternatively, a labelled oligonucleotide probe containing sequences homologous to another known endo-amylase gene could be used as a probe to identify endo-amylase-encoding clones, using hybridization and washing conditions of very low to very high stringency.

Yet another method for identifying endo-amylase-encoding clones would involve inserting fragments of genomic DNA into an expression vector, such as a plasmid, transforming endo-amylase-negative bacteria with the resulting genomic DNA library, and then plating the transformed bacteria onto agar containing a substrate for endo-amylase (i.e., maltose), thereby allowing clones expressing the endo-amylase to be identified.

Alternatively, the DNA sequence encoding the enzyme may be prepared synthetically by established standard methods, e.g., the phosphoroamidite method described Beaucage and Caruthers, 1981, *Tetrahedron Letters* 22: 1859-1869, or the method described by Matthes et al., 1984, *EMBO J.* 3: 801-805. In the phosphoroamidite method, oligonucleotides are synthesized, e.g., in an automatic DNA synthesizer, purified, annealed, ligated and cloned in appropriate vectors.

Finally, the DNA sequence may be of mixed genomic and synthetic origin, mixed synthetic and cDNA origin or mixed genomic and cDNA origin, prepared by ligating fragments of synthetic, genomic or cDNA origin (as appropriate, the fragments corresponding to various parts of the entire DNA sequence), in accordance with standard techniques. The DNA sequence may also be prepared by polymerase chain reaction (PCR) using specific primers, for instance as described in U.S. Pat. No. 4,683,202 or Saiki et al., 1988, *Science* 239: 487-491.

Isolated DNA Sequence

The present invention relates, inter alia, to an isolated DNA sequence comprising a DNA sequence encoding a polypeptide of the first aspect, e.g., a hybrid enzyme.

The term "isolated DNA sequence" as used herein refers to a DNA sequence, which is essentially free of other DNA sequences, e.g., at least about 20% pure, preferably at least about 40% pure, more preferably at least about 60% pure, even more preferably at least about 80% pure, and most preferably at least about 90% pure as determined by agarose electrophoresis.

For example, an isolated DNA sequence can be obtained by standard cloning procedures used in genetic engineering to relocate the DNA sequence from its natural location to a different site where it will be reproduced. The cloning procedures may involve excision and isolation of a desired DNA fragment comprising the DNA sequence encoding the polypeptide of interest, insertion of the fragment into a vector molecule, and incorporation of the recombinant vector into a host cell where multiple copies or clones of the DNA sequence will be replicated. An isolated DNA sequence may be manipulated in a variety of ways to provide for expression of the polypeptide of interest. Manipulation of the DNA sequence prior to its insertion into a vector may be desirable or necessary depending on the expression vector. The techniques for modifying DNA sequences utilizing recombinant DNA methods are well known in the art.

DNA Construct

The present invention relates, inter alia, to a DNA construct comprising a DNA sequence encoding a polypeptide of the first aspect. "DNA construct" is defined herein as a DNA molecule, either single- or double-stranded, which is isolated from a naturally occurring gene or which has been modified to contain segments of DNA, which are combined and juxtaposed in a manner, which would not otherwise exist in nature. The term DNA construct is synonymous with the term expression cassette when the DNA construct contains all the control sequences required for expression of a coding sequence of the present invention.

Site-Directed Mutagenesis

Once a parent endo-amylase-encoding DNA sequence suitable for use in a polypeptide of the first aspect has been isolated, and desirable sites for mutation identified, mutations may be introduced using synthetic oligonucleotides. These oligonucleotides contain nucleotide sequences flanking the desired mutation sites. In a specific method, a single-stranded gap of DNA, the endo-amylase-encoding sequence, is created in a vector carrying the endo-amylase gene. Then the synthetic nucleotide, bearing the desired mutation, is annealed to a homologous portion of the single-stranded DNA. The remaining gap is then filled in with DNA polymerase I (Klenow fragment) and the construct is ligated using T4 ligase. A specific example of this method is described in Morinaga et al., 1984, *Biotechnology* 2: 646-639. U.S. Pat. No. 4,760,025 discloses the introduction of oligonucleotides encoding multiple mutations by performing minor alterations of the cassette. However, an even greater variety of mutations can be introduced at any one time by the Morinaga method, because a multitude of oligonucleotides, of various lengths, can be introduced.

Another method for introducing mutations into endo-amylase-encoding DNA sequences is described in Nelson and Long, 1989, *Analytical Biochemistry* 180: 147-151. It involves the 3-step generation of a PCR fragment containing the desired mutation introduced by using a chemically synthesized DNA strand as one of the primers in the PCR reactions. From the PCR-generated fragment, a DNA fragment carrying the mutation may be isolated by cleavage with restriction endonucleases and reinserted into an expression plasmid.

Localized Random Mutagenesis

The random mutagenesis may be advantageously localized to a part of the parent endo-amylase in question. This may, e.g., be advantageous when certain regions of the enzyme have been identified to be of particular importance for a given property of the enzyme, and when modified are expected to result in a variant having improved properties. Such regions may normally be identified when the tertiary structure of the parent enzyme has been elucidated and related to the function of the enzyme.

The localized or region-specific, random mutagenesis is conveniently performed by use of PCR generated mutagenesis techniques as described above or any other suitable technique known in the art. Alternatively, the DNA sequence encoding the part of the DNA sequence to be modified may be isolated, e.g., by insertion into a suitable vector, and said part may be subsequently subjected to mutagenesis by use of any of the mutagenesis methods discussed above.

Expression of the Enzymes in Plants

A DNA sequence encoding an enzyme of interest, such as a hybrid enzyme of the present invention, may be transformed and expressed in transgenic plants as described below.

The transgenic plant can be dicotyledonous or monocotyledonous, for short a dicot or a monocot. Examples of monocot plants are grasses, such as meadow grass (blue grass, *Poa*), forage grass such as *Festuca, Lolium*, temperate grass, such as *Agrostis*, and cereals, e.g., wheat, oats, rye, barley, rice, sorghum and maize (corn).

Examples of dicot plants are tobacco, legumes, such as lupins, potato, sugar beet, pea, bean and soybean, and cruciferous plants (family Brassicaceae), such as cauliflower, oil seed rape and the closely related model organism *Arabidopsis thaliana*.

Examples of plant parts are stem, callus, leaves, root, fruits, seeds, and tubers as well as the individual tissues comprising these parts, e.g., epidermis, mesophyll, parenchyme, vascular tissues, meristems. In the present context, also specific plant cell compartments, such as chloroplast, apoplast, mitochondria, vacuole, peroxisomes and cytoplasm are considered to be a plant part. Furthermore, any plant cell, whatever the tissue origin, is considered to be a plant part. Likewise, plant parts such as specific tissues and cells isolated to facilitate the utilisation of the invention are also considered plant parts e.g., embryos, endosperms, aleurone and seeds coats.

Also included within the scope of the invention are the progeny of such plants, plant parts and plant cells.

The transgenic plant or plant cell expressing the enzyme of interest may be constructed in accordance with methods known in the art. In short the plant or plant cell is constructed by incorporating one or more expression constructs encoding the enzyme of interest into the plant host genome and propagating the resulting modified plant or plant cell into a transgenic plant or plant cell.

Conveniently, the expression construct is a DNA construct which comprises a gene encoding the enzyme of interest in operable association with appropriate regulatory sequences required for expression of the gene in the plant or plant part of choice. Furthermore, the expression construct may comprise a selectable marker useful for identifying host cells into which the expression construct has been integrated and DNA sequences necessary for introduction of the construct into the plant in question (the latter depends on the DNA introduction method to be used).

The choice of regulatory sequences, such as promoter and terminator sequences and optionally signal or transit sequences is determined, e.g., on the basis of when, where and how the enzyme is desired to be expressed. For instance, the expression of the gene encoding the enzyme of the invention may be constitutive or inducible, or may be developmental, stage or tissue specific, and the gene product may be targeted to a specific cell compartment, tissue or plant part such as seeds or leaves. Regulatory sequences are, e.g., described by Tague et al., 1988, *Plant Phys.* 86: 506.

For constitutive expression the 35S-CaMV, the maize ubiquitin 1 and the rice actin 1 promoter may be used (Franck et al., 1980, *Cell* 21: 285-294, Christensen, Sharrock and Quail, 1992 Maize polyubiquitin genes: structure, thermal perturbation of expression and transcript splicing, and promoter activity following transfer to protoplasts by electroporation. *Plant Mol. Biol.* 18: 675-689; Zhang, McElroy and Wu, 1991, Analysis of rice Act1 5' region activity in transgenic rice plants. *Plant Cell* 3: 1155-1165). Organ-specific promoters may, e.g., be a promoter from storage sink tissues such as seeds, potato tubers, and fruits (Edwards & Coruzzi, 1990, *Annu. Rev. Genet.* 24: 275-303), or from metabolic sink tissues such as meristems (Ito et al., 1994, *Plant Mol. Biol.* 24: 863-878), a seed specific promoter such as the glutelin, prolamin, globulin or albumin promoter from rice (Wu et al., 1998, *Plant and Cell Physiology* 39(8): 885-889), a *Vicia faba* promoter from the legumin B4 and the unknown seed protein gene from *Vicia faba* described by Conrad et al, 1998, *Journal of Plant Physiology* 152(6): 708-711, a promoter from a seed oil body protein (Chen et al., 1998, *Plant and Cell Physiology* 39(9): 935-941, the storage protein napA promoter from *Brassica napus*, or any other seed specific promoter known in the art, e.g., as described in WO 91/14772. Furthermore, the promoter may be a leaf specific promoter such as the rbcs promoter from rice or tomato (Kyozuka et al., 1993, *Plant Physiology* 102(3): 991-1000, the chlorella virus adenine methyltransferase gene promoter (Mitra and Higgins, 1994, *Plant Molecular Biology* 26(1): 85-93, or the aldP gene promoter from rice (Kagaya et al., 1995, *Molecular and General Genetics* 248(6): 668-674, or a wound inducible promoter such as the potato pin2 promoter (Xu et al, 1993, *Plant Molecular Biology* 22(4): 573-588. Likewise, the promoter may inducible by abiotic treatments such as temperature, drought or alterations in salinity or induced by exogenously applied substances that activate the promoter e.g., ethanol, oestrogens, plant hormones like ethylene, abscisic acid and gibberellic acid and heavy metals.

A promoter enhancer element may be used to achieve higher expression of the enzyme in the plant. For instance, the promoter enhancer element may be an intron which is placed between the promoter and the nucleotide sequence encoding the enzyme. For instance, Xu et al. op cit disclose the use of the first intron of the rice actin 1 gene to enhance expression.

The selectable marker gene and any other parts of the expression construct may be chosen from those available in the art.

The DNA construct is incorporated into the plant genome according to conventional techniques known in the art, including *Agrobacterium*-mediated transformation, virus-mediated transformation, micro injection, particle bombardment, biolistic transformation, and electroporation (Gasser et al, *Science* 244: 1293; Potrykus, 1990, *Bio/Techn.* 8: 535; Shimamoto et al., 1989, *Nature* 338: 274).

Presently, *Agrobacterium tumefaciens* mediated gene transfer is the method of choice for generating transgenic dicots (for review Hooykas & Schilperoort, 1992, *Plant Mol. Biol.* 19: 15-38), and can also be used for transforming monocots, although other transformation methods often are used for these plants. Presently, the method of choice for generating transgenic monocots supplementing the *Agrobacterium* approach is particle bombardment (microscopic gold or tungsten particles coated with the transforming DNA) of embryonic calli or developing embryos (Christou, 1992, *Plant J.* 2: 275-281; Shimamoto, 1994, *Curr. Opin. Biotechnol.* 5: 158-162; Vasil et al., 1992, *Bio/Technology* 10: 667-674). An alternative method for transformation of monocots is based on protoplast transformation as described by Omirulleh et al., 1993, *Plant Molecular Biology* 21(3): 415-428.

Following transformation, the transformants having incorporated the expression construct are selected and regenerated into whole plants according to methods well-known in the art. Often the transformation procedure is designed for the selective elimination of selection genes either during regeneration or in the following generations by using e.g., co-transformation with two separate T-DNA constructs or site specific excision of the selection gene by a specific recombinase.

Dough-Based Products

The hybrid enzyme of the present invention may be used for the preparation of a dough-based edible product such as, bread, tortillas, cakes, pancakes, biscuits, cookies, pie crusts, more preferably baked products, such as, bread products.

The dough used to prepare the dough based product generally comprises flour, e.g., from grains, such as, wheat flour, corn flour, rye flour, oat flour, or sorghum flour. The dough is generally leavened by the addition of a suitable yeast culture, such as a culture of *Saccharomyces cerevisiae* (baker's yeast) or a chemical leavening agent.

The edible dough based product may preferably be any kind of baked product prepared from dough, either of a soft or a crisp character, either of a white, light or dark type. Preferred edible dough based products include bread (in particular white, wheat, whole-meal, low-carb, brown, multi-grain, dark and rye bread), typically in the form of loaves, buns or rolls, and more preferably, pan bread, hamburger buns, French baguette-type bread, pita bread, tortillas, cakes, pancakes, biscuits, cookies, pie crusts, crisp bread, steamed bread, pizza crust and the like.

The edible dough-based product is made by heating the dough, e.g., by baking or steaming. Examples are steamed or baked bread (in particular white, whole-meal or rye bread), typically in the form of loaves or rolls. The edible dough based product may also be prepared by frying (e.g., deep frying in hot fat or oil). An example of such an edible product is a doughnut.

The hybrid enzymes of the first aspect of the invention preferably have a high tolerance towards overdosing. The addition of the polypeptide of the invention, e.g., the polypeptide of the first aspect, in 2 times, 3 times, preferably 4 times, more preferably 5 times, most preferably 6 times the effective dosage of said polypeptide to a dough results in an ELR and/or an $ELR_N$ of less than 15%, less than 10%, less than 7%, less than 6%, less than 5%, less than 4% or even less than 3%.

In a further aspect the polypeptide of the invention has a residual activity of at least 20%, such as at least 25% or 30%, preferably at least 35%, more preferably at least 40% and most preferably at least 50%, at the test conditions given in the specification.

The polypeptide of the present invention may further have an improved exo-to-endo ratio de-fined as IEF1 or IEF2 in the specification. The IEF1 or IEF2 of the polypeptide may be larger than 1, such as 1.1 or 1.5, preferably 2 or 2.5 or 3, more preferably 3.5 or 4, most preferably 5 or 7 or 10.

In further embodiments the invention provides polypeptides with characteristics that are of particular interest for baking purposes, namely a residual activity of at least 25% at 70° C. at the test conditions given in the specification, an increased exo-to-endo ratio (IEF), where IEF is larger than 1, and finally a reduced cohesiveness of less than 5% (at the test conditions given in the specification) while change in hardness is at least 85 units (at the test conditions given in the specification) and/or change mobility of free water is at least 1100 units (at the test conditions given in the specification).

For baking purpose the polypeptide of the invention may give a cohesiveness reduction, when measured at the test conditions given in the specification, of at least 5%, while dHardness, when measured at the test conditions given in the specification, is at least 85 units, such as 90 units or 100 units, preferably 150 units or 200 units, more preferably 250 units or 300 units, most preferably 400 units or 600 units. In a further embodiment the polypeptide of the invention may give a cohesiveness reduction, when measured at the test conditions given in the specification, of at least 4%, while dHardness, when measured at the test conditions given in the specification, is at least 85 units, such as 90 units or 100 units, preferably 150 units or 200 units, more preferably 250 units or 300 units, most preferably 400 units or 600 units. In a still further embodiment the polypeptide of the invention may give a cohesive-ness reduction, when measured at the test conditions given in the specification, of at least 2%, while dHardness, when measured at the test conditions given in the specification, is at least 85 units, such as 90 units or 100 units, preferably 150 units or 200 units, more preferably 250 units or 300 units, most preferably 400 units or 600 units. In yet another embodiment the polypeptide of the invention may give a cohesiveness reduction, when measured at the test conditions given in the specification, of at least 1%, while dHardness, when measured at the test conditions given in the specification, is at least 85 units, such as 90 units or 100 units, preferably 150 units or 200 units, more preferably 250 units or 300 units, most preferably 400 units or 600 units.

When the polypeptide of the invention is added together with 300 MANU Novamyl®/kg flour it may give a cohesiveness reduction, when measured at the test conditions given in the specification, of at least 5%, while dHardness, when measured at the test conditions given in the specification, is at least 15 units, such as 20 units or 30 units, preferably 40 units or 50 units, more preferably 60 units or 70 units, most preferably 85 units or 100 units. In a further embodiment the polypeptide of the invention may give a cohesiveness reduction, when measured at the test conditions given in the specification, of at least 4%, while dHardness, when measured at the test conditions given in the specification, is at least 15 units, such as 20 units or 30 units, preferably 40 units or 50 units, more preferably 60 units or 70 units, most preferably 85 units or 100 units. In a still further embodiment the polypeptide of the invention may give a cohesiveness reduction, when measured at the test conditions given in the specification, of at least 2%, while dHardness, when measured at the test conditions given in the specification, is at least 15 units, such as 20 units or 30 units, preferably 40 units or 50 units, more preferably 60 units or 70 units, most preferably 85 units or 100 units. In yet another embodiment the polypeptide of the invention may give a cohesiveness reduction, when measured at the test conditions given in the specification, of at least 1%, while dHardness, when measured at the test conditions given in the specification, is at least 15 units, such as 20 units or 30 units, preferably 40 units or 50 units, more preferably 60 units or 70 units, most preferably 85 units or 100 units.

For baking purpose the polypeptide of the invention may give a cohesiveness reduction, when measured at the test conditions given in the specification, of at least 5%, while dMobility, when measured at the test conditions given in the specification, is at least 300 units, such as 400 units or 500 units, preferably 600 units or 700 units, more preferably 800 units or 900 units, most preferably 1000 units or 1200 units. In a further embodiment the polypeptide of the invention may give a cohesiveness reduction, when measured at the test conditions given in the specification, of at least 4%, while dMobility, when measured at the test conditions given in the specification, is at least 300 units, such as 400 units or 500 units, preferably 600 units or 700 units, more preferably 800 units or 900 units, most preferably 1000 units or 1200 units. In a still further embodiment the polypeptide of the invention may give a cohesiveness reduction, when measured at the test conditions given in the specification, of at least 2%, while dMobility, when measured at the test conditions given in the specification, is at least 300 units, such as 400 units or 500 units, preferably 600 units or 700 units, more preferably 800 units or 900 units, most preferably 1000 units or 1200 units. In yet another embodiment the polypeptide of the invention may give a cohesiveness reduction, when measured at the test conditions given in the specification, of at least 1%, while dMobility, when measured at the test conditions given in the specification, is at least 300 units, such as 400 units or 500 units, preferably 600 units or 700 units, more preferably 800 units or 900 units, most preferably 1000 units or 1200 units.

When the polypeptide of the invention is added together with 300 MANU Novamyl®/kg flour it may give a cohesiveness reduction, when measured at the test conditions given in the specification, of at least 5%, while dMobility, when measured at the test conditions given in the specification, is at least 1000 units, such as 1100 units or 1200 units, preferably 1400 units or 1500 units, more preferably 1800 units or 2000 units, most preferably 2200 units or 2500 units. In a further embodiment the polypeptide of the invention may give a cohesive-ness reduction, when measured at the test conditions given in the specification, of at least 4%, while dMobility, when measured at the test conditions given in the specification, is at least 1000 units, such as 1100 units or 1200 units, preferably 1400 units or 1500 units, more preferably 1800 units or 2000 units, most preferably 2200 units or 2500 units. In a still further embodiment the polypeptide of the invention may give a cohesiveness reduction, when measured at the test conditions given in the specification, of at least 2%, while dMobility, when measured at the test conditions given in the specification, is at least 1000 units, such as 1100 units or 1200 units, preferably 1400 units or 1500 units, more preferably 1800 units or 2000 units, most preferably 2200 units or 2500 units. In yet another embodiment the polypeptide of the invention may give a cohesiveness reduction, when measured at the test conditions given in the specification, of at least 1%, while dMobility, when measured at the test conditions given in the specification, is at least 1000 units, such as 1100 units or 1200 units, preferably 1400 units or 1500 units, more preferably 1800 units or 2000 units, most preferably 2200 units or 2500 units.

The above values for cohesiveness reduction, dHardness and dMobility are particularly relevant for bread, in particular for bread prepared by the sponge and dough method. Similar correlation between cohesiveness reduction and dHardness and dMobility is disclosed in Example 7.

The hybrid enzyme of the present invention may optionally be used together with one or more additional enzymes and/or anti-staling agents.

Anti-staling agents include but are not limited to emulsifiers, hydrocolloids and enzymatic anti-staling agents. As used herein, an anti-staling agent refers to a chemical, biological or enzymatic agent which can retard staling of the dough-based products, that is, which can reduce the rate deterioration of the softness of the dough based product during storage. The softness of dough based products (and the anti-staling effect of the anti-staling agent) can be evaluated empirically by the skilled test baker or measured using a texture analyzer (e.g., TAXT2), as is known in the art.

Examples of chemical anti-staling agents include polar lipids, e.g., fatty acids and their monoglyceride esters, such as, described in U.S. Pat. No. 4,160,848.

In a preferred embodiment, the anti-staling agent is an anti-staling enzyme, which is preferably added to the dough prior to cooking (e.g., baking). Examples of anti-staling enzymes include, without limitation, endo-amylases, such as the hybrids of the invention, exo-endo-amylases, such as, e.g., the exo-amylase described in U.S. Pat. No. 6,667,065 and US 2004/0043109, pullulanases, glycosyltransferases, amyloglycosidases, branching enzymes (1,4-alpha-glyucan branching enzyme), 4-alpha-glucanotransferases (dextrin transferase), beta-amylases, maltogenic alpha-amylases, lipases, phospholipases, galactolipases, acyltransferases, pectate lyases, xylanases, xyloglucan endotransglycosylases, proteases, e.g., as described in WO 2003/084331, peptidases and combinations thereof. The amylase may be from a fungus, bacterium or plant. It may be an endo-amylase, e.g., from Bacillus, particularly B. licheniformis or B. amyloliquefaciens, a beta-amylase, e.g., from plant (e.g., soy bean) or from microbial sources (e.g., Bacillus), such as the non-maltogenic Bacillus clausii alpha-amylase disclosed in WO 99/50399 A2, the Pseudomonas saccharophilia amylase in SEQ ID NO:1 of WO 2004/111217, or a glucoamylase, or a fungal endo-amylase, e.g., from A. niger or A. oryzae.

More preferably, the additional enzyme is an anti-staling enzyme and preferably the anti-staling enzyme is a maltogenic amylase (EC 3.2.1.133). The maltogenic amylases is added into the dough in an amount effective to retard the staling of the product, such as, at least 500 MANU/kg flour, more preferably in an amount of at least 500 to 1500 MANU/kg flour. A maltogenic amylase may be obtained from any suitable source, such as derived from a bacteria, such as Bacillus, preferably B. stearothermophilus, e.g., from strain NCIB 11837 or a variant thereof made by amino acid modification (EP 494233 B1, U.S. Pat. No. 6,162,628). The maltogenic amylase may preferably be added at a dosage of 20 to 2000 MANU/kg flour, preferably 500 to 1000 MANU/kg flour, more preferably, at least 750 MANU/kg flour, at least 1000 MAN U/kg flour. A preferred maltogenic amylase is Novamyl® (available form Novozymes A/S).

In another preferred embodiment, the anti-staling enzyme is a xylanase. The xylanase may be obtained from any suitable source, e.g., from Bacillus, e.g., Bacillus subtilis, as described in WO 2003/010923, WO 2001/066711 or WO 2000/039289, and Aspergillus, in particular of A. aculeatus, A. niger, A. awamori, or A. tubigensis or Trichoderma and Thermomyces as described in WO 96/32472, e.g., T. reesei, or from a strain of Humicola, e.g., H. insolens. Optionally, an additional enzyme may be used together with the above anti-staling enzymes, such as, a lipolytic enzyme, particularly phospholipase, galactoilipase and/or triacyl glycerol lipase activity, e.g., as described in WO 99/53769, WO 00/32758, WO 02/00852 or WO 2002/066622, or e.g., a transglutaminase, a cellulytic enzyme, e.g., a cellulase, an acyltransferase, a protein disulfide isomerase, a pectinase, a pectate lyase, an oxidoreductase. The enzyme may be of any origin, including mammalian, plant, and preferably microbial (bacterial, yeast or fungal) origin and may be obtained by techniques conventionally used in the art.

The additional enzyme may also be a lipolytic enzyme, particularly phospholipase, galactoilipase and/or triacyl glycerol lipase activity, e.g., as described in WO 99/53769, WO 00/32758, WO 02/00852 or WO 2002/066622.

Further, the additional enzyme may be a second amylase, a cyclodextrin glucanotransferase, a protease or peptidase, in particular an exopeptidase, a trans-glutaminase, a lipase, a phospholipase, a cellulase, a hemicellulase, a glycosyltransferase, a branching enzyme (1,4-alpha-glucan branching enzyme) or an oxidoreductase. The additional enzyme may be of mammalian, plant or microbial (bacterial, yeast or fungal) origin.

The second amylase may be from a fungus, bacterium or plant. It may be a maltogenic amylase (EC 3.2.1.133), e.g., from B. stearothermophilus, an endo-amylase, e.g., from Bacillus, particularly B. licheniformis or B. amyloliquefaciens, a beta-amylase, e.g., from plant (e.g., soy bean) or from microbial sources (e.g., Bacillus), a glucoamylase, e.g., from A. niger, or a fungal endo-amylase, e.g., from A. oryzae or from Pseudomonas saccharophilia such as the non-maltogenic alpha-amylase disclosed in WO 99/50399 A2.

The hemicellulase may be a pentosanase, e.g., a xylanase which may be of microbial origin, e.g., derived from a bacterium or fungus, such as a strain of Aspergillus, in particular of A. aculeatus, A. niger, A. awamori, or A. tubigensis, from a strain of Trichoderma, e.g., T. reesei, or from a strain of Humicola, e.g., H. insolens.

The protease may be from Bacillus, e.g., B. amyloliquefaciens.

The oxidoreductase may be a glucose oxidase, a carbohydrate oxidase, a hexose oxidase, a lipoxidase, a peroxidase, or a laccase.

Dough and/or Bread-Improving Additive

The hybrid enzyme of the present invention may be provided as a dough and/or bread improving additive in the form of a granulate or agglomerated powder. The dough and/or bread improving additive may preferably have a narrow particle size distribution with more than 95% (by weight) of the particles in the range from 25 to 500 μm.

In a preferred embodiment a composition, e.g., a bread improving additive, is produced in a process comprising the steps of; a) providing a first amino acid sequence having endo-amylase activity; b) providing a second amino acid sequence comprising a carbohydrate-binding module; c) and constructing a polypeptide comprising said first amino acid sequence and second amino acid sequence; d) providing a DNA sequence encoding said polypeptide; e) expressing said DNA sequence in a suitable host cell and recovering said polypeptide; f) adding said polypeptide to flour or to a granulate or agglomerated powder.

Granulates and agglomerated powders may be prepared by conventional methods, e.g., by spraying the amylase, i.e., the hybrid enzyme, onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), starch, rice, corn grits, or soy.

Starch Processing

The polypeptide of this invention, i.e., an endo-amylase having a CBM, possesses valuable properties allowing for a variety of industrial applications. In particular, enzymes of the first aspect are applicable as a component in washing, dishwashing and hard-surface cleaning detergent compositions. Numerous variants are particularly useful in the production of sweeteners and ethanol from starch, and/or for textile desizing. One example of producing ethanol, wherein an endo-amylase of the invention may be used is disclosed in U.S. Pat. No. 5,231,017 which is hereby incorporated by reference.

Further, a process wherein an endo-amylase of the invention may be used is disclosed in DK patent application no. PA 2003 01568 (hereby incorporated by reference). Said process comprises hydrolysing starch into a soluble starch hydrolysate at a temperature below the initial gelatinization temperature of said granular starch. Another suitable process is disclosed in WO 2004/081193 (hereby incorporated by reference).

Conditions for conventional starch-conversion processes, including starch liquefaction and/or saccharification processes are described in, e.g., U.S. Pat. No. 3,912,590 and in EP patent publications Nos. 252,730 and 63,909.

A preferred use is in a fermentation process wherein a starch substrate is liquefied and/or saccharified in the presence of the endo-amylase having a CBM to produce glucose and/or maltose, e.g., for use as sweeteners or suitable for conversion into a fermentation product by a fermenting organism, preferably a yeast. Such fermentation processes include a process for producing ethanol for fuel or drinking ethanol (portable alcohol), a process for producing a beverage, a process for producing organic compounds, such as citric acid, itaconic acid, lactic acid, gluconic acid; ketones; amino acids, such as glutamic acid (sodium monoglutaminate), but also more complex compounds such as antibiotics, such as penicillin, tetracyclin; enzymes; vitamins, such as riboflavin, B12, beta-carotene; hormones, which are difficult to produce synthetically.

Production of Sweeteners from Starch:

A "traditional" process for conversion of starch to fructose syrups normally consists of three consecutive enzymatic processes, viz. a liquefaction process followed by a saccharification process and an isomerization process. During the liquefaction process, starch is degraded to dextrins by an endo-amylase, preferably by an endo-amylase having a CBM, such as the polypeptide of the invention at pH values between 5.5 and 6.2 and at temperatures of 95-160° C. for a period of approx. 2 hours. In order to ensure an optimal enzyme stability under these conditions, 1 mM of calcium is added (40 ppm free calcium ions).

After the liquefaction process the dextrins are converted into dextrose by addition of a glucoamylase (e.g., AMG™) and a debranching enzyme, such as an isoamylase or a pullulanase (e.g., Promozyme™). Before this step the pH is reduced to a value below 4.5, maintaining the high temperature (above 95° C.), and the liquefying endo-amylase activity is denatured. The temperature is lowered to 60° C., and glucoamylase and debranching enzyme are added. The saccharification process proceeds for 24-72 hours.

After the saccharification process the pH is increased to a value in the range of 6-8, preferably pH 7.5, and the calcium is removed by ion exchange. The dextrose syrup is then converted into high fructose syrup using, e.g., an immmobilized glucoseisomerase (such as Sweetzyme™).

In an embodiment of a starch process of the invention, milled gelatinized whole grain raw material is broken down (hydrolyzed) into maltodextrins (dextrins) mostly of a DE higher than 4 using the polypeptide of the first aspect. The raw material is in one embodiment of the invention milled (whole) grain.

In an embodiment of the invention, enzymatic liquefaction is carried out as a three-step hot slurry process. The slurry is heated to between 60-95° C., preferably 80-85° C., and the enzyme(s) is(are) added to initiate liquefaction (thinning), at least a polypeptide of the first aspect is added. Then the slurry is jet-cooked at a temperature between 95-140° C., preferably 105-125° C. to complete gelanitization of the slurry. Then the slurry is cooled to 60-95° C. and more enzyme(s), preferably comprising the polypeptide of the first aspect, is (are), added to finalize hydrolysis (secondary liquefaction). The liquefaction process is carried out at pH 4.5-6.5, in particular at a pH between 5 and 6. Milled and liquefied whole grains are known as mash. The polypeptide of the first aspect may be added in effective amounts well known to the person skilled in the art.

In an aspect the process may comprise; a) contacting a starch substrate with a endo-amylase having a CBM, e.g., the polypeptide of the first aspect; b) incubating said starch substrate with said polypeptide and a fungal alpha-amylase and/or or a glucoamylase for a time and at a temperature sufficient to achieve liquefaction and saccharification of at least 90%, or at least 92%, at least 94%, at least 95%, at least 96%, at least 97%, at least 98%, at least 99%, at least 99.5% w/w of said starch substrate into fermentable sugars; c) fermenting to produce a fermentation product, d) optionally recovering the fermentation product.

In yet another aspect the process comprising liquefaction and/or hydrolysis of a slurry of gelatinized or granular starch, in particular liquefaction and/or hydrolysis of granular starch into a soluble starch hydrolysate at a temperature below the initial gelatinization temperature of said granular starch. In addition to being contacted with a polypeptide of the invention, e.g., the polypeptide of the first aspect, the starch may be contacted with an enzyme selected from the group consisting of; a fungal alpha-amylase (EC 3.2.1.1), a beta-amylase (E.C. 3.2.1.2), and a glucoamylase (E.C.3.2.1.3). In an embodiment further a debranching enzyme, such as an isoamylase (E.C. 3.2.1.68) or a pullulanases (E.C. 3.2.1.41) may be added.

In an embodiment the process is conducted at a temperature below the initial gelatinization temperature. Preferably the temperature at which the processes are conducted is at least 30° C., at least 31° C., at least 32° C., at least 33° C., at least 34° C., at least 35° C., at least 36° C., at least 37° C., at least 38° C., at least 39° C., at least 40° C., at least 41° C., at least 42° C., at least 43° C., at least 44° C., at least 45° C., at least 46° C., at least 47° C., at least 48° C., at least 49° C., at least 50° C., at least 51° C., at least 52° C., at least 53° C., at least 54° C., at least 55° C., at least 56° C., at least 57° C., at least 58° C., at least 59° C., or preferably at least 60° C. The pH at which the process is conducted may in be in the range of 3.0 to 7.0, preferably from 3.5 to 6.0, or more preferably from 4.0-5.0. In a preferred embodiment the process comprises fermentation, e.g., with a yeast to produce ethanol, e.g., at a temperature around 32° C., such as from 30 to 35° C. During the fermentation the ethanol content reaches at least 7%, at least 8%, at least 9%, at least 10% such as at least 11%, at least 12%, at least 13%, at least 14%, at least 15% such as at least 16% ethanol (w/w).

The starch slurry to be used in any of the above aspects may have 20-55% dry solids granular starch, preferably 25-40% dry solids granular starch, more preferably 30-35% dry solids granular starch. After being contacted with the endo-amylase having a CBM, e.g., the polypeptide of the first aspect at least 85%, at least 86%, at least 87%, at least 88%, at least 89%, at least 90%, at least 91%, at least 92%, at least 93%, at least 94%, at least 95%, at least 96%, at least 97%, at least 98%, or preferably at least 99% of the dry solids of the granular starch is converted into a soluble starch hydrolysate.

In another preferred embodiment the endo-amylase having a CBM, e.g, the polypeptide of the first aspect, is used in a process for liquefaction, saccharification of a gelatinized starch, e.g., but not limited to gelatinization by jet cooking. The process may comprise fermentation to produce a fermentation product, e.g., ethanol. Such a process for producing ethanol from starch-containing material by fermentation comprises: (i) liquefying said starch-containing material with a endo-amylase having a CBM, e.g., the polypeptide of the first aspect; (ii) saccharifying the liquefied mash obtained; (iii) fermenting the material obtained in step (ii) in the presence of a fermenting organism. Optionally the process further comprises recovery of the ethanol. The saccharification and fermentation may be carried out as a simultaneous saccharification and fermentation process (SSF process). During the fermentation the ethanol content reaches at least 7%, at least 8%, at least 9%, at least 10% such as at least 11%, at least 12%, at least 13%, at least 14%, at least 15% such as at least 16% ethanol.

The starch to be processed in the processes of the above aspects may in particular be obtained from tubers, roots, stems, legumes, cereals or whole grain. More specifically the granular starch may be obtained from corns, cobs, wheat, barley, rye, milo, sago, cassava, tapioca, sorghum, rice, peas, bean, banana or potatoes. Specially contemplated are both waxy and non-waxy types of corn and barley.

Compositions of the Invention

The invention also relates to a composition comprising the polypeptide of the first aspect. The composition may further comprise an enzyme selected from the group comprising of; a fungal alpha-amylase (EC 3.2.1.1), a beta-amylase (E.C. 3.2.1.2), a glucoamylase (E.C.3.2.1.3) and a pullulanases (E.C. 3.2.1.41). The glucoamylase may preferably be derived from a strain of *Aspergillus* sp., such as *Aspergillus niger*, or from a strain of *Talaromyces* sp. and in particular derived from *Talaromyces leycettanus* such as the glucoamylase disclosed in U.S. Pat. No. Re. 32,153, *Talaromyces duponti* and/or *Talaromyces thermopiles* such as the glucoamylases disclosed in U.S. Pat. No. 4,587,215 and more preferably derived from *Talaromyces emersonii*. Most preferably the glucoamylase is derived from *Talaromyces emersonii* strain CBS 793.97 and/or having the sequence disclosed as SEQ ID NO: 7 in WO 99/28448. Further preferred is a glucoamylase which has an amino acid sequence having at least 50%, at least 60%, at least 70%, at least 80%, at least 90% or even at least 95% homology to the aforementioned amino acid sequence. A commercial *Talaromyces* glucoamylase preparation is supplied by Novozymes A/S as Spirizyme Fuel.

Also preferred for a composition comprising the polypeptide of the first aspect and a glucoamylase are polypeptides having glucoamylase activity which are derived from a strain of the genus *Trametes*, preferably *Trametes cingulata*. Further preferred is polypeptides having glucoamylase activity and having at least 50%, at least 60%, at least 70%, at least 80%, at least 90% or even at least 95% homology with amino acids for mature polypeptide amino acids 1 to 575 of SEQ ID NO: 5 in U.S. Patent application No. 60/650,612.

Also preferred for a composition comprising the polypeptide of the first aspect and a glucoamylase are polypeptides having glucoamylase activity which are derived from a strain of the genus *Pachykytospora*, preferably *Pachykytospora papyracea*. Further preferred is polypeptides having glucoamylase activity and having at least 50%, at least 60%, at least 70%, at least 80%, at least 90% or even at least 95% homology with amino acids for mature polypeptide amino acids 1 to 556 of SEQ ID NO: 2 in U.S. Patent application 60/650,612.

The composition described above may be used for liquefying and/or saccharifying a gelatinized or a granular starch, as well as a partly gelatinized starch, e.g., in a production of sweetener, or a fermentation process, such as for ethanol. A partly gelatinized starch is a starch which to some extent is gelatinized, i.e., wherein part of the starch has irreversibly swelled and gelatininized and part of the starch is still present in a granular state.

The composition described above may also comprise an acid fungal alpha-amylase present in an amount of 0.01 to 10 AFAU/g DS, preferably 0.1 to 5 AFAU/g DS, more preferably 0.5 to 3 AFAU/AGU, and most preferably 0.3 to 2 AFAU/g DS. The composition may be applied in any of the starch processes described above.

Production of Fermentation Products

From gelatinized starch: In this aspect the present invention relates to a process for producing a fermentation product, especially ethanol, from starch-containing material, which process includes a liquefaction step and separately or simultaneously performed saccharification and fermentation step(s). The fermentation product, such as especially ethanol, may optionally be recovered after fermentation, e.g., by distillation. Suitable starch-containing starting materials are listed in the section "Starch-containing materials" section below. Contemplated enzymes are listed in the "Enzymes"-section below. The fermentation is preferably carried out in the presence of yeast, preferably a strain of *Saccharomyces*. Suitable fermenting organisms are listed in the "Fermenting Organisms" section below.

A preferred process comprises a) contacting an aqueous starch slurry with a polypeptide comprising a first amino acid sequence having alpha-amylase activity and a second amino acid sequence comprising a carbohydrate-binding module, b) incubating said starch slurry with said polypeptide, c) fermenting to produce a fermentation product, and d) optionally recovering the fermentation product. Preferably the step b) is performed for a time and at a temperature sufficient to achieve conversion of at least 90% w/w of said starch substrate into fermentable sugars. Preferably the first amino acid sequence and/or second amino acid sequence of said polypeptide is derived from a bacterium. Said polypeptide may preferably be the hybrid of the first aspect.

The aqueous slurry may contain from 10-40 wt. %, preferably 25-35 wt. % starch-containing material. The slurry is heated to above the gelatinization temperature and bacterial and/or acid fungal alpha-amylase may be added to initiate liquefaction (thinning). The slurry may in an embodiment be jet-cooked to further gelatinize the slurry before being subjected to an alpha-amylase in step (a) of the invention.

More specifically liquefaction may be carried out as a three-step hot slurry process. The slurry is heated to between 60-95° C., preferably 80-85° C., and alpha-amylase is added to initiate liquefaction (thinning). Then the slurry may be jet-cooked at a temperature between 95-140° C., preferably 105-125° C., for 1-15 minutes, preferably for 3-10 minute, especially around 5 minutes. The slurry is cooled to 60-95° C. and more alpha-amylase is added to finalize hydrolysis (secondary liquefaction). The liquefaction process is usually carried out at pH 4.5-6.5, in particular at a pH between 5 and 6. Milled and liquefied whole grains are known as mash.

The saccharification in step may be carried out using conditions well know in the art. For instance, a full saccharification process may lasts up to from about 24 to about 72 hours, however, it is common only to do a pre-saccharification of typically 40-90 minutes at a temperature between 30-65° C., typically about 60° C., followed by complete saccharification during fermentation in a simultaneous saccharification and fermentation process (SSF). Saccharification is typically carried out at temperatures from 30-65° C., typically around 60° C., and at a pH between 4 and 5, normally at about pH 4.5.

The most widely used process in ethanol production is the simultaneous saccharification and fermentation (SSF) process, in which there is no holding stage for the saccharification, meaning that fermenting organism, such as yeast, and enzyme(s) may be added together. When doing SSF it is common to introduce a pre-saccharification step at a temperature above 50° C., just prior to the fermentation.

In accordance with the present invention the fermentation step (c) includes, without limitation, fermentation processes used to produce alcohols (e.g., ethanol, methanol, butanol); organic acids (e.g., citric acid, acetic acid, itaconic acid, lactic acid, gluconic acid); ketones (e.g., acetone); amino acids (e.g., glutamic acid); gases (e.g., $H_2$ and $CO_2$); antibiotics (e.g., penicillin and tetracycline); enzymes; vitamins (e.g., riboflavin, B12, beta-carotene); and hormones. Preferred fermentation processes include alcohol fermentation processes, as are well known in the art. Preferred fermentation processes are anaerobic fermentation processes, as are well known in the art.

From un-gelatinized starch: In this embodiment the invention relates to processes for producing a fermentation product from starch-containing material without gelatinization of the starch-containing material. In one embodiment a polypeptide of the invention, e.g., the hybrid enzyme of the first aspect, and optionally a glucoamylase is used during saccharification and fermentation. According to the invention the desired fermentation product, such as ethanol, can be produced without liquefying the aqueous slurry containing the starch-containing material. In one embodiment a process of the invention includes saccharifying milled starch-containing material below the initial gelatinization temperature in the presence of the hybrid enzyme of the first aspect and a glucoamylase to produce sugars that can be fermented into the desired fermentation product by a suitable fermenting organism.

A preferred process comprises a) contacting an aqueous granular starch slurry with a polypeptide comprising a first amino acid sequence having alpha-amylase activity and a second amino acid sequence comprising a carbohydrate-binding module, b) incubating said starch slurry with said polypeptide, c) fermenting to produce a fermentation product, and d) optionally recovering the fermentation product. Preferably the step b) is performed for a time and at a temperature sufficient to achieve conversion of at least 90% w/w of said starch substrate into fermentable sugars. Preferably the first amino acid sequence and/or second amino acid sequence of said polypeptide is derived from a bacterium. Said polypeptide may preferably be the hybrid of the first aspect.

The term "initial gelatinization temperature" means the lowest temperature at which gelatinization of the starch commences. Starch heated in water begins to gelatinize between 50° C. and 75° C.; the exact temperature of gelatinization depends on the specific starch, and can readily be determined by the skilled artisan. Thus, the initial gelatinization temperature may vary according to the plant species, to the particular variety of the plant species as well as with the growth conditions. In the context of this invention the initial gelatinization temperature of a given starch-containing material is the temperature at which birefringence is lost in 5% of the starch granules using the method described by Gorinstein and Lii, 1992, Starch/Stärke 44(12): 461-466.

Before step (a) a slurry of starch-containing material, such as granular starch, having 20-55 wt. % dry solids, preferably 25-40 wt. % dry solids, more preferably 30-35 wt. % dry solids of starch-containing material may be prepared. The slurry may include water and/or process waters, such as stillage (backset), scrubber water, evaporator condensate or distillate, side stripper water from distillation, or other fermentation product plant process water. Because the process of the invention is carried out below the gelatinization temperature and thus no significant viscosity increase takes place, high levels of stillage may be used if desired. In an embodiment the aqueous slurry contains from about 1 to about 70 vol. % stillage, preferably 15-60% vol. % stillage, especially from about 30 to 50 vol. % stillage.

The milled starch-containing material may be prepared by milling starch-containing material to a particle size of 0.05 to 3.0 mm, preferably 0.1-0.5 mm. After being subjected to a process of the invention at least 85%, at least 86%, at least 87%, at least 88%, at least 89%, at least 90%, at least 91%, at least 92%, at least 93%, at least 94%, at least 95%, at least 96%, at least 97%, at least 98%, or preferably at least 99% of the dry solids of the starch-containing material is converted into a soluble starch hydrolysate.

The process of the invention is conducted at a temperature below the initial gelatinization temperature. Preferably the temperature at which step (a) is carried out is between 30-75° C., preferably between 45-60° C.

In a preferred embodiment step (a) and step (b) are carried out as a simultaneous saccharification and fermentation process. In such preferred embodiment the process is typically carried at a temperature between 28° C. and 36° C., such as between 29° C. and 35° C., such as between 30° C. and 34° C., such as around 32° C. According to the invention the temperature may be adjusted up or down during fermentation.

In an embodiment simultaneous saccharification and fermentation is carried out so that the sugar level, such as glucose level, is kept at a low level such as below about 3 wt. %, preferably below about 2 wt. %, more preferred below about 1 wt. %., even more preferred below about 0.5 wt. %, or even more preferred below about 0.1 wt. %. Such low levels of sugar can be accomplished by simply employing adjusted quantities of enzyme and fermenting organism. A skilled person in the art can easily determine which quantities of enzyme and fermenting organism to use. The employed quantities of enzyme and fermenting organism may also be selected to maintain low concentrations of maltose in the fermentation broth. For instance, the maltose level may be kept below about 0.5 wt. % or below about 0.2 wt. %.

The process of the invention may be carried out at a pH in the range between 3 and 7, preferably from 3.5 to 6, or more preferably from 4 to 5.

Starch-Containing Materials

Any suitable starch-containing starting material, including granular starch, may be used according to the present invention. The starting material is generally selected based on the desired fermentation product. Examples of starch-containing starting materials, suitable for use in a process of present invention, include tubers, roots, stems, whole grains, corns, cobs, wheat, barley, rye, milo, sago, cassava, tapioca, sorghum, rice peas, beans, or cereals, sugar-containing raw materials, such as molasses, fruit materials, sugar, cane or sugar beet, potatoes, and cellulose-containing materials, such as wood or plant residues. Contemplated are both waxy and non-waxy types of corn and barley.

The term "granular starch" means raw uncooked starch, i.e., starch in its natural form found in cereal, tubers or grains. Starch is formed within plant cells as tiny granules insoluble in water. When put in cold water, the starch granules may absorb a small amount of the liquid and swell. At temperatures up to 50° C. to 75° C. the swelling may be reversible. However, with higher temperatures an irreversible swelling called "gelatinization" begins. Granular starch to be processed may be a highly refined starch quality, preferably at least 90%, at least 95%, at least 97% or at least 99.5% pure or it may be a more crude starch containing material comprising milled whole grain including non-starch fractions such as germ residues and fibers. The raw material, such as whole grain, is milled in order to open up the structure and allowing for further processing. Two milling processes are preferred according to the invention: wet and dry milling. In dry milling whole kernels are milled and used. Wet milling gives a good separation of germ and meal (starch granules and protein) and is often applied at locations where the starch hydrolysate is used in production of syrups. Both dry and wet milling is well known in the art of starch processing and is equally contemplated for the process of the invention.

The starch-containing material is milled in order to expose more surface area. In an embodiment the particle size is between 0.05 to 3.0 mm, preferably 0.1-0.5 mm, or so that at least 30%, preferably at least 50%, more preferably at least 70%, even more preferably at least 90% of the milled starch-containing material fit through a sieve with a 0.05 to 3.0 mm screen, preferably 0.1-0.5 mm screen.

Fermentation Product

The term "fermentation product" means a product produced by a process including a fermentation step using a fermenting organism. Fermentation products contemplated according to the invention include alcohols (e.g., ethanol, methanol, butanol); organic acids (e.g., citric acid, acetic acid, itaconic acid, lactic acid, gluconic acid); ketones (e.g., acetone); amino acids (e.g., glutamic acid); gases (e.g., $H_2$ and $CO_2$); antibiotics (e.g., penicillin and tetracycline); enzymes; vitamins (e.g., riboflavin, $B_{12}$, beta-carotene); and hormones. In a preferred embodiment the fermentation product is ethanol, e.g., fuel ethanol; drinking ethanol, i.e., potable neutral spirits; or industrial ethanol or products used in the consumable alcohol industry (e.g., beer and wine), dairy industry (e.g., fermented dairy products), leather industry and tobacco industry. Preferred beer types comprise ales, stouts, porters, lagers, bitters, malt liquors, happoushu, high-alcohol beer, low-alcohol beer, low-calorie beer or light beer. Preferred fermentation processes used include alcohol fermentation processes, as are well known in the art. Preferred fermentation processes are anaerobic fermentation processes, as are well known in the art.

Fermenting Organisms

"Fermenting organism" refers to any organism, including bacterial and fungal organisms, suitable for use in a fermentation process and capable of producing desired a fermentation product. Especially suitable fermenting organisms are able to ferment, i.e., convert, sugars, such as glucose or maltose, directly or indirectly into the desired fermentation product. Examples of fermenting organisms include fungal organisms, such as yeast. Preferred yeast includes strains of *Saccharomyces* spp., in particular, *Saccharomyces cerevisiae*.

In a preferred embodiment the fermenting organism, e.g., the yeast, may be transformed with the polypeptide of the first aspect and applied in a process comprising; a) contacting a starch substrate with a fermenting organism cell transformed to express a polypeptide comprising a first amino acid sequence having alpha-amylase activity and a second amino acid sequence comprising a carbohydrate-binding module; b) holding said starch substrate with said yeast for a time and at a temperature sufficient to achieve conversion of at least 90% w/w of said starch substrate into fermentable sugars; c) fermenting to produce a fermentation product, e.g., ethanol, d) optionally recovering the fermentation product, e.g., ethanol. The steps a, b, and c are performed separately or simultaneously. In a preferred embodiment the first amino acid sequence and/or second amino acid sequence of said polypeptide is derived from a bacterium.

Materials and Methods

KNU amylolytic activity: The amylolytic activity may be determined using potato starch as substrate. This method is based on the break-down of modified potato starch by the enzyme, and the reaction is followed by mixing samples of the starch/enzyme solution with an iodine solution. Initially, a blackish-blue colour is formed, but during the break-down of the starch the blue colour gets weaker and gradually turns into a reddish-brown, which is compared to a coloured glass standard.

One Kilo Novo alfa Amylase Unit (KNU) is defined as the amount of enzyme which, under standard conditions (i.e., at 37° C.+/−0.05; 0.0003 M $Ca^{2+}$; and pH 5.6) dextrinizes 5.26 g starch dry substance Merck Amylum solubile. A folder AF 9/6 describing this analytical method in more detail is available upon request to Novozymes A/S, Denmark, which folder is hereby included by reference.

Endo activity assay: Endo endo-amylase activity may be determined using the Endo activity assay. 1 mL resuspended Phadebas substrate (0.25 tablets/mL 50 mM sodium acetate, 1 mM $CaCl_2$, adjusted to pH 5.7) is incubated with 25 microL enzyme for 15 min at 40° C. with agitation. The reaction is stopped by addition of 0.5 mL 1 M NaOH and the mixture is centrifuged in a table centrifuge at 14,000 RPM. The absorbance of the supernatant at 620 nm is measured. The activity is determined by comparing to a standard with declared activity (BAN 480 L, 480 KNU/g).

Maltogenic amylase activity: One MANU (Maltogenic Amylase Novo Unit) may be defined as the amount of enzyme required to release one micromol of maltose per minute at a concentration of 10 mg of maltotriose (Sigma M 8378) substrate per ml of 0.1 M citrate buffer, pH 5.0 at 37° C. for 30 minutes (MANU unit further defined in U.S. Pat. No. 6,162, 628, which is hereby incorporated by reference).

DNA Manipulations

Unless otherwise stated, DNA manipulations and transformations were performed using standard methods of molecular biology as described in Sambrook et al., 1989, Molecular cloning: A laboratory manual, Cold Spring Harbor lab. Cold Spring Harbor, N.Y.; Ausubel, F. M. et al. (eds.) "Current protocols in Molecular Biology", John Wiley and Sons, 1995; Harwood, C. R. and Cutting, S. M. (eds.).

EXAMPLE 1

Construction of Hybrids Between an Endo-Amylase and the CBM from AMY1048

The amylase AMY1048 is a wild type *Bacillus* amylase made up of a catalytic fragment of 484 amino acid and in addition a CBM20 fragment of 101 aa. The DNA sequence coding the AMY1048 is included as SEQ ID NO:1 and the mature AMY1048 sequence is included as SEQ ID NO:2. In SEQ ID NO:1 the CBM is defined as amino acid residues 485 to 586 which correspond to nucleotides 1540-1845 in SEQ ID NO:2. The amylase including the CBM can be expressed from a construction similar to what have been described for other amylases, e.g., inserted into a vector under the control of a constitutive active promoter and flanked by the signal sequence (SEQ ID NO:15) and the terminator sequence of *B. licheniformis* endo-amylase.

Replacing the catalytic fragment of the AMY1048 endo-amylase with a catalytic domain of another endo-amylase, thus creating a hybrid of the CBM from AMY1048 and a new endo-amylase, is made by amplifying the DNA fragment coding the catalytic domain of the new amylase by PCR using two oligonucleotides. The sense oligonucleotide is in it's 5'end identical to the last 20 nucleotides of the DNA sequence coding for the signal sequence prior to the AMY1048 mature sequence and further in its 3' end is identical to the first 20 nucleotides of DNA sequence coding the mature part of the desire amylase DNA. The antisense oligonucleotides are in its 5' end identical to the antisense DNA of the first 20 nucleotides of the DNA sequence coding the CBM from AMY1048 and further in its 3' end is identical to the antisense of the last 20 nucleotides of the DNA sequence coding the mature part of the desire amylase DNA.

Both the amplified amylase DNA and the vector hosting the AMY1048 amylase, is digested with Sac II and Sca I and the vector and PCR fragments ligated prior to transferring into *Bacillus subtilis* strain SHA273. In the primer sequences below the recognition sites of the restriction enzymes are indicated by underscore.

To construct a hybrid of the *B. licheniformis* endo-amylase (SEQ ID NO:35) and the CBM20 from *B. flavothermus* amylase the following oligonucleotides were used by the present inventors:

```
Sense:
                                       (P1s SEQ ID NO: 19)
5'-ctcattctgcagccgcggcagcaaatcttaatgggacgct-3'.

Antisense:
                                       (P1as SEQ ID NO: 20)
5'- atttgggaagtagtacttattctttgaacataaattgaaa-3'.
```

The resulting DNA sequence coding the mature polypeptide and the amino acid sequence of the mature polypeptide are included as SEQ ID NO:3 and SEQ ID NO:4 respectively To construct a hybrid of the LE429 variant of *B. licheniformis* endo-amylase (SEQ ID NO:41) and the CBM20 from *B. flavothermus* amylase the following oligonucleotides were used:

```
Sense:
                                       (P2s SEQ ID NO: 21)
5'-ctcattctgcagccgcggcagtaaatggcacgctgatgca-3'

Antisense:
                                       (P2as SEQ ID NO: 22)
5'-atttgggaagtagtacttattttggaacataaattgaaa-3'
```

The resulting DNA sequence coding the mature polypeptide and the amino acid sequence of the mature polypeptide are included as SEQ ID NO:5 and SEQ ID NO:6 respectively To construct a hybrid of the *B. stearothermophilus* endo-amylase (SEQ ID NO:36) and the CBM20 from *B. flavothermus* amylase the following oligonucleotides were used:

```
Sense:
                                       (P3s SEQ ID NO: 23)
5'-ctcattctgcagccgcggcagcaccgtttaacggcttaa-3'

Antisense:
                                       (P3as SEQ ID NO: 24)
5'-atttgggaagtagtacttattttaggaacccaaaccgaaa-3'
```

The resulting DNA sequence coding the mature polypeptide and the amino acid sequence of the mature polypeptide are included as SEQ ID NO:7 and SEQ ID NO:8 respectively To construct a hybrid of a variant of the alkaline *Bacillus* sp. SP722 endo-amylase (SEQ ID NO:38) and the CBM20 from *B. flavothermus* amylase the following oligonucleotides were used:

```
Sense:
                                       (P4s SEQ ID NO: 25)
5'ctcattctgcagccgcggcacatcataatgggacaaatgg-3'.

Antisense:
                                       (P4as SEQ ID NO: 26)
5'- atttgggaagtagtacttatccatttgtcccattatgatg-3'.
```

The resulting DNA sequence coding the mature polypeptide and the amino acid sequence of the mature polypeptide are included as SEQ ID NO:9 and SEQ ID NO:10 respectively.

To construct a hybrid of a variant of the alkaline *Bacillus* species AA560 endo-amylase (SEQ ID NO:40) and the CBM20 from *B. flavothermus* amylase the following oligonucleotides were used:

```
Sense:
                                       (P5s SEQ ID NO: 27)
5'-ctcattctgcagccgcggcacaccataatggtacgaacgg-3'

Antisense:
                                       (P5as SEQ ID NO: 28)
5'- atttgggaagtagtacttattttgtttacccaaatagaaa-3'
```

The resulting DNA sequence coding the mature polypeptide and the amino acid sequence of the mature polypeptide are included as SEQ ID NO:11 and SEQ ID NO:12 respectively.

To construct a hybrid of a variant of the *Bacillus amyloliquefaciens* endo-amylase (SEQ ID NO:37) and the CBM20 from *B. flavothermus* amylase the following oligonucleotides were used:

```
Sense:
                             (P6s SEQ ID NO: 29)
5'-ctcattctgcagccgcggcagtaaatggcacgctgatgca-3'

Antisense:
                             (P6as SEQ ID NO: 30)
5'- atttgggaagtagtacttatttttggaacataaatggaga-3'
```

The resulting DNA sequence coding the mature polypeptide and the amino acid sequence of the mature polypeptide are included as SEQ ID NO:13 and SEQ ID NO:14 respectively.

The above described hybrid enzymes was expressed by *B. subtilis* growing in shake flasks for 72 hours at and secreted into the supernatant. The presence of hybrid enzyme in the supernatant was demonstrated by SDS-PAGE.

EXAMPLE 2

Construction of a Hybrid Amylase with Carbohydrate Binding Domain

The catalytic fragment of the *B. flavothermus* endo-amylase, AMY1048 can further be divided into the central AB-domain harboring the catalytic center and a C domain c-terminal to the catalytic domain but prior to the CBM. In SEQ ID NO:2 the catalytic core domain consist of the first 397 amino acid residues, the C domain is defined as the amino acid residues from 398 to 484 and the CBM is defined as amino acid residues 485 to 586. In SEQ ID NO:1 the signal sequence is encoded by nucleotide 1 to 87, the catalytic core domain is encoded by nucleotide 88-1278, the C domain is encoded by the nucleotides 1279-1539, and the CBM is encoded by nucleotides 1540-1845.

The amylase including the CBM can be expressed from a vector construction similar to what have been described in WO 00/60060 in example 4—i.e., the amylase gene is inserted into a vector under the control of a amylase promoter and flanked by the signal sequence and the terminator sequence of *B. licheniformis* endo-amylase.

As an alternative to harboring the gene on a plasmid, the cassette including the DNA sequence coding for the antibiotic marker, promoter, signal sequence, the mature protein and the terminator can be integrated into the genome of the *B. subtilis* by homologous in-vivo crossover, by flanked upstream and downstream genomic DNA with high similarity to a non-essential part of the *B. subtilis* DNA. Useful DNA regions could be the pectate lyase or the endo-amylase loci. In this example the AMY1048 and the hybrid is inserted into the amylase loci in opposite direction relative to the original *B. subtilis* amylase.

The catalytic core domain of the AMY1048 endo-amylase was replaced with a catalytic core domain of the *Bacillus stearothermophilus* (BSG) endo-amylase, thus creating a hybrid of the C-domain and the CBM from AMY1048 and the catalytic core domain from the new endo-amylase.

The DNA fragment coding the catalytic core of the *B. stearothermophilus* amylase (SEQ ID NO:36) was amplified by PCR using two oligonucleotides. The sense oligonucleotides were in its 5' end identical to the last 20 nucleotides of the DNA sequence (SEQ ID NO:15) coding for the signal sequence prior the AMY1048 mature sequence (SEQ ID NO:1) and further in its 3' end identical to the first 20 nucleotides of DNA sequence coding the mature part of the desire amylase DNA. The antisense oligonucleotides were in its 5' end identical to the antisense DNA of the first 20 nucleotides of the DNA sequence coding the C-domain from AMY1048 and further in its 3' end was identical to the antisense of the last 20 nucleotides of the DNA sequence coding the catalytic core of the BSG amylase DNA.

To construct a hybrid of the *B. stearothermophilus* endo-amylase core domain and C-domain and the CBM20 from *B. flavothermus* amylase the following oligonucleotides were used by the present inventors:

```
Sense:
                             (P7s SEQ ID NO: 31)
5'-ctcattctgcagccgcggcagcaccgtttaacggctttaa-3'.

Antisence:
                             (P7as SEQ ID NO: 32)
5'-atatagtcgtgctgtgttccgtaagcataatccctgcgcg-3'.
```

To facilitate genome integration, a 5 kB fragment upstream from of the signal sequence and into the amylase genome sequence is made by PCR using the AMY1048 genomic construction as template, and the inverse primer of the antisense primer and the genome specific primer : 5'-ctgcatcagggctgcggcatcc-3; (P8 SEQ ID NO:33).

Another fragment from the termination of the gene and upstream of the genomic *B. subtilis* amylase is made by PCR using the AMY1048 genomic construction as template, and the inverse primer of the sense primer and the genome specific primer: 5'-ctgcatcagggctgcggcatcc-3'; (P9 SEQ ID NO:34).

Taking advantages of the 40 by overlap, the three PCR fragments were assembled by PCR and the resulting product amplified in another PCR using the genome specific primers, prior to transferring into *Bacillus subtilis* strain SHA273 (described in WO 92/11357 and WO 95/10603).

The resulting DNA sequence coding the mature polypeptide and the mature polypeptide are included as SEQ ID NO:17 and SEQ ID NO:18 respectively.

The hybrid enzyme was expressed by *B. subtilis* growing in PS1 media in shake flasks for 72 hours at 37° C. and secreted into the supernatant. The presence of hybrid enzyme in the supernatant was demonstrated by SDS-PAGE.

EXAMPLE 3

Determination of Exo-Endo Improvement Factor (EIF)

EIF is the measure of an increment of the exo/endo ratio relative to a parent enzyme, i.e., EIF=(exo/endo of variant)/(exo/endo of parent enzyme). An enzyme has an increase in exo/endo ratio compared to its parent enzyme if EIF>1. EIF may be based on one of the following methods.

EIF1 Endo activity assay: The Phadebas Amylase Test (Pharmacia Diagnostics) is run according to the supplier's recommendations and the endo units calculated from the supplied formula where the natural logarithm to the activity equals N, where N=A+square root [B+C*ln(Abs)]. Abs is the absorbance at 620 nm, A=−13.3235, B=243.3293, and C=26.73797

Exo activity assay: 50 microL of 50 mM sodium citrate, 5 mM $CaCl_2$, pH 6.5 is mixed with 25 microL of enzyme in the same buffer and 25 microL Betamyl substrate (Betamyl Method, Megazyme) dissolved according to suppliers recommendations. The assay mix is incubated for 30 min. at 40° C. and the reaction stopped by adding 150 microL 4% (w/w)

Trizma base (Tris(hydroxymethyl)-aminomethane). The activity is expressed directly as the absorbance at 420 nm measured using a microtiter plate reader.

EIF2 Endo activity assay: 1 mL resuspended Phadebas substrate (Pharmacia Diagnostics) (0.25 tablets/mL 50 mM so-dium acetate, 1 mM $CaCl_2$, adjusted to pH 5.7) is incubated with 25 microL enzyme for 15 min at 40° C. with agitation. The reaction is stopped by addition of 0.25 mL 1 M NaOH and the mix-ture is centrifuged in a table centrifuge at 14,000 RPM. The absorbance of the supernatant at 620 nm is measured. The activity is determined by comparing to a standard with declared activity (BAN 480 L, 480 KNU/g).

Exo activity assay: 900 microL 3.3% solubilized waxy maize starch (3.3% starch is boiled in 50 mM sodium acetate, 1 mM $CaCl_2$, pH 5.7 for 5 min and cooled to 40° C.) is incubated with 100 microL enzyme at 40° C. with stirring. After appropriate reaction time the remaining starch is precipitated by addition of 450 microL 4° C. 96% ethanol. The precipitate is immediately removed by centrifugation at 3000 G for 20 min. The total carbohydrate in the supernatant is determined by mixing 200 microL supernatant with 50 microL 2% tryptophan and 900 microL 64% sulphuric acid. The mixture is heated for 15 min at 95° C. and the absorbance at 630 nm is measured after cooling to room tem-perature. The activity is determined by comparing with the absorbance of glucose standards in the same assay. One unit is defined as the amount of enzyme that at initial rates liberates 1 mg oligomeric products (products that are not precipitated by ethanol) per min.

EXAMPLE 4

Liquefaction and Saccharification with an Endo-Amylase with a CBM

This example illustrates the conversion of granular wheat starch into glucose using a bacterial endo-amylase with a CBM (SEQ ID NO:4) or the same bacterial endo-amylase without CBM (SEQ ID NO:35) together with a glucoamylase and an acid fungal amylase. A slurry with 33% dry solids (DS) granular starch was prepared by adding 247.5 g of wheat starch under stirring to 502.5 ml of water. The pH was adjusted with HCl to 4.5. The granular starch slurry was distributed to 100 ml Erlenmeyer flasks with 75 g in each flask. The flasks were incubated with magnetic stirring in a 60° C. water bath. At zero hours the enzyme activities given in table 1 were dosed to the flasks. Samples were withdrawn after 24, 48 and 73 and 94 hours. The enzyme levels used were endo-amylase +/−CBM 100 KNU/kg DS, glucoamylase 200 AGU/kg DS, acid fungal alpha-amylase 50 AFAU/g DS.

Total dry solids starch was determined using the following method. The starch was completely hydrolyzed by adding an excess amount of endo-amylase (300 KNU/Kg dry solids) and placing the sample in an oil bath at 95° C. for 45 minutes. Subsequently the samples were cooled to 60° C. and an excess amount of glucoamylase (600 AGU/kg DS) was added followed by incubation for 2 hours at 60° C.

Soluble dry solids in the starch hydrolysate were determined by refractive index measurement on samples after filtering through a 0.22 microM filter. The sugar profile was determined by HPLC. The amount of glucose was calculated as DX. The results are shown in tables 2 and 3.

TABLE 2

Soluble dry solids as percentage of total dry substance at 100 KNU/kg DS endo-amylase dosage.

| Enzyme | 24 hours | 48 hours | 73 hours | 94 hours |
|---|---|---|---|---|
| Endo-amylase | 83.7 | 87 | 89.7 | 90.3 |
| Endo-amylase + CBM | 87.2 | 89.7 | 91.5 | 92.3 |

TABLE 3

The DX of the soluble hydrolysate at 100 KNU/kg DS endo-amylase dosage.

| Enzyme | 24 hours | 48 hours | 73 hours | 94 hours |
|---|---|---|---|---|
| Endo-amylase | 72.0 | 82.0 | 83.8 | 83.8 |
| Endo-amylase + CBM | 76.7 | 87.0 | 87.5 | 87.5 |

EXAMPLE 5

Effective Dosage

The "effective dosage" of the amylase in question is defined as the dosage resulting in a reduction in firmness of more than 10%, e.g., of between 10 and 20%, compared to the firmness of a bread without enzymes (the control). The reduction in firmness is measured after storage for 14 days in inert atmosphere at room temperature.

Tolerance towards overdosing is measured by using the Elasticity Loss Ratio=ELR. ELR is measured day 1 after baking or later, such as day 5, day 10 or as in the example below after 14 days storage and is defined then as follows:

$$ELR\% = (Elasticity_{control\,day\,14} - Elasticity_{amylase\,day\,14} \times 100)/Elasticity_{control\,day\,14}$$

In combination with 450 MANU/kg flour Novamyl® the tolerance towards overdosing is measured:

$$ELR_N\% = (Elasticity_{Novamyl\,day\,14} - Elasticity_{Novamyl+amylase\,day\,14} \times 100)/Elasticity_{Novoamyl\,day\,14}$$

If the amylase is overdosed the ELR and/or $ELR_N$ will be >5%.

Baking Process

Bread is baked according to the sponge & dough method.

| Sponge, ingredients as % on flour basis | |
|---|---|
| Soya oil | 2.5 |
| SSL | 0.38 |
| Yeast | 5 |
| Wheat flour | 60 |
| Water | 62 |

| Dough, ingredients as % on flour basis | |
|---|---|
| Ascorbic acid | to be optimized for each flour |
| ADA | 20 ppm |
| Salt | 2 |

-continued

| Dough, ingredients as % on flour basis | |
|---|---|
| Sirup | 7 (dry substance) |
| Water | to be optimized for each flour |
| Wheat flour | 40 |
| Calcium propionate + enzymes | 0.25 |

The sponge ingredients yeast, water, flour, SSL and oil are mixed at 90 rpm for 1 minute, 150 rpm for 4 minutes. The sponge is set for fermentation for 3 hours at 27° C. and 86% RH.

The sponge is added the dough ingredients and mixed to a dough at 90 rpm for 1 minute and at 150 rpm for 14 minutes. The dough is scaled into pieces of 340 g each and rested for 10 minutes.

The dough portions are sheeted and molded followed by fermentation at 55 minutes at 42° C. and 86% RH. The doughs are baked at 225° C. for 15 minutes. The baked bread are cooled and stored until analysis.

Bread is baked with the CBM-hybrid enzyme and with the corresponding enzyme without a CBM. The effective dose is determined with and without addition of Novamyl® at 450 MANU/kg flour. Firmness and elasticity of a bread are measured by the TA.XT2 texture analyzer according to AACC method 74-09.

The effective dosage of the CBM-hybrid enzyme is determined and a new set of bread is baked with 3 and 5 times the effective dosage with and without addition of Novamyl® at 450 MAN U/kg flour.

The ELR is measured after 14 days of storage, and it is found that the ELR as well as the $ELR_N$ is less than 5% for the amylase with CBM dosed 5 times the effective dosage whereas it is more than 5% for the corresponding enzymes without addition of the CBM dosed 3 times the effective dose.

EXAMPLE 6

Determination of ELR for Selected Variants

Example 6 was performed as described in Example 5 except that a dosage of 500 MANU/kg flour was used.

Two variants of a hybrid comprising the alkaline *Bacillus* species AA560 endo-amylase (SEQ ID NO:40) and the CBM20 from the *B. flavothermus* amylase (residues 485 to 586 in SEQ ID NO:2) were used: The variant BE1 comprising the following alterations in the amylase sequence: R118K, D183*, G184*, N195F, R320K, R458K, N33S, D36N, K37L, E391I, Q394R, K395D, T452Y and N484P, and the variant BE2 comprising of the following alterations in the amylase sequence: R118K, D183*, G184*, N195F, R320K, R458K and N484P.

TABLE 1

Application of hybrid-amylase (1 mg/kg flour) without Novamyl

| Treatment | Firmness on day15 (g) | Firmness reduction in % of control day15 | Elasticity g/g | ELR % |
|---|---|---|---|---|
| Control | 794 | | 39.9 | |
| BE1 | 382 | 51 | 47.0 | −17.0 |
| BE2 | 313 | 61 | 46.6 | −16.8 |

TABLE 2

Application of hybrid-amylase in combination with Novamyl

| Treatment | Firmness on Day15 (g) | Firmness reduction in % of control day15 | Elasticity g/g | ELR % |
|---|---|---|---|---|
| Control | 706 | | 40.8 | |
| BE1 0.5 mg/kg flour | 316 | 55 | 46.9 | −4.5 |
| BE1 1 mg/kg flour | 239 | 66 | 47.0 | −4.9 |
| BE2 0.5 mg/kg flour | 315 | 55 | 47.0 | −4.9 |
| BE2 1 mg/kg flour | 225 | 68 | 47.5 | −6.0 |
| Only Novamyl ® 500 MANU/kg flour | 452 | | 44.8 | |

EXAMPLE 7

Batter Cake

Batter cake dough was prepared with hybrids BE1, BE2, the *Bacillus* amylase shown in SEQ ID NO:40 (CD donor homologue) and the *Bacillus* amylases SEQ ID NO:2 (CBM donor).

The dough was made from a commercial batter cake mix "Tegral Allegro" from Puratos consisting of wheat flour, sugar, baking powder, emulsifier (mono- and diglycerides of fatty acids). The cake mix, enzyme (4 mg/kg flour) and water was place in a bowl and beat with a spatula, Bear AR 5 A-Vari-mixer, at third speed until a smooth homogeneous mixture was obtained (approximately 2 minutes). Molds were filled with 300 g dough and baked at 180° C. for 45 minutes. The baked cakes were cooled at room temperature for 30 minutes and packed in nitrogen before storage at room temperature until analysis.

Mobility of free water was determined using low field NMR as described by Chen, Long, Ruan and Labuza, 1997, Nuclear Magnetic Resonance Studies of water Mobility in bread during Storage. *Lebensmittel Wissenschaft and Technologie* 30: 178-183.

Hardness and cohesiveness was measured according to the method described in Food Texture and viscosity, $2^{nd}$ edition, Malcolm Bourne, Food Science and Technology, International Series, Academic Press, page 182-186.

All data were measured after 14 days. The following results were obtained:

| Treatment | Hardness units | Cohesiveness units | Mobility units |
|---|---|---|---|
| Reference | 1485 | 34 | 4148 |
| BE1 9.5 KNU/kg flour | 1482 | 35 | 4655 |
| Amyl1 9.5 KNU/kg flour | 1702 | 35 | 4811 |
| BE3 9.5 KNU/kg flour | 1217 | 34 | 4797 |
| BAN (SEQ ID NO: 37) 9.5 KNU/kg flour | 1456 | 32 | 4423 |

Based on the above data the following parameters (I)-(III) were calculated:

$$\text{Cohesiveness reduction \%} = (\text{Cohesiveness}_{Reference} - \text{Cohesiveness}_{amylase}) \times 100\% / \text{Cohesiveness}_{Reference} \quad (I)$$

$$d\text{Hardness} = \text{Hardness}_{Reference} - \text{Hardness}_{Amylase} \quad (II)$$

$$d\text{Mobility} = \text{Mobility}_{Amylase} - \text{Mobility}_{Reference} \quad (III)$$

| Treatment | Cohesiveness Reduction % | dHardness units | dMobility units |
|---|---|---|---|
| Reference | | | |
| BE1 9.5 KNU/kg flour | −3 | 3 | 507 |
| Amyl1 9.5 KNU/kg flour | −3 | −217 | 663 |
| BE3 9.5 KNU/kg flour | 0 | 268 | 649 |
| BAN (SEQ ID NO: 37) 9.5 KNU/kg flour | 5.8 | 20 | 275 |

Amyl1 is identical to the amylase of SEQ ID NO: 40 with the following substitutions: R118K, D183*, G184*, N195F, R320K, R458K, N33S, D36N, K37L, E391I, Q394R, K395D, T452Y and N484P, using the numbering of SEQ ID NO: 40.

EXAMPLE 8

Sponge and Dough

Bread was baked according to the sponge & dough method. Bread was stored at room temperature for 14 days until analysis. Hardness and cohesiveness was measured according to the method described in Food Texture and viscosity, 2 edition, Malcolm Bourne, Food Science and Technology, International Series, Academic Press, page 182-186, and mobility of free water was determined using low field NMR as described by Chen, Long, Ruan and Labuza, 1997, Nuclear Magnetic Resonance Studies of water Mobility in bread during Storage. Lebensmittel Wissenschaft and Technologie 30: 178-183. Three amylases were used; the variants BE1 and BE3 and the *Bacillus amylase* SEQ ID NO:2 (CBM donor). The variant BE3 has a the catalytic domain having the amino acid sequence as shown in SEQ ID NO: 37 and comprise one or more, e.g., such as all of the following alterations: S31A, D32N, I33L, E178*, G179*, N190F, K389I, K392R, E393D, V508A and a CBM having the amino acid sequence shown as amino acid residues 485 to 586 in SEQ ID NO:2.

All data were measured after 14 days. The following results were obtained:

| Treatment | Hardness units | Cohesiveness units | Mobility units |
|---|---|---|---|
| Reference | 400 | 38 | 6435 |
| Novamyl 300 MANU/kg flour | 272 | 48 | 6234 |
| BE3 0.05 mg/kg flour + Novamyl 300 MANU/kg flour | 256 | 48 | 7365 |
| BAN (SEQ ID NO: 37) 0.05 mg/kg flour + Novamyl 300 MANU/kg flour | 207 | 45 | 7354 |
| BE3 0.15 mg/kg flour | 223 | 48 | 6886 |
| BE1 0.5 mg/kg flour | 311 | 41 | 7152 |

Based on the above data the following parameters (I)-(VI) were calculated:

For treatments without Novamyl®

$$\text{Cohesiveness reduction \%} = (\text{Cohesiveness}_{Reference} - \text{Cohesiveness}_{amylase}) \times 100\% / \text{Cohesiveness}_{Reference} \quad (I)$$

$$d\text{Hardness} = \text{Hardness}_{Reference} - \text{Hardness}_{Amylase} \quad (II)$$

$$d\text{Mobility} = \text{Mobility}_{Amylase} - \text{Mobility}_{Reference} \quad (III)$$

For treatments with Novamyl®

$$\text{Cohesiveness reduction \%} = (\text{Cohesiveness}_{Novamyl} - \text{Cohesiveness}_{amylase+Novamyl}) \times 100\% / \text{Cohesiveness}_{Novamyl} \quad (IV)$$

$$d\text{Hardness} = \text{Hardness}_{Novamyl} - \text{Hardness}_{Amoase+Novamyl} \quad (V)$$

$$d\text{Mobility} = \text{Mobility}_{Amylase+Novoamyl} - \text{Mobility}_{Novoamyl} \quad (VI)$$

| Treatment | Cohesiveness reduction % | dHardness units | dMobility units |
|---|---|---|---|
| Reference | | | |
| Novamyl 300 MANU/kg flour | | | |
| BE3 0.05 mg/kg flour + Novamyl 300 MANU/kg flour | 0 | 16 | 1131 |
| BAN (SEQ ID NO: 37) 0.05 mg/kg flour + Novamyl 300 MANU/kg flour | 6.3 | 65 | 1120 |
| BE3 0.15 mg/kg flour | −26 | 177 | 451 |
| BE1 0.5 mg/kg flour | −7.9 | 89 | 717 |

EXAMPLE 9

Determination of Thermostablity

The thermostability was determined at 60, 65 or 70° C. for 30 minutes in a 50 mM NaOAc, 1 mM $CaCl_2$ buffer at pH 5.7. The samples was cooled down and the residual activity was measured using the Phadebas method as describe in section Materials and Methods except that the determination took place at 50° C. The residual activity (R.A.) can be calculated according to the following equation: R.A. (%)=[Abs (heat treated)−Abs (blank)]/[Abs (heat treated at 60° C.)−Abs (blank)]*100%.

The following results were obtained:

Residual activity for Fungamyl, a well-known fungal baking amylase from *A. oryzae*, and to hybrid enzymes of the invention.

| Enzyme | 60° C. | 65° C. | 70° C. |
| --- | --- | --- | --- |
| Fungamyl | 100 | 4 | 2 |
| BE1 | 100 | 78 | 67 |
| BE3 | 100 | 80 | 27 |

---

The invention claimed is:

1. A hybrid polypeptide comprising:
   a) a first amino acid sequence having endo-amylase activity, and
   b) a second amino acid sequence comprising a carbohydrate-binding module, wherein the hybrid polypeptide has at least 90% identity to any amino acid sequence selected from the group consisting of SEQ ID NO: 4, SEQ ID NO: 6, SEQ ID NO: 10, SEQ ID NO: 12, and SEQ ID NO: 14.

2. The hybrid polypeptide of claim 1, which has at least 90% identity to the amino acid sequence of SEQ ID NO: 4.

3. The hybrid polypeptide of claim 1, wherein the amino acid sequence of the hybrid polypeptide differs from the amino acid sequence of SEQ ID NO: 4 in no more than 10 positions.

4. The hybrid polypeptide of claim 1, wherein the amino acid sequence of the hybrid polypeptide differs from the amino acid sequence of SEQ ID NO: 4 in no more than 5 positions.

5. The hybrid polypeptide of claim 1, which comprises the amino acid sequence of SEQ ID NO: 4.

6. The hybrid polypeptide of claim 1, which has at least 90% identity to the amino acid sequence of SEQ ID NO: 6.

7. The hybrid polypeptide of claim 1, wherein the amino acid sequence of the hybrid polypeptide differs from the amino acid sequence of SEQ ID NO: 6 in no more than 10 positions.

8. The hybrid polypeptide of claim 1, wherein the amino acid sequence of the hybrid polypeptide differs from the amino acid sequence of SEQ ID NO: 6 in no more than 5 positions.

9. The hybrid polypeptide of claim 1, which comprises the amino acid sequence of SEQ ID NO: 6.

10. The hybrid polypeptide of claim 1, which has at least 90% identity to the amino acid sequence of SEQ ID NO: 10.

11. The hybrid polypeptide of claim 1, wherein the amino acid sequence of the hybrid polypeptide differs from the amino acid sequence of SEQ ID NO: 10 in no more than 10 positions.

12. The hybrid polypeptide of claim 1, wherein the amino acid sequence of the hybrid polypeptide differs from the amino acid sequence of SEQ ID NO: 10 in no more than 5 positions.

13. The hybrid polypeptide of claim 1, which comprises the amino acid sequence of SEQ ID NO: 10.

14. The hybrid polypeptide of claim 1, which has at least 90% identity to the amino acid sequence of SEQ ID NO: 12.

15. The hybrid polypeptide of claim 1, wherein the amino acid sequence of the hybrid polypeptide differs from the amino acid sequence of SEQ ID NO: 12 in no more than 10 positions.

16. The hybrid polypeptide of claim 1, wherein the amino acid sequence of the hybrid polypeptide differs from the amino acid sequence of SEQ ID NO: 12 in no more than 5 positions.

17. The hybrid polypeptide of claim 1, which comprises the amino acid sequence of SEQ ID NO: 12.

18. The hybrid polypeptide of claim 1, the hybrid polypeptide has at least 90% identity to the amino acid sequence of SEQ ID NO: 14.

19. The hybrid polypeptide of claim 1, wherein the amino acid sequence of the hybrid polypeptide differs from the amino acid sequence of SEQ ID NO: 14 in no more than 10 positions.

20. The hybrid polypeptide of claim 1, wherein the amino acid sequence of the hybrid polypeptide differs from the amino acid sequence of SEQ ID NO: 14 in no more than 5 positions.

21. The hybrid polypeptide of claim 1, which comprises the amino acid sequence of SEQ ID NO: 14.

22. A composition which comprises flour and a hybrid polypeptide of claim 1.

23. A dough- or bread-improving additive in the form of a granulate or agglomerated powder comprising a hybrid polypeptide of claim 1.

24. A process for producing a baked product, comprising baking a dough in the presence of a hybrid polypeptide of claim 1.

25. The process of claim 24, wherein the baked product is a bread.

26. A process for saccharifying starch, comprising treating a starch with a hybrid polypeptide of claim 1.

27. A process of producing a fermentation product, comprising
(a) liquefying a starch-containing material with a hybrid polypeptide of claim 1 to produce a liquefied mash;
(b) saccharifying the liquefied mash to produce a saccharified material;
(c) fermenting the saccharified material in the presence of a fermenting organism.

28. The process of claim 27, further comprising recovery the fermentation product.

29. The process of claim 27, wherein the fermentation product is ethanol.

30. A hybrid polypeptide comprising:
a) a first amino acid sequence having endo-amylase activity, and
b) a second amino acid sequence comprising a carbohydrate-binding module, wherein the amino acid sequence of the hybrid polypeptide differs from the amino acid sequence of SEQ ID NO: 8 in no more than 10 positions.

31. The hybrid polypeptide of claim 30, wherein the amino acid sequence of the hybrid polypeptide differs from the amino acid sequence of SEQ ID NO: 8 in no more than 5 positions.

32. The hybrid polypeptide of claim 30, which comprises the amino acid sequence of SEQ ID NO: 8.

33. A composition which comprises flour and a hybrid polypeptide of claim 30.

34. A dough- or bread-improving additive in the form of a granulate or agglomerated powder comprising a hybrid polypeptide of claim 30.

35. A process for producing a baked product, comprising baking a dough in the presence of a hybrid polypeptide of claim 30.

36. The process of claim 35, wherein the baked product is a bread.

37. A process for saccharifying starch, comprising treating a starch with a hybrid polypeptide of claim 30.

38. A process of producing a fermentation product, comprising
(a) liquefying a starch-containing material with a hybrid polypeptide of claim 30 to produce a liquefied mash;
(b) saccharifying the liquefied mash to produce a saccharified material;
(c) fermenting the saccharified material in the presence of a fermenting organism.

39. The process of claim 38, further comprising recovery the fermentation product.

40. The process of claim 38, wherein the fermentation product is ethanol.

* * * * *

SEQUENCE LISTING

```
<160> NUMBER OF SEQ ID NOS: 42

<210> SEQ ID NO 1
<211> LENGTH: 1758
<212> TYPE: DNA
<213> ORGANISM: Bacillus flavothermus
<220> FEATURE:
<221> NAME/KEY: CDS
<222> LOCATION: (1)..(1758)

<400> SEQUENCE: 1 gga agt gtg ccg gta aat ggc aca atg atg caa tat ttc gaa tgg tac      48
Gly Ser Val Pro Val Asn Gly Thr Met Met Gln Tyr Phe Glu Trp Tyr
1               5                   10                  15 ctt cca gac gat gga aca cta tgg acg aaa gta gca aat aac gct caa      96
Leu Pro Asp Asp Gly Thr Leu Trp Thr Lys Val Ala Asn Asn Ala Gln
            20                  25                  30 tct tta gcg aat ctt ggc att act gcc ctt tgg ctt ccc cct gcc tat     144
Ser Leu Ala Asn Leu Gly Ile Thr Ala Leu Trp Leu Pro Pro Ala Tyr
        35                  40                  45 aaa gga aca agc agc agt gac gtt gga tat ggc gtt tat gat tta tat     192
Lys Gly Thr Ser Ser Ser Asp Val Gly Tyr Gly Val Tyr Asp Leu Tyr
    50                  55                  60 gac ctt gga gag ttt aat caa aaa gga act gtc cga aca aaa tac ggg     240
Asp Leu Gly Glu Phe Asn Gln Lys Gly Thr Val Arg Thr Lys Tyr Gly
65                  70                  75                  80 aca aaa aca caa tat atc caa gca atc caa gcg gcg cat aca gca ggg     288
Thr Lys Thr Gln Tyr Ile Gln Ala Ile Gln Ala Ala His Thr Ala Gly
            85                  90                  95 atg caa gta tat gca gat gtc gtc ttt aac cat aaa gcc ggt gca gat     336
Met Gln Val Tyr Ala Asp Val Val Phe Asn His Lys Ala Gly Ala Asp
        100                 105                 110 gga aca gaa cta gtc gat gca gta gaa gta aat cct tct gac cgc aat     384
Gly Thr Glu Leu Val Asp Ala Val Glu Val Asn Pro Ser Asp Arg Asn
    115                 120                 125 caa gaa ata tca gga aca tat caa atc caa gcg tgg aca aaa ttt gat     432
Gln Glu Ile Ser Gly Thr Tyr Gln Ile Gln Ala Trp Thr Lys Phe Asp
130                 135                 140 ttt cct ggt cgt gga aac acc tat tct agt ttt aaa tgg cgt tgg tat     480
Phe Pro Gly Arg Gly Asn Thr Tyr Ser Ser Phe Lys Trp Arg Trp Tyr
145                 150                 155                 160 cat ttc gat gga acg gac tgg gat gag agt aga aaa cta aat cgt att     528
His Phe Asp Gly Thr Asp Trp Asp Glu Ser Arg Lys Leu Asn Arg Ile
            165                 170                 175 tac aag ttc cgc ggc acg gga aaa gca tgg gat tgg gaa gta gat aca     576
Tyr Lys Phe Arg Gly Thr Gly Lys Ala Trp Asp Trp Glu Val Asp Thr
        180                 185                 190
```

```
gaa aac ggg aat tat gac tat ctc atg tat gca gat tta gat atg gat    624
Glu Asn Gly Asn Tyr Asp Tyr Leu Met Tyr Ala Asp Leu Asp Met Asp
        195                 200                 205 cat cca gag gtt gta tcc gaa cta aaa aat tgg gga aag tgg tat gta    672
His Pro Glu Val Val Ser Glu Leu Lys Asn Trp Gly Lys Trp Tyr Val
210                 215                 220 acc aca acc aat atc gac gga ttc cgt ctg gat gca gtg aag cat att    720
Thr Thr Thr Asn Ile Asp Gly Phe Arg Leu Asp Ala Val Lys His Ile
225                 230                 235                 240 aaa tat agc ttt ttc ccg gac tgg cta tcg tac gta cga acc caa aca    768
Lys Tyr Ser Phe Phe Pro Asp Trp Leu Ser Tyr Val Arg Thr Gln Thr
            245                 250                 255 caa aag cct ctt ttt gcc gtt ggg gaa ttt tgg agc tat gac att agc    816
Gln Lys Pro Leu Phe Ala Val Gly Glu Phe Trp Ser Tyr Asp Ile Ser
        260                 265                 270 aag ttg cac aac tat att aca aag acg aac ggc tct atg tcc cta ttc    864
Lys Leu His Asn Tyr Ile Thr Lys Thr Asn Gly Ser Met Ser Leu Phe
    275                 280                 285 gat gcc ccg ctg cat aac aat ttt tat ata gca tcg aaa tca ggc ggt    912
Asp Ala Pro Leu His Asn Asn Phe Tyr Ile Ala Ser Lys Ser Gly Gly
290                 295                 300 tat ttt gat atg cgc aca tta ctc aac aac aca ttg atg aaa gat cag    960
Tyr Phe Asp Met Arg Thr Leu Leu Asn Asn Thr Leu Met Lys Asp Gln
305                 310                 315                 320 cct aca tta gca gtc aca tta gtg gat aat cac gat act gag cca ggg   1008
Pro Thr Leu Ala Val Thr Leu Val Asp Asn His Asp Thr Glu Pro Gly
            325                 330                 335 caa tct ctg cag tca tgg gtc gag cca tgg ttt aaa ccg tta gct tac   1056
Gln Ser Leu Gln Ser Trp Val Glu Pro Trp Phe Lys Pro Leu Ala Tyr
        340                 345                 350 gca ttt atc ttg acc cgc caa gaa ggt tat cct tgc gtc ttt tat gga   1104
Ala Phe Ile Leu Thr Arg Gln Glu Gly Tyr Pro Cys Val Phe Tyr Gly
    355                 360                 365 gat tac tat ggt att cca aaa tac aac att cct gcg ctg aaa agc aaa   1152
Asp Tyr Tyr Gly Ile Pro Lys Tyr Asn Ile Pro Ala Leu Lys Ser Lys
370                 375                 380 ctt gat ccg ctg tta att gcc aga aga gat tat gcc tat gga aca cag   1200
Leu Asp Pro Leu Leu Ile Ala Arg Arg Asp Tyr Ala Tyr Gly Thr Gln
385                 390                 395                 400 cac gac tat att gac agt gcg gat att atc ggt tgg acg cgg gaa gga   1248
His Asp Tyr Ile Asp Ser Ala Asp Ile Ile Gly Trp Thr Arg Glu Gly
            405                 410                 415 gtg gct gaa aaa gca aat tca gga ctg gct gca ctc att acc gac ggg   1296
Val Ala Glu Lys Ala Asn Ser Gly Leu Ala Ala Leu Ile Thr Asp Gly
        420                 425                 430 cct ggc gga agc aaa tgg atg tat gtt gga aaa caa cac gct ggc aaa   1344
Pro Gly Gly Ser Lys Trp Met Tyr Val Gly Lys Gln His Ala Gly Lys
    435                 440                 445 acg ttt tat gat tta acc ggc aat cga agt gat aca gtg aca atc aat   1392
Thr Phe Tyr Asp Leu Thr Gly Asn Arg Ser Asp Thr Val Thr Ile Asn
450                 455                 460 gct gat gga tgg gga gaa ttt aaa gtc aat ggg ggt tct gta tcc ata   1440
Ala Asp Gly Trp Gly Glu Phe Lys Val Asn Gly Gly Ser Val Ser Ile
465                 470                 475                 480 tgg gtt cca aaa ata agt act act tcc caa ata aca ttt act gta aat   1488
Trp Val Pro Lys Ile Ser Thr Thr Ser Gln Ile Thr Phe Thr Val Asn
            485                 490                 495 aac gcc aca acc gtt tgg gga caa aat gta tac gtt gtc ggg aat att   1536
Asn Ala Thr Thr Val Trp Gly Gln Asn Val Tyr Val Val Gly Asn Ile
        500                 505                 510
```

```
tcg cag ctg ggg aac tgg gat cca gtc cac gca gtt caa atg acg ccg    1584
Ser Gln Leu Gly Asn Trp Asp Pro Val His Ala Val Gln Met Thr Pro
    515                 520                 525 tct tct tat cca aca tgg act gta aca atc cct ctt ctt caa ggg caa    1632
Ser Ser Tyr Pro Thr Trp Thr Val Thr Ile Pro Leu Leu Gln Gly Gln
530                 535                 540 aac ata caa ttt aaa ttt atc aaa aaa gat tca gct gga aat gtc att    1680
Asn Ile Gln Phe Lys Phe Ile Lys Lys Asp Ser Ala Gly Asn Val Ile
545                 550                 555                 560 tgg gaa gat ata tcg aat cga aca tac acc gtc cca act gct gca tcc    1728
Trp Glu Asp Ile Ser Asn Arg Thr Tyr Thr Val Pro Thr Ala Ala Ser
                565                 570                 575 gga gca tat aca gcc agc tgg aac gtg ccc                            1758
Gly Ala Tyr Thr Ala Ser Trp Asn Val Pro
            580                 585

<210> SEQ ID NO 2
<211> LENGTH: 586
<212> TYPE: PRT
<213> ORGANISM: Bacillus flavothermus

<400> SEQUENCE: 2

Gly Ser Val Pro Val Asn Gly Thr Met Met Gln Tyr Phe Glu Trp Tyr
1               5                   10                  15

Leu Pro Asp Asp Gly Thr Leu Trp Thr Lys Val Ala Asn Asn Ala Gln
            20                  25                  30

Ser Leu Ala Asn Leu Gly Ile Thr Ala Leu Trp Leu Pro Pro Ala Tyr
        35                  40                  45

Lys Gly Thr Ser Ser Ser Asp Val Gly Tyr Gly Val Tyr Asp Leu Tyr
    50                  55                  60

Asp Leu Gly Glu Phe Asn Gln Lys Gly Thr Val Arg Thr Lys Tyr Gly
65                  70                  75                  80

Thr Lys Thr Gln Tyr Ile Gln Ala Ile Gln Ala Ala His Thr Ala Gly
                85                  90                  95

Met Gln Val Tyr Ala Asp Val Val Phe Asn His Lys Ala Gly Ala Asp
            100                 105                 110

Gly Thr Glu Leu Val Asp Ala Val Glu Val Asn Pro Ser Asp Arg Asn
        115                 120                 125

Gln Glu Ile Ser Gly Thr Tyr Gln Ile Gln Ala Trp Thr Lys Phe Asp
    130                 135                 140

Phe Pro Gly Arg Gly Asn Thr Tyr Ser Ser Phe Lys Trp Arg Trp Tyr
145                 150                 155                 160

His Phe Asp Gly Thr Asp Trp Asp Glu Ser Arg Lys Leu Asn Arg Ile
                165                 170                 175

Tyr Lys Phe Arg Gly Thr Gly Lys Ala Trp Asp Trp Glu Val Asp Thr
            180                 185                 190

Glu Asn Gly Asn Tyr Asp Tyr Leu Met Tyr Ala Asp Leu Asp Met Asp
        195                 200                 205

His Pro Glu Val Val Ser Glu Leu Lys Asn Trp Gly Lys Trp Tyr Val
    210                 215                 220

Thr Thr Thr Asn Ile Asp Gly Phe Arg Leu Asp Ala Val Lys His Ile
225                 230                 235                 240

Lys Tyr Ser Phe Phe Pro Asp Trp Leu Ser Tyr Val Arg Thr Gln Thr
                245                 250                 255

Gln Lys Pro Leu Phe Ala Val Gly Glu Phe Trp Ser Tyr Asp Ile Ser
            260                 265                 270

Lys Leu His Asn Tyr Ile Thr Lys Thr Asn Gly Ser Met Ser Leu Phe
```

```
                275                 280                 285
Asp Ala Pro Leu His Asn Asn Phe Tyr Ile Ala Ser Lys Ser Gly Gly
            290                 295                 300

Tyr Phe Asp Met Arg Thr Leu Leu Asn Asn Thr Leu Met Lys Asp Gln
305                 310                 315                 320

Pro Thr Leu Ala Val Thr Leu Val Asp Asn His Asp Thr Glu Pro Gly
                325                 330                 335

Gln Ser Leu Gln Ser Trp Val Glu Pro Trp Phe Lys Pro Leu Ala Tyr
            340                 345                 350

Ala Phe Ile Leu Thr Arg Gln Glu Gly Tyr Pro Cys Val Phe Tyr Gly
            355                 360                 365

Asp Tyr Tyr Gly Ile Pro Lys Tyr Asn Ile Pro Ala Leu Lys Ser Lys
        370                 375                 380

Leu Asp Pro Leu Leu Ile Ala Arg Arg Asp Tyr Ala Tyr Gly Thr Gln
385                 390                 395                 400

His Asp Tyr Ile Asp Ser Ala Asp Ile Ile Gly Trp Thr Arg Glu Gly
                405                 410                 415

Val Ala Glu Lys Ala Asn Ser Gly Leu Ala Ala Leu Ile Thr Asp Gly
            420                 425                 430

Pro Gly Gly Ser Lys Trp Met Tyr Val Gly Lys Gln His Ala Gly Lys
        435                 440                 445

Thr Phe Tyr Asp Leu Thr Gly Asn Arg Ser Asp Thr Val Thr Ile Asn
    450                 455                 460

Ala Asp Gly Trp Gly Glu Phe Lys Val Asn Gly Gly Ser Val Ser Ile
465                 470                 475                 480

Trp Val Pro Lys Ile Ser Thr Ser Gln Ile Thr Phe Thr Val Asn
                485                 490                 495

Asn Ala Thr Thr Val Trp Gly Gln Asn Val Tyr Val Val Gly Asn Ile
            500                 505                 510

Ser Gln Leu Gly Asn Trp Asp Pro Val His Ala Val Gln Met Thr Pro
        515                 520                 525

Ser Ser Tyr Pro Thr Trp Thr Val Thr Ile Pro Leu Leu Gln Gly Gln
    530                 535                 540

Asn Ile Gln Phe Lys Phe Ile Lys Lys Asp Ser Ala Gly Asn Val Ile
545                 550                 555                 560

Trp Glu Asp Ile Ser Asn Arg Thr Tyr Thr Val Pro Thr Ala Ala Ser
                565                 570                 575

Gly Ala Tyr Thr Ala Ser Trp Asn Val Pro
            580                 585

<210> SEQ ID NO 3
<211> LENGTH: 1755
<212> TYPE: DNA
<213> ORGANISM: BLA-CBM hybrid
<220> FEATURE:
<221> NAME/KEY: CDS
<222> LOCATION: (1)..(1755)

<400> SEQUENCE: 3 gca aat ctt aat ggg acg ctg atg cag tat ttt gaa tgg tac atg ccc    48
Ala Asn Leu Asn Gly Thr Leu Met Gln Tyr Phe Glu Trp Tyr Met Pro
1               5                  10                  15 aat gac ggc caa cat tgg agg cgt ttg caa aac gac tcg gca tat ttg    96
Asn Asp Gly Gln His Trp Arg Arg Leu Gln Asn Asp Ser Ala Tyr Leu
            20                  25                  30 gct gaa cac ggt att act gcc gtc tgg att ccc ccg gca tat aag gga   144
Ala Glu His Gly Ile Thr Ala Val Trp Ile Pro Pro Ala Tyr Lys Gly
```

-continued

```
              35                  40                  45
acg agc caa gcg gat gtg ggc tac ggt gct tac gac ctt tat gat tta        192
Thr Ser Gln Ala Asp Val Gly Tyr Gly Ala Tyr Asp Leu Tyr Asp Leu
 50                  55                  60 ggg gag ttt cat caa aaa ggg acg gtt cgg aca aag tac ggc aca aaa        240
Gly Glu Phe His Gln Lys Gly Thr Val Arg Thr Lys Tyr Gly Thr Lys
 65                  70                  75                  80 gga gag ctg caa tct gcg atc aaa agt ctt cat tcc cgc gac att aac        288
Gly Glu Leu Gln Ser Ala Ile Lys Ser Leu His Ser Arg Asp Ile Asn
                     85                  90                  95 gtt tac ggg gat gtg gtc atc aac cac aaa ggc ggc gct gat gcg acc        336
Val Tyr Gly Asp Val Val Ile Asn His Lys Gly Gly Ala Asp Ala Thr
                100                 105                 110 gaa gat gta acc gcg gtt gaa gtc gat ccc gct gac cgc aac cgc gta        384
Glu Asp Val Thr Ala Val Glu Val Asp Pro Ala Asp Arg Asn Arg Val
                115                 120                 125 att tca gga gaa cac cta att aaa gcc tgg aca cat ttt cat ttt ccg        432
Ile Ser Gly Glu His Leu Ile Lys Ala Trp Thr His Phe His Phe Pro
130                 135                 140 ggg cgc ggc agc aca tac agc gat ttt aaa tgg cat tgg tac cat ttt        480
Gly Arg Gly Ser Thr Tyr Ser Asp Phe Lys Trp His Trp Tyr His Phe
145                 150                 155                 160 gac gga acc gat tgg gac gag tcc cga aag ctg aac cgc atc tat aag        528
Asp Gly Thr Asp Trp Asp Glu Ser Arg Lys Leu Asn Arg Ile Tyr Lys
                165                 170                 175 ttt caa gga aag gct tgg gat tgg gaa gtt tcc aat gaa aac ggc aac        576
Phe Gln Gly Lys Ala Trp Asp Trp Glu Val Ser Asn Glu Asn Gly Asn
                180                 185                 190 tat gat tat ttg atg tat gcc gac atc gat tat gac cat cct gat gtc        624
Tyr Asp Tyr Leu Met Tyr Ala Asp Ile Asp Tyr Asp His Pro Asp Val
                195                 200                 205 gca gca gaa att aag aga tgg ggc act tgg tat gcc aat gaa ctg caa        672
Ala Ala Glu Ile Lys Arg Trp Gly Thr Trp Tyr Ala Asn Glu Leu Gln
210                 215                 220 ttg gac ggt ttc cgt ctt gat gct gtc aaa cac att aaa ttt tct ttt        720
Leu Asp Gly Phe Arg Leu Asp Ala Val Lys His Ile Lys Phe Ser Phe
225                 230                 235                 240 ttg cgg gat tgg gtt aat cat gtc agg gaa aaa acg ggg aag gaa atg        768
Leu Arg Asp Trp Val Asn His Val Arg Glu Lys Thr Gly Lys Glu Met
                245                 250                 255 ttt acg gta gct gaa tat tgg cag aat gac ttg ggc gcg ctg gaa aac        816
Phe Thr Val Ala Glu Tyr Trp Gln Asn Asp Leu Gly Ala Leu Glu Asn
                260                 265                 270 tat ttg aac aaa aca aat ttt aat cat tca gtg ttt gac gtg ccg ctt        864
Tyr Leu Asn Lys Thr Asn Phe Asn His Ser Val Phe Asp Val Pro Leu
                275                 280                 285 cat tat cag ttc cat gct gca tcg aca cag gga ggc ggc tat gat atg        912
His Tyr Gln Phe His Ala Ala Ser Thr Gln Gly Gly Gly Tyr Asp Met
                290                 295                 300 agg aaa ttg ctg aac ggt acg gtc gtt tcc aag cat ccg ttg aaa tcg        960
Arg Lys Leu Leu Asn Gly Thr Val Val Ser Lys His Pro Leu Lys Ser
305                 310                 315                 320 gtt aca ttt gtc gat aac cat gat aca cag ccg ggg caa tcg ctt gag       1008
Val Thr Phe Val Asp Asn His Asp Thr Gln Pro Gly Gln Ser Leu Glu
                325                 330                 335 tcg act gtc caa aca tgg ttt aag ccg ctt gct tac gct ttt att ctc       1056
Ser Thr Val Gln Thr Trp Phe Lys Pro Leu Ala Tyr Ala Phe Ile Leu
                340                 345                 350 aca agg gaa tct gga tac cct cag gtt ttc tac ggg gat atg tac ggg       1104
Thr Arg Glu Ser Gly Tyr Pro Gln Val Phe Tyr Gly Asp Met Tyr Gly
```

```
                    355                 360                 365
acg aaa gga gac tcc cag cgc gaa att cct gcc ttg aaa cac aaa att    1152
Thr Lys Gly Asp Ser Gln Arg Glu Ile Pro Ala Leu Lys His Lys Ile
370                 375                 380 gaa ccg atc tta aaa gcg aga aaa cag tat gcg tac gga gca cag cat    1200
Glu Pro Ile Leu Lys Ala Arg Lys Gln Tyr Ala Tyr Gly Ala Gln His
385                 390                 395                 400 gat tat ttc gac cac cat gac att gtc ggc tgg aca agg gaa ggc gac    1248
Asp Tyr Phe Asp His His Asp Ile Val Gly Trp Thr Arg Glu Gly Asp
                405                 410                 415 agc tcg gtt gca aat tca ggt ttg gcg gca tta ata aca gac gga ccc    1296
Ser Ser Val Ala Asn Ser Gly Leu Ala Ala Leu Ile Thr Asp Gly Pro
            420                 425                 430 ggt ggg gca aag cga atg tat gtc ggc cgg caa aac gcc ggt gag aca    1344
Gly Gly Ala Lys Arg Met Tyr Val Gly Arg Gln Asn Ala Gly Glu Thr
        435                 440                 445 tgg cat gac att acc gga aac cgt tcg gag ccg gtt gtc atc aat tcg    1392
Trp His Asp Ile Thr Gly Asn Arg Ser Glu Pro Val Val Ile Asn Ser
450                 455                 460 gaa ggc tgg gga gag ttt cac gta aac ggc ggg tcg gtt tca att tat    1440
Glu Gly Trp Gly Glu Phe His Val Asn Gly Gly Ser Val Ser Ile Tyr
465                 470                 475                 480 gtt caa aga ata agt act act tcc caa ata aca ttt act gta aat aac    1488
Val Gln Arg Ile Ser Thr Thr Ser Gln Ile Thr Phe Thr Val Asn Asn
                485                 490                 495 gcc aca acc gtt tgg gga caa aat gta tac gtt gtc ggg aat att tcg    1536
Ala Thr Thr Val Trp Gly Gln Asn Val Tyr Val Val Gly Asn Ile Ser
            500                 505                 510 cag ctg ggg aac tgg gat cca gtc cac gca gtt caa atg acg ccg tct    1584
Gln Leu Gly Asn Trp Asp Pro Val His Ala Val Gln Met Thr Pro Ser
        515                 520                 525 tct tat cca aca tgg act gta aca atc cct ctt ctt caa ggg caa aac    1632
Ser Tyr Pro Thr Trp Thr Val Thr Ile Pro Leu Leu Gln Gly Gln Asn
530                 535                 540 ata caa ttt aaa ttt atc aaa aaa gat tca gct gga aat gtc att tgg    1680
Ile Gln Phe Lys Phe Ile Lys Lys Asp Ser Ala Gly Asn Val Ile Trp
545                 550                 555                 560 gaa gat ata tcg aat cga aca tac acc gtc cca act gct gca tcc gga    1728
Glu Asp Ile Ser Asn Arg Thr Tyr Thr Val Pro Thr Ala Ala Ser Gly
                565                 570                 575 gca tat aca gcc agc tgg aac gtg ccc                                1755
Ala Tyr Thr Ala Ser Trp Asn Val Pro
            580                 585

<210> SEQ ID NO 4
<211> LENGTH: 585
<212> TYPE: PRT
<213> ORGANISM: BLA-CBM hybrid

<400> SEQUENCE: 4

Ala Asn Leu Asn Gly Thr Leu Met Gln Tyr Phe Glu Trp Tyr Met Pro
1               5                   10                  15

Asn Asp Gly Gln His Trp Arg Arg Leu Gln Asn Asp Ser Ala Tyr Leu
            20                  25                  30

Ala Glu His Gly Ile Thr Ala Val Trp Ile Pro Pro Ala Tyr Lys Gly
        35                  40                  45

Thr Ser Gln Ala Asp Val Gly Tyr Gly Ala Tyr Asp Leu Tyr Asp Leu
    50                  55                  60

Gly Glu Phe His Gln Lys Gly Thr Val Arg Thr Lys Tyr Gly Thr Lys
65                  70                  75                  80
```

```
Gly Glu Leu Gln Ser Ala Ile Lys Ser Leu His Ser Arg Asp Ile Asn
                    85                  90                  95
Val Tyr Gly Asp Val Val Ile Asn His Lys Gly Gly Ala Asp Ala Thr
                100                 105                 110
Glu Asp Val Thr Ala Val Glu Val Asp Pro Ala Asp Arg Asn Arg Val
                115                 120                 125
Ile Ser Gly Glu His Leu Ile Lys Ala Trp Thr His Phe His Phe Pro
130                 135                 140
Gly Arg Gly Ser Thr Tyr Ser Asp Phe Lys Trp His Trp Tyr His Phe
145                 150                 155                 160
Asp Gly Thr Asp Trp Asp Glu Ser Arg Lys Leu Asn Arg Ile Tyr Lys
                165                 170                 175
Phe Gln Gly Lys Ala Trp Asp Trp Glu Val Ser Asn Glu Asn Gly Asn
                180                 185                 190
Tyr Asp Tyr Leu Met Tyr Ala Asp Ile Asp Tyr Asp His Pro Asp Val
                195                 200                 205
Ala Ala Glu Ile Lys Arg Trp Gly Thr Trp Tyr Ala Asn Glu Leu Gln
210                 215                 220
Leu Asp Gly Phe Arg Leu Asp Ala Val Lys His Ile Lys Phe Ser Phe
225                 230                 235                 240
Leu Arg Asp Trp Val Asn His Val Arg Glu Lys Thr Gly Lys Glu Met
                245                 250                 255
Phe Thr Val Ala Glu Tyr Trp Gln Asn Asp Leu Gly Ala Leu Glu Asn
                260                 265                 270
Tyr Leu Asn Lys Thr Asn Phe Asn His Ser Val Phe Asp Val Pro Leu
                275                 280                 285
His Tyr Gln Phe His Ala Ala Ser Thr Gln Gly Gly Tyr Asp Met
                290                 295                 300
Arg Lys Leu Leu Asn Gly Thr Val Val Ser Lys His Pro Leu Lys Ser
305                 310                 315                 320
Val Thr Phe Val Asp Asn His Asp Thr Gln Pro Gly Gln Ser Leu Glu
                325                 330                 335
Ser Thr Val Gln Thr Trp Phe Lys Pro Leu Ala Tyr Ala Phe Ile Leu
                340                 345                 350
Thr Arg Glu Ser Gly Tyr Pro Gln Val Phe Tyr Gly Asp Met Tyr Gly
                355                 360                 365
Thr Lys Gly Asp Ser Gln Arg Glu Ile Pro Ala Leu Lys His Lys Ile
370                 375                 380
Glu Pro Ile Leu Lys Ala Arg Lys Gln Tyr Ala Tyr Gly Ala Gln His
385                 390                 395                 400
Asp Tyr Phe Asp His His Asp Ile Val Gly Trp Thr Arg Glu Gly Asp
                405                 410                 415
Ser Ser Val Ala Asn Ser Gly Leu Ala Ala Leu Ile Thr Asp Gly Pro
                420                 425                 430
Gly Gly Ala Lys Arg Met Tyr Val Gly Arg Gln Asn Ala Gly Glu Thr
                435                 440                 445
Trp His Asp Ile Thr Gly Asn Arg Ser Glu Pro Val Val Ile Asn Ser
450                 455                 460
Glu Gly Trp Gly Glu Phe His Val Asn Gly Gly Ser Val Ser Ile Tyr
465                 470                 475                 480
Val Gln Arg Ile Ser Thr Thr Ser Gln Ile Thr Phe Thr Val Asn Asn
                485                 490                 495
Ala Thr Thr Val Trp Gly Gln Asn Val Tyr Val Val Gly Asn Ile Ser
```

```
                500                 505                 510
Gln Leu Gly Asn Trp Asp Pro Val His Ala Val Gln Met Thr Pro Ser
            515                 520                 525

Ser Tyr Pro Thr Trp Thr Val Thr Ile Pro Leu Leu Gln Gly Gln Asn
        530                 535                 540

Ile Gln Phe Lys Phe Ile Lys Lys Asp Ser Ala Gly Asn Val Ile Trp
545                 550                 555                 560

Glu Asp Ile Ser Asn Arg Thr Tyr Thr Val Pro Thr Ala Ala Ser Gly
                565                 570                 575

Ala Tyr Thr Ala Ser Trp Asn Val Pro
            580                 585

<210> SEQ ID NO 5
<211> LENGTH: 1749
<212> TYPE: DNA
<213> ORGANISM: Bacillus licheniformis-CBM
<220> FEATURE:
<221> NAME/KEY: CDS
<222> LOCATION: (1)..(1749)

<400> SEQUENCE: 5 gta aat ggc acg ctg atg cag tat ttt gaa tgg tat acg ccg aac gac      48
Val Asn Gly Thr Leu Met Gln Tyr Phe Glu Trp Tyr Thr Pro Asn Asp
1               5                   10                  15 ggc cag cat tgg aaa cga ttg cag aat gat gcg gaa cat tta tcg gat      96
Gly Gln His Trp Lys Arg Leu Gln Asn Asp Ala Glu His Leu Ser Asp
            20                  25                  30 atc ggt att act gcc gtc tgg att ccc ccg gca tat aag gga acg agc     144
Ile Gly Ile Thr Ala Val Trp Ile Pro Pro Ala Tyr Lys Gly Thr Ser
        35                  40                  45 caa gcg gat gtg ggc tac ggt gct tac gac ctt tat gat tta ggg gag     192
Gln Ala Asp Val Gly Tyr Gly Ala Tyr Asp Leu Tyr Asp Leu Gly Glu
    50                  55                  60 ttt cat caa aaa ggg acg gtt cgg aca aag tac ggc aca aaa gga gag     240
Phe His Gln Lys Gly Thr Val Arg Thr Lys Tyr Gly Thr Lys Gly Glu
65                  70                  75                  80 ctg caa tct gcg atc aaa agt ctt cat tcc cgc gac att aac gtt tac     288
Leu Gln Ser Ala Ile Lys Ser Leu His Ser Arg Asp Ile Asn Val Tyr
                85                  90                  95 ggg gat gtg gtc atc aac cac aaa ggc ggc gct gat gcg acc gaa gat     336
Gly Asp Val Val Ile Asn His Lys Gly Gly Ala Asp Ala Thr Glu Asp
            100                 105                 110 gta acc gcg gtt gaa gtc gat ccc gct gac cgc aac cgc gta att tca     384
Val Thr Ala Val Glu Val Asp Pro Ala Asp Arg Asn Arg Val Ile Ser
        115                 120                 125 gga gaa cac cta att aaa gcc tgg aca cat ttt cat ttt ccg ggg cgc     432
Gly Glu His Leu Ile Lys Ala Trp Thr His Phe His Phe Pro Gly Arg
    130                 135                 140 ggc agc aca tac agc gat ttt aag tgg tat tgg tac cat ttt gac gga     480
Gly Ser Thr Tyr Ser Asp Phe Lys Trp Tyr Trp Tyr His Phe Asp Gly
145                 150                 155                 160 acc gat tgg gac gag tcc cga aag ctg aac cgc atc tat aag ttt caa     528
Thr Asp Trp Asp Glu Ser Arg Lys Leu Asn Arg Ile Tyr Lys Phe Gln
                165                 170                 175 ggg aag act tgg gat tgg gaa gtt tcc aat gaa ttc ggc aac tat gat     576
Gly Lys Thr Trp Asp Trp Glu Val Ser Asn Glu Phe Gly Asn Tyr Asp
            180                 185                 190 tat ttg atg tat gcc gac ttt gat tat gac cat cct gat gtc gta gca     624
Tyr Leu Met Tyr Ala Asp Phe Asp Tyr Asp His Pro Asp Val Val Ala
        195                 200                 205
```

```
gag att aag aga tgg ggc act tgg tat gcc aat gaa ctg caa ttg gac      672
Glu Ile Lys Arg Trp Gly Thr Trp Tyr Ala Asn Glu Leu Gln Leu Asp
    210             215                 220 ggt ttc cgt ctt gat gct gtc aaa cac att aaa ttt tct ttt ttg cgg      720
Gly Phe Arg Leu Asp Ala Val Lys His Ile Lys Phe Ser Phe Leu Arg
225                 230                 235                 240 gat tgg gtt aat cat gtc agg gaa aaa acg ggg aag gaa atg ttt acg      768
Asp Trp Val Asn His Val Arg Glu Lys Thr Gly Lys Glu Met Phe Thr
                    245                 250                 255 gta gct gag tac tgg tcg aat gac ttg ggc gcg ctg gaa aac tat ttg      816
Val Ala Glu Tyr Trp Ser Asn Asp Leu Gly Ala Leu Glu Asn Tyr Leu
                260                 265                 270 aac aaa aca aat ttt aat cat tca gtg ttt gac gtg ccg ctt cat tat      864
Asn Lys Thr Asn Phe Asn His Ser Val Phe Asp Val Pro Leu His Tyr
            275                 280                 285 cag ttc cat gct gca tcg aca cag gga ggc ggc tat gat atg agg aaa      912
Gln Phe His Ala Ala Ser Thr Gln Gly Gly Gly Tyr Asp Met Arg Lys
        290                 295                 300 ttg ctg aac ggt acg gtc gtt tcc aag cat ccg ttg aaa tcg gtt aca      960
Leu Leu Asn Gly Thr Val Val Ser Lys His Pro Leu Lys Ser Val Thr
305                 310                 315                 320 ttt gtc gat aac cat gat aca cag ccg ggg caa tcg ctt gag tcg act     1008
Phe Val Asp Asn His Asp Thr Gln Pro Gly Gln Ser Leu Glu Ser Thr
                325                 330                 335 gtc caa aca tgg ttt aag ccg ctt gct tac gct ttt att ctc aca agg     1056
Val Gln Thr Trp Phe Lys Pro Leu Ala Tyr Ala Phe Ile Leu Thr Arg
                340                 345                 350 gaa tct gga tac cct cag gtt ttc tac ggg gat atg tac ggg acg aaa     1104
Glu Ser Gly Tyr Pro Gln Val Phe Tyr Gly Asp Met Tyr Gly Thr Lys
            355                 360                 365 gga gac tcc cag cgc gaa att cct gcc ttg aaa cac aaa att gaa ccg     1152
Gly Asp Ser Gln Arg Glu Ile Pro Ala Leu Lys His Lys Ile Glu Pro
        370                 375                 380 atc tta aaa gca aga aaa cag tat gcg tac gga gca cag cat gat tat     1200
Ile Leu Lys Ala Arg Lys Gln Tyr Ala Tyr Gly Ala Gln His Asp Tyr
385                 390                 395                 400 ttc gac cac cat gac att gtc ggc tgg aca agg gaa ggc gac agc tcg     1248
Phe Asp His His Asp Ile Val Gly Trp Thr Arg Glu Gly Asp Ser Ser
                405                 410                 415 gtt gca aat tca ggt ttg gcg gca tta ata aca gac gga ccc ggt ggg     1296
Val Ala Asn Ser Gly Leu Ala Ala Leu Ile Thr Asp Gly Pro Gly Gly
                420                 425                 430 gca aag cga atg tat gtc ggc cgg caa aac gcc ggt gag aca tgg cat     1344
Ala Lys Arg Met Tyr Val Gly Arg Gln Asn Ala Gly Glu Thr Trp His
            435                 440                 445 gac att acc gga aac cgt tcg gag ccg gtt gtc atc aat tcg gaa ggc     1392
Asp Ile Thr Gly Asn Arg Ser Glu Pro Val Val Ile Asn Ser Glu Gly
        450                 455                 460 tgg gga gag ttt cac gta aac ggc ggg tcg gtt tca att tat gtt cca     1440
Trp Gly Glu Phe His Val Asn Gly Gly Ser Val Ser Ile Tyr Val Pro
465                 470                 475                 480 aaa ata agt act act tcc caa ata aca ttt act gta aat aac gcc aca     1488
Lys Ile Ser Thr Thr Ser Gln Ile Thr Phe Thr Val Asn Asn Ala Thr
                485                 490                 495 acc gtt tgg gga caa aat gta tac gtt gtc ggg aat att tcg cag ctg     1536
Thr Val Trp Gly Gln Asn Val Tyr Val Val Gly Asn Ile Ser Gln Leu
                500                 505                 510 ggg aac tgg gat cca gtc cac gca gtt caa atg acg ccg tct tct tat     1584
Gly Asn Trp Asp Pro Val His Ala Val Gln Met Thr Pro Ser Ser Tyr
            515                 520                 525
```

```
cca aca tgg act gta aca atc cct ctt ctt caa ggg caa aac ata caa    1632
Pro Thr Trp Thr Val Thr Ile Pro Leu Leu Gln Gly Gln Asn Ile Gln
    530                 535                 540 ttt aaa ttt atc aaa aaa gat tca gct gga aat gtc att tgg gaa gat    1680
Phe Lys Phe Ile Lys Lys Asp Ser Ala Gly Asn Val Ile Trp Glu Asp
545                 550                 555                 560 ata tcg aat cga aca tac acc gtc cca act gct gca tcc gga gca tat    1728
Ile Ser Asn Arg Thr Tyr Thr Val Pro Thr Ala Ala Ser Gly Ala Tyr
                565                 570                 575 aca gcc agc tgg aac gtg ccc                                        1749
Thr Ala Ser Trp Asn Val Pro
            580

<210> SEQ ID NO 6
<211> LENGTH: 583
<212> TYPE: PRT
<213> ORGANISM: Bacillus licheniformis-CBM

<400> SEQUENCE: 6

Val Asn Gly Thr Leu Met Gln Tyr Phe Glu Trp Tyr Thr Pro Asn Asp
1               5                   10                  15

Gly Gln His Trp Lys Arg Leu Gln Asn Asp Ala Glu His Leu Ser Asp
            20                  25                  30

Ile Gly Ile Thr Ala Val Trp Ile Pro Pro Ala Tyr Lys Gly Thr Ser
        35                  40                  45

Gln Ala Asp Val Gly Tyr Gly Ala Tyr Asp Leu Tyr Asp Leu Gly Glu
    50                  55                  60

Phe His Gln Lys Gly Thr Val Arg Thr Lys Tyr Gly Thr Lys Gly Glu
65                  70                  75                  80

Leu Gln Ser Ala Ile Lys Ser Leu His Ser Arg Asp Ile Asn Val Tyr
                85                  90                  95

Gly Asp Val Val Ile Asn His Lys Gly Gly Ala Asp Ala Thr Glu Asp
            100                 105                 110

Val Thr Ala Val Glu Val Asp Pro Ala Asp Arg Asn Arg Val Ile Ser
        115                 120                 125

Gly Glu His Leu Ile Lys Ala Trp Thr His Phe His Phe Pro Gly Arg
    130                 135                 140

Gly Ser Thr Tyr Ser Asp Phe Lys Trp Tyr Trp Tyr His Phe Asp Gly
145                 150                 155                 160

Thr Asp Trp Asp Glu Ser Arg Lys Leu Asn Arg Ile Tyr Lys Phe Gln
                165                 170                 175

Gly Lys Thr Trp Asp Trp Glu Val Ser Asn Glu Phe Gly Asn Tyr Asp
            180                 185                 190

Tyr Leu Met Tyr Ala Asp Phe Asp Tyr Asp His Pro Asp Val Val Ala
        195                 200                 205

Glu Ile Lys Arg Trp Gly Thr Trp Tyr Ala Asn Glu Leu Gln Leu Asp
    210                 215                 220

Gly Phe Arg Leu Asp Ala Val Lys His Ile Lys Phe Ser Phe Leu Arg
225                 230                 235                 240

Asp Trp Val Asn His Val Arg Glu Lys Thr Gly Lys Glu Met Phe Thr
                245                 250                 255

Val Ala Glu Tyr Trp Ser Asn Asp Leu Gly Ala Leu Glu Asn Tyr Leu
            260                 265                 270

Asn Lys Thr Asn Phe Asn His Ser Val Phe Asp Val Pro Leu His Tyr
        275                 280                 285

Gln Phe His Ala Ala Ser Thr Gln Gly Gly Gly Tyr Asp Met Arg Lys
    290                 295                 300
```

```
Leu Leu Asn Gly Thr Val Val Ser Lys His Pro Leu Lys Ser Val Thr
305                 310                 315                 320

Phe Val Asp Asn His Asp Thr Gln Pro Gly Gln Ser Leu Glu Ser Thr
            325                 330                 335

Val Gln Thr Trp Phe Lys Pro Leu Ala Tyr Ala Phe Ile Leu Thr Arg
        340                 345                 350

Glu Ser Gly Tyr Pro Gln Val Phe Tyr Gly Asp Met Tyr Gly Thr Lys
    355                 360                 365

Gly Asp Ser Gln Arg Glu Ile Pro Ala Leu Lys His Lys Ile Glu Pro
370                 375                 380

Ile Leu Lys Ala Arg Lys Gln Tyr Ala Tyr Gly Ala Gln His Asp Tyr
385                 390                 395                 400

Phe Asp His His Asp Ile Val Gly Trp Thr Arg Glu Gly Asp Ser Ser
            405                 410                 415

Val Ala Asn Ser Gly Leu Ala Ala Leu Ile Thr Asp Gly Pro Gly Gly
        420                 425                 430

Ala Lys Arg Met Tyr Val Gly Arg Gln Asn Ala Gly Glu Thr Trp His
    435                 440                 445

Asp Ile Thr Gly Asn Arg Ser Glu Pro Val Val Ile Asn Ser Glu Gly
450                 455                 460

Trp Gly Glu Phe His Val Asn Gly Gly Ser Val Ser Ile Tyr Val Pro
465                 470                 475                 480

Lys Ile Ser Thr Thr Ser Gln Ile Thr Phe Thr Val Asn Asn Ala Thr
            485                 490                 495

Thr Val Trp Gly Gln Asn Val Tyr Val Val Gly Asn Ile Ser Gln Leu
        500                 505                 510

Gly Asn Trp Asp Pro Val His Ala Val Gln Met Thr Pro Ser Ser Tyr
    515                 520                 525

Pro Thr Trp Thr Val Thr Ile Pro Leu Leu Gln Gly Gln Asn Ile Gln
530                 535                 540

Phe Lys Phe Ile Lys Lys Asp Ser Ala Gly Asn Val Ile Trp Glu Asp
545                 550                 555                 560

Ile Ser Asn Arg Thr Tyr Thr Val Pro Thr Ala Ala Ser Gly Ala Tyr
            565                 570                 575

Thr Ala Ser Trp Asn Val Pro
            580

<210> SEQ ID NO 7
<211> LENGTH: 1755
<212> TYPE: DNA
<213> ORGANISM: Bacillus stearothermophilus-CBM
<220> FEATURE:
<221> NAME/KEY: CDS
<222> LOCATION: (1)..(1755)

<400> SEQUENCE: 7 gca ccg ttt aac ggc ttt aac ggc acc atg atg cag tat ttt gaa tgg      48
Ala Pro Phe Asn Gly Phe Asn Gly Thr Met Met Gln Tyr Phe Glu Trp
1               5                   10                  15 tac ttg ccg gat gat ggc acg tta tgg acc aaa gtg gcc aat gaa gcc      96
Tyr Leu Pro Asp Asp Gly Thr Leu Trp Thr Lys Val Ala Asn Glu Ala
            20                  25                  30 aac aac tta tcc agc ctt ggc atc acc gct ctt tgg ctg ccg ccc gct     144
Asn Asn Leu Ser Ser Leu Gly Ile Thr Ala Leu Trp Leu Pro Pro Ala
        35                  40                  45 tac aaa gga aca agc cgc agc gac gta ggg tac gga gta tac gac ttg     192
Tyr Lys Gly Thr Ser Arg Ser Asp Val Gly Tyr Gly Val Tyr Asp Leu
```

```
tat gac ctc ggc gaa ttc aat caa aaa ggg acc gtc cgc aca aaa tac         240
Tyr Asp Leu Gly Glu Phe Asn Gln Lys Gly Thr Val Arg Thr Lys Tyr
 65                  70                  75                  80 gga aca aaa gct caa tat ctt caa gcc att caa gcc gcc cac gcc gct         288
Gly Thr Lys Ala Gln Tyr Leu Gln Ala Ile Gln Ala Ala His Ala Ala
                 85                  90                  95 gga atg caa gtg tac gcc gat gtc gtg ttc gac cat aaa ggc ggc gct         336
Gly Met Gln Val Tyr Ala Asp Val Val Phe Asp His Lys Gly Gly Ala
            100                 105                 110 gac ggc acg gaa tgg gtg gac gcc gtc gaa gtc aat ccg tcc gac cgc         384
Asp Gly Thr Glu Trp Val Asp Ala Val Glu Val Asn Pro Ser Asp Arg
        115                 120                 125 aac caa gaa atc tcg ggc acc tat caa atc caa gca tgg acg aaa ttt         432
Asn Gln Glu Ile Ser Gly Thr Tyr Gln Ile Gln Ala Trp Thr Lys Phe
    130                 135                 140 gat ttt ccc ggg cgg ggc aac acc tac tcc agc ttt aag tgg cgc tgg         480
Asp Phe Pro Gly Arg Gly Asn Thr Tyr Ser Ser Phe Lys Trp Arg Trp
145                 150                 155                 160 tac cat ttt gac ggc gtt gat tgg gac gaa agc cga aaa ttg agc cgc         528
Tyr His Phe Asp Gly Val Asp Trp Asp Glu Ser Arg Lys Leu Ser Arg
                165                 170                 175 att tac aaa ttc cgt ggc aag gct tgg gat tgg gaa gta gac acg gaa         576
Ile Tyr Lys Phe Arg Gly Lys Ala Trp Asp Trp Glu Val Asp Thr Glu
            180                 185                 190 ttc gga aac tat gac tac tta atg tat gcc gac ctt gat atg gat cat         624
Phe Gly Asn Tyr Asp Tyr Leu Met Tyr Ala Asp Leu Asp Met Asp His
        195                 200                 205 ccc gaa gtc gtg acc gag ctg aaa aac tgg ggg aaa tgg tat gtc aac         672
Pro Glu Val Val Thr Glu Leu Lys Asn Trp Gly Lys Trp Tyr Val Asn
    210                 215                 220 aca acg aac att gat ggg ttc cgg ctt gat gcc gtc aag cat att aag         720
Thr Thr Asn Ile Asp Gly Phe Arg Leu Asp Ala Val Lys His Ile Lys
225                 230                 235                 240 ttc agt ttt ttt cct gat tgg ttg tcg tat gtg cgt tct cag act ggc         768
Phe Ser Phe Phe Pro Asp Trp Leu Ser Tyr Val Arg Ser Gln Thr Gly
                245                 250                 255 aag ccg cta ttt acc gtc ggg gaa tat tgg agc tat gac atc aac aag         816
Lys Pro Leu Phe Thr Val Gly Glu Tyr Trp Ser Tyr Asp Ile Asn Lys
            260                 265                 270 ttg cac aat tac att acg aaa aca gac gga acg atg tct ttg ttt gat         864
Leu His Asn Tyr Ile Thr Lys Thr Asp Gly Thr Met Ser Leu Phe Asp
        275                 280                 285 gcc ccg tta cac aac aaa ttt tat acc gct tcc aaa tca ggg ggc gca         912
Ala Pro Leu His Asn Lys Phe Tyr Thr Ala Ser Lys Ser Gly Gly Ala
    290                 295                 300 ttt gat atg cgc acg tta atg acc aat act ctc atg aaa gat caa ccg         960
Phe Asp Met Arg Thr Leu Met Thr Asn Thr Leu Met Lys Asp Gln Pro
305                 310                 315                 320 aca ttg gcc gtc acc ttc gtt gat aat cat gac acc gaa ccc ggc caa        1008
Thr Leu Ala Val Thr Phe Val Asp Asn His Asp Thr Glu Pro Gly Gln
                325                 330                 335 gcg ctg caa tca tgg gtc gac cca tgg ttc aaa ccg ttg gct tac gcc        1056
Ala Leu Gln Ser Trp Val Asp Pro Trp Phe Lys Pro Leu Ala Tyr Ala
            340                 345                 350 ttt att cta act cgg cag gaa gga tac ccg tgc gtc ttt tat ggt gac        1104
Phe Ile Leu Thr Arg Gln Glu Gly Tyr Pro Cys Val Phe Tyr Gly Asp
        355                 360                 365 tat tat ggc att cca caa tat aac att cct tcg ctg aaa agc aaa atc        1152
Tyr Tyr Gly Ile Pro Gln Tyr Asn Ile Pro Ser Leu Lys Ser Lys Ile
```

-continued

```
                    370                 375                 380
gat ccg ctc ctc atc gcg cgc agg gat tat gct tac gga acg caa cat    1200
Asp Pro Leu Leu Ile Ala Arg Arg Asp Tyr Ala Tyr Gly Thr Gln His
385                 390                 395                 400 gat tat ctt gat cac tcc gac atc atc ggg tgg aca agg gaa ggg ggc    1248
Asp Tyr Leu Asp His Ser Asp Ile Ile Gly Trp Thr Arg Glu Gly Gly
                405                 410                 415 act gaa aaa cca gga tcc gga ctg gcc gca ctg atc acc gat ggg ccg    1296
Thr Glu Lys Pro Gly Ser Gly Leu Ala Ala Leu Ile Thr Asp Gly Pro
            420                 425                 430 gga gga agc aaa tgg atg tac gtt ggc aaa caa cac gct gga aaa gtg    1344
Gly Gly Ser Lys Trp Met Tyr Val Gly Lys Gln His Ala Gly Lys Val
        435                 440                 445 ttc tat gac ctt acc ggc aac cgg agt gac acc gtc acc atc aac agt    1392
Phe Tyr Asp Leu Thr Gly Asn Arg Ser Asp Thr Val Thr Ile Asn Ser
450                 455                 460 gat gga tgg ggg gaa ttc aaa gtc aat ggc ggt tcg gtt tcg gtt tgg    1440
Asp Gly Trp Gly Glu Phe Lys Val Asn Gly Gly Ser Val Ser Val Trp
465                 470                 475                 480 gtt cct aaa ata agt act act tcc caa ata aca ttt act gta aat aac    1488
Val Pro Lys Ile Ser Thr Thr Ser Gln Ile Thr Phe Thr Val Asn Asn
                485                 490                 495 gcc aca acc gtt tgg gga caa aat gta tac gtt gtc ggg aat att tcg    1536
Ala Thr Thr Val Trp Gly Gln Asn Val Tyr Val Val Gly Asn Ile Ser
            500                 505                 510 cag ctg ggg aac tgg gat cca gtc cac gca gtt caa atg acg ccg tct    1584
Gln Leu Gly Asn Trp Asp Pro Val His Ala Val Gln Met Thr Pro Ser
        515                 520                 525 tct tat cca aca tgg act gta aca atc cct ctt ctt caa ggg caa aac    1632
Ser Tyr Pro Thr Trp Thr Val Thr Ile Pro Leu Leu Gln Gly Gln Asn
530                 535                 540 ata caa ttt aaa ttt atc aaa aaa gat tca gct gga aat gtc att tgg    1680
Ile Gln Phe Lys Phe Ile Lys Lys Asp Ser Ala Gly Asn Val Ile Trp
545                 550                 555                 560 gaa gat ata tcg aat cga aca tac acc gtc cca act gct gca tcc gga    1728
Glu Asp Ile Ser Asn Arg Thr Tyr Thr Val Pro Thr Ala Ala Ser Gly
                565                 570                 575 gca tat aca gcc agc tgg aac gtg ccc                                1755
Ala Tyr Thr Ala Ser Trp Asn Val Pro
            580                 585

<210> SEQ ID NO 8
<211> LENGTH: 585
<212> TYPE: PRT
<213> ORGANISM: Bacillus stearothermophilus-CBM

<400> SEQUENCE: 8

Ala Pro Phe Asn Gly Phe Asn Gly Thr Met Met Gln Tyr Phe Glu Trp
1               5                   10                  15

Tyr Leu Pro Asp Asp Gly Thr Leu Trp Thr Lys Val Ala Asn Glu Ala
                20                  25                  30

Asn Asn Leu Ser Ser Leu Gly Ile Thr Ala Leu Trp Leu Pro Pro Ala
            35                  40                  45

Tyr Lys Gly Thr Ser Arg Ser Asp Val Gly Tyr Gly Val Tyr Asp Leu
        50                  55                  60

Tyr Asp Leu Gly Glu Phe Asn Gln Lys Gly Thr Val Arg Thr Lys Tyr
65                  70                  75                  80

Gly Thr Lys Ala Gln Tyr Leu Gln Ala Ile Gln Ala Ala His Ala Ala
                85                  90                  95
```

-continued

```
Gly Met Gln Val Tyr Ala Asp Val Val Phe Asp His Lys Gly Gly Ala
            100                 105                 110
Asp Gly Thr Glu Trp Val Asp Val Glu Val Asn Pro Ser Asp Arg
        115                 120                 125
Asn Gln Glu Ile Ser Gly Thr Tyr Gln Ile Gln Ala Trp Thr Lys Phe
130                 135                 140
Asp Phe Pro Gly Arg Gly Asn Thr Tyr Ser Ser Phe Lys Trp Arg Trp
145                 150                 155                 160
Tyr His Phe Asp Gly Val Asp Trp Asp Glu Ser Arg Lys Leu Ser Arg
                165                 170                 175
Ile Tyr Lys Phe Arg Gly Lys Ala Trp Asp Trp Glu Val Asp Thr Glu
                180                 185                 190
Phe Gly Asn Tyr Asp Tyr Leu Met Tyr Ala Asp Leu Asp Met Asp His
            195                 200                 205
Pro Glu Val Val Thr Glu Leu Lys Asn Trp Gly Lys Trp Tyr Val Asn
        210                 215                 220
Thr Thr Asn Ile Asp Gly Phe Arg Leu Asp Ala Val Lys His Ile Lys
225                 230                 235                 240
Phe Ser Phe Phe Pro Asp Trp Leu Ser Tyr Val Arg Ser Gln Thr Gly
                245                 250                 255
Lys Pro Leu Phe Thr Val Gly Glu Tyr Trp Ser Tyr Asp Ile Asn Lys
                260                 265                 270
Leu His Asn Tyr Ile Thr Lys Thr Asp Gly Thr Met Ser Leu Phe Asp
            275                 280                 285
Ala Pro Leu His Asn Lys Phe Tyr Thr Ala Ser Lys Ser Gly Gly Ala
        290                 295                 300
Phe Asp Met Arg Thr Leu Met Thr Asn Thr Leu Met Lys Asp Gln Pro
305                 310                 315                 320
Thr Leu Ala Val Thr Phe Val Asp Asn His Asp Thr Glu Pro Gly Gln
                325                 330                 335
Ala Leu Gln Ser Trp Val Asp Pro Trp Phe Lys Pro Leu Ala Tyr Ala
                340                 345                 350
Phe Ile Leu Thr Arg Gln Glu Gly Tyr Pro Cys Val Phe Tyr Gly Asp
            355                 360                 365
Tyr Tyr Gly Ile Pro Gln Tyr Asn Ile Pro Ser Leu Lys Ser Lys Ile
        370                 375                 380
Asp Pro Leu Leu Ile Ala Arg Arg Asp Tyr Ala Tyr Gly Thr Gln His
385                 390                 395                 400
Asp Tyr Leu Asp His Ser Asp Ile Ile Gly Trp Thr Arg Glu Gly Gly
                405                 410                 415
Thr Glu Lys Pro Gly Ser Gly Leu Ala Ala Leu Ile Thr Asp Gly Pro
                420                 425                 430
Gly Gly Ser Lys Trp Met Tyr Val Gly Lys Gln His Ala Gly Lys Val
            435                 440                 445
Phe Tyr Asp Leu Thr Gly Asn Arg Ser Asp Thr Val Thr Ile Asn Ser
        450                 455                 460
Asp Gly Trp Gly Glu Phe Lys Val Asn Gly Gly Ser Val Ser Val Trp
465                 470                 475                 480
Val Pro Lys Ile Ser Thr Thr Ser Gln Ile Thr Phe Thr Val Asn Asn
                485                 490                 495
Ala Thr Thr Val Trp Gly Gln Asn Val Tyr Val Val Gly Asn Ile Ser
                500                 505                 510
Gln Leu Gly Asn Trp Asp Pro Val His Ala Val Gln Met Thr Pro Ser
            515                 520                 525
```

```
Ser Tyr Pro Thr Trp Thr Val Thr Ile Pro Leu Leu Gln Gly Gln Asn
    530                 535                 540

Ile Gln Phe Lys Phe Ile Lys Lys Asp Ser Ala Gly Asn Val Ile Trp
545                 550                 555                 560

Glu Asp Ile Ser Asn Arg Thr Tyr Thr Val Pro Thr Ala Ala Ser Gly
                565                 570                 575

Ala Tyr Thr Ala Ser Trp Asn Val Pro
                580                 585

<210> SEQ ID NO 9
<211> LENGTH: 1755
<212> TYPE: DNA
<213> ORGANISM: JE1-CBM
<220> FEATURE:
<221> NAME/KEY: CDS
<222> LOCATION: (1)..(1755)

<400> SEQUENCE: 9 cat cat aat ggg aca aat ggg acg atg atg caa tac ttt gaa tgg cac        48
His His Asn Gly Thr Asn Gly Thr Met Met Gln Tyr Phe Glu Trp His
1               5                   10                  15 ttg cct aat gat ggg aat cac tgg aat aga tta aga gat gat gct agt        96
Leu Pro Asn Asp Gly Asn His Trp Asn Arg Leu Arg Asp Asp Ala Ser
                20                  25                  30 aat cta aga aat aga ggt ata acc gct att tgg att ccg ccg gcc tgg       144
Asn Leu Arg Asn Arg Gly Ile Thr Ala Ile Trp Ile Pro Pro Ala Trp
            35                  40                  45 aaa ggg act tcg caa aat gat gtg ggg tat gga gcc tat gat ctt tat       192
Lys Gly Thr Ser Gln Asn Asp Val Gly Tyr Gly Ala Tyr Asp Leu Tyr
        50                  55                  60 gat tta ggg gaa ttt aat caa aag ggg acg gtt cgt act aag tat ggg       240
Asp Leu Gly Glu Phe Asn Gln Lys Gly Thr Val Arg Thr Lys Tyr Gly
65                  70                  75                  80 aca cgt agt caa ttg gag tct gcc atc cat gct tta aag aat aat ggc       288
Thr Arg Ser Gln Leu Glu Ser Ala Ile His Ala Leu Lys Asn Asn Gly
                85                  90                  95 gtt caa gtt tat ggg gat gta gtg atg aac cat aaa gga gga gct gat       336
Val Gln Val Tyr Gly Asp Val Val Met Asn His Lys Gly Gly Ala Asp
            100                 105                 110 gct aca gaa aac gtt ctt gct gtc gag gtg aat cca aat aac cgg aat       384
Ala Thr Glu Asn Val Leu Ala Val Glu Val Asn Pro Asn Asn Arg Asn
        115                 120                 125 caa gaa ata tct ggg gac tac aca att gag gct tgg act aag ttt gat       432
Gln Glu Ile Ser Gly Asp Tyr Thr Ile Glu Ala Trp Thr Lys Phe Asp
130                 135                 140 ttt cca ggg agg ggt aat aca tac tca gac ttt aaa tgg cgt tgg tat       480
Phe Pro Gly Arg Gly Asn Thr Tyr Ser Asp Phe Lys Trp Arg Trp Tyr
145                 150                 155                 160 cat ttc gat ggt gta gat tgg gat caa tca cga caa ttc caa aat cgt       528
His Phe Asp Gly Val Asp Trp Asp Gln Ser Arg Gln Phe Gln Asn Arg
                165                 170                 175 atc tac aaa ttc cga ggt aaa gct tgg gat tgg gaa gta gat tcg gaa       576
Ile Tyr Lys Phe Arg Gly Lys Ala Trp Asp Trp Glu Val Asp Ser Glu
            180                 185                 190 aat gga aat tat gat tat tta atg tat gca gat gta gat atg gat cat       624
Asn Gly Asn Tyr Asp Tyr Leu Met Tyr Ala Asp Val Asp Met Asp His
        195                 200                 205 ccg gag gta gta aat gag ctt aga aga tgg gga gaa tgg tat aca aat       672
Pro Glu Val Val Asn Glu Leu Arg Arg Trp Gly Glu Trp Tyr Thr Asn
210                 215                 220
```

```
aca tta aat ctt gat gga ttt agg atc gat gcg gtg aag cat att aaa      720
Thr Leu Asn Leu Asp Gly Phe Arg Ile Asp Ala Val Lys His Ile Lys
225                 230                 235                 240 tat agc ttt aca cgt gat tgg ttg acc cat gta aga aac gca acg gga      768
Tyr Ser Phe Thr Arg Asp Trp Leu Thr His Val Arg Asn Ala Thr Gly
                245                 250                 255 aaa gaa atg ttt gct gtt gct gaa ttt tgg aaa aat gat tta ggt gcc      816
Lys Glu Met Phe Ala Val Ala Glu Phe Trp Lys Asn Asp Leu Gly Ala
            260                 265                 270 ttg gag aac tat tta aat aaa aca aac tgg aat cat tct gtc ttt gat      864
Leu Glu Asn Tyr Leu Asn Lys Thr Asn Trp Asn His Ser Val Phe Asp
        275                 280                 285 gtc ccc ctt cat tat aat ctt tat aac gcg tca aat agt gga ggc aac      912
Val Pro Leu His Tyr Asn Leu Tyr Asn Ala Ser Asn Ser Gly Gly Asn
    290                 295                 300 tat gac atg gca aaa ctt ctt aat gga acg gtt gtt caa aag cat cca      960
Tyr Asp Met Ala Lys Leu Leu Asn Gly Thr Val Val Gln Lys His Pro
305                 310                 315                 320 atg cat gcc gta act ttt gtg gat aat cac gat tct caa cct ggg gaa     1008
Met His Ala Val Thr Phe Val Asp Asn His Asp Ser Gln Pro Gly Glu
                325                 330                 335 tca tta gaa tca ttt gta caa gaa tgg ttt aag cca ctt gct tat gcg     1056
Ser Leu Glu Ser Phe Val Gln Glu Trp Phe Lys Pro Leu Ala Tyr Ala
            340                 345                 350 ctt att tta aca aga gaa caa ggc tat ccc tct gtc ttc tat ggt gac     1104
Leu Ile Leu Thr Arg Glu Gln Gly Tyr Pro Ser Val Phe Tyr Gly Asp
        355                 360                 365 tac tat gga att cca aca cat agt gtc cca gca atg aaa gcc aag att     1152
Tyr Tyr Gly Ile Pro Thr His Ser Val Pro Ala Met Lys Ala Lys Ile
    370                 375                 380 gat cca atc tta gag gcg cgt caa aat ttt gca tat gga aca caa cat     1200
Asp Pro Ile Leu Glu Ala Arg Gln Asn Phe Ala Tyr Gly Thr Gln His
385                 390                 395                 400 gat tat ttt gac cat cat aat ata atc gga tgg aca cgt gaa gga aat     1248
Asp Tyr Phe Asp His His Asn Ile Ile Gly Trp Thr Arg Glu Gly Asn
                405                 410                 415 acc acg cat ccc aat tca gga ctt gcg act atc atg tcg gat ggg cca     1296
Thr Thr His Pro Asn Ser Gly Leu Ala Thr Ile Met Ser Asp Gly Pro
            420                 425                 430 ggg gga gag aaa tgg atg tac gta ggg caa gat aaa gca ggt caa gtt     1344
Gly Gly Glu Lys Trp Met Tyr Val Gly Gln Asp Lys Ala Gly Gln Val
        435                 440                 445 tgg cat gac ata act gga aat aaa cca ggc aca gtt acg atc aat gca     1392
Trp His Asp Ile Thr Gly Asn Lys Pro Gly Thr Val Thr Ile Asn Ala
    450                 455                 460 gat gga tgg gcc aat ttt tca gta aat gga gga tct gtt tcc att tgg     1440
Asp Gly Trp Ala Asn Phe Ser Val Asn Gly Gly Ser Val Ser Ile Trp
465                 470                 475                 480 gtg cca aaa ata agt act act tcc caa ata aca ttt act gta aat aac     1488
Val Pro Lys Ile Ser Thr Thr Ser Gln Ile Thr Phe Thr Val Asn Asn
                485                 490                 495 gcc aca acc gtt tgg gga caa aat gta tac gtt gtc ggg aat att tcg     1536
Ala Thr Thr Val Trp Gly Gln Asn Val Tyr Val Val Gly Asn Ile Ser
            500                 505                 510 cag ctg ggg aac tgg gat cca gtc cac gca gtt caa atg acg ccg tct     1584
Gln Leu Gly Asn Trp Asp Pro Val His Ala Val Gln Met Thr Pro Ser
        515                 520                 525 tct tat cca aca tgg act gta aca atc cct ctt ctt caa ggg caa aac     1632
Ser Tyr Pro Thr Trp Thr Val Thr Ile Pro Leu Leu Gln Gly Gln Asn
    530                 535                 540
```

```
ata caa ttt aaa ttt atc aaa aaa gat tca gct gga aat gtc att tgg    1680
Ile Gln Phe Lys Phe Ile Lys Lys Asp Ser Ala Gly Asn Val Ile Trp
545             550                 555                 560 gaa gat ata tcg aat cga aca tac acc gtc cca act gct gca tcc gga    1728
Glu Asp Ile Ser Asn Arg Thr Tyr Thr Val Pro Thr Ala Ala Ser Gly
                565                 570                 575 gca tat aca gcc agc tgg aac gtg ccc                                1755
Ala Tyr Thr Ala Ser Trp Asn Val Pro
        580                 585

<210> SEQ ID NO 10
<211> LENGTH: 585
<212> TYPE: PRT
<213> ORGANISM: JE1-CBM

<400> SEQUENCE: 10

His His Asn Gly Thr Asn Gly Thr Met Met Gln Tyr Phe Glu Trp His
1               5                   10                  15

Leu Pro Asn Asp Gly Asn His Trp Asn Arg Leu Arg Asp Asp Ala Ser
                20                  25                  30

Asn Leu Arg Asn Arg Gly Ile Thr Ala Ile Trp Ile Pro Pro Ala Trp
            35                  40                  45

Lys Gly Thr Ser Gln Asn Asp Val Gly Tyr Gly Ala Tyr Asp Leu Tyr
        50                  55                  60

Asp Leu Gly Glu Phe Asn Gln Lys Gly Thr Val Arg Thr Lys Tyr Gly
65                  70                  75                  80

Thr Arg Ser Gln Leu Glu Ser Ala Ile His Ala Leu Lys Asn Asn Gly
                85                  90                  95

Val Gln Val Tyr Gly Asp Val Val Met Asn His Lys Gly Gly Ala Asp
                100                 105                 110

Ala Thr Glu Asn Val Leu Ala Val Glu Val Asn Pro Asn Asn Arg Asn
            115                 120                 125

Gln Glu Ile Ser Gly Asp Tyr Thr Ile Glu Ala Trp Thr Lys Phe Asp
        130                 135                 140

Phe Pro Gly Arg Gly Asn Thr Tyr Ser Asp Phe Lys Trp Arg Trp Tyr
145                 150                 155                 160

His Phe Asp Gly Val Asp Trp Asp Gln Ser Arg Gln Phe Gln Asn Arg
                165                 170                 175

Ile Tyr Lys Phe Arg Gly Lys Ala Trp Asp Trp Glu Val Asp Ser Glu
                180                 185                 190

Asn Gly Asn Tyr Asp Tyr Leu Met Tyr Ala Asp Val Asp Met Asp His
            195                 200                 205

Pro Glu Val Val Asn Glu Leu Arg Arg Trp Gly Glu Trp Tyr Thr Asn
        210                 215                 220

Thr Leu Asn Leu Asp Gly Phe Arg Ile Asp Ala Val Lys His Ile Lys
225                 230                 235                 240

Tyr Ser Phe Thr Arg Asp Trp Leu Thr His Val Arg Asn Ala Thr Gly
                245                 250                 255

Lys Glu Met Phe Ala Val Ala Glu Phe Trp Lys Asn Asp Leu Gly Ala
                260                 265                 270

Leu Glu Asn Tyr Leu Asn Lys Thr Asn Trp Asn His Ser Val Phe Asp
            275                 280                 285

Val Pro Leu His Tyr Asn Leu Tyr Asn Ala Ser Asn Ser Gly Gly Asn
        290                 295                 300

Tyr Asp Met Ala Lys Leu Leu Asn Gly Thr Val Val Gln Lys His Pro
305                 310                 315                 320
```

```
Met His Ala Val Thr Phe Val Asp Asn His Asp Ser Gln Pro Gly Glu
                325                 330                 335

Ser Leu Glu Ser Phe Val Gln Glu Trp Phe Lys Pro Leu Ala Tyr Ala
                340                 345                 350

Leu Ile Leu Thr Arg Glu Gln Gly Tyr Pro Ser Val Phe Tyr Gly Asp
                355                 360                 365

Tyr Tyr Gly Ile Pro Thr His Ser Val Pro Ala Met Lys Ala Lys Ile
                370                 375                 380

Asp Pro Ile Leu Glu Ala Arg Gln Asn Phe Ala Tyr Gly Thr Gln His
385                 390                 395                 400

Asp Tyr Phe Asp His His Asn Ile Ile Gly Trp Thr Arg Glu Gly Asn
                405                 410                 415

Thr Thr His Pro Asn Ser Gly Leu Ala Thr Ile Met Ser Asp Gly Pro
                420                 425                 430

Gly Gly Glu Lys Trp Met Tyr Val Gly Gln Asp Lys Ala Gly Gln Val
                435                 440                 445

Trp His Asp Ile Thr Gly Asn Lys Pro Gly Thr Val Thr Ile Asn Ala
                450                 455                 460

Asp Gly Trp Ala Asn Phe Ser Val Asn Gly Gly Ser Val Ser Ile Trp
465                 470                 475                 480

Val Pro Lys Ile Ser Thr Thr Ser Gln Ile Thr Phe Thr Val Asn Asn
                485                 490                 495

Ala Thr Thr Val Trp Gly Gln Asn Val Tyr Val Val Gly Asn Ile Ser
                500                 505                 510

Gln Leu Gly Asn Trp Asp Pro Val His Ala Val Gln Met Thr Pro Ser
                515                 520                 525

Ser Tyr Pro Thr Trp Thr Val Thr Ile Pro Leu Leu Gln Gly Gln Asn
                530                 535                 540

Ile Gln Phe Lys Phe Ile Lys Lys Asp Ser Ala Gly Asn Val Ile Trp
545                 550                 555                 560

Glu Asp Ile Ser Asn Arg Thr Tyr Thr Val Pro Thr Ala Ala Ser Gly
                565                 570                 575

Ala Tyr Thr Ala Ser Trp Asn Val Pro
                580                 585

<210> SEQ ID NO 11
<211> LENGTH: 1755
<212> TYPE: DNA
<213> ORGANISM: AX379-CBM
<220> FEATURE:
<221> NAME/KEY: CDS
<222> LOCATION: (1)..(1755)

<400> SEQUENCE: 11 cac cat aat ggt acg aac ggc aca atg atg cag tac ttt gaa tgg tat       48
His His Asn Gly Thr Asn Gly Thr Met Met Gln Tyr Phe Glu Trp Tyr
1               5                  10                  15 cta cca aat gac gga aac cat tgg aat aga tta agg tct gat gca agt       96
Leu Pro Asn Asp Gly Asn His Trp Asn Arg Leu Arg Ser Asp Ala Ser
                20                  25                  30 aac cta aaa gat aaa ggg atc tca gcg gtt tgg att cct cct gca tgg      144
Asn Leu Lys Asp Lys Gly Ile Ser Ala Val Trp Ile Pro Pro Ala Trp
            35                  40                  45 aag ggt gcc tct caa aat gat gtg ggg tat ggt gct tat gat ctg tat      192
Lys Gly Ala Ser Gln Asn Asp Val Gly Tyr Gly Ala Tyr Asp Leu Tyr
        50                  55                  60 gat tta gga gaa ttc aat caa aaa gga acc att cgt aca aaa tat gga      240
Asp Leu Gly Glu Phe Asn Gln Lys Gly Thr Ile Arg Thr Lys Tyr Gly
```

```
          65                      70                      75                      80
acg cgc aat cag tta caa gct gcg gtt aac gcc ttg aaa agt aat gga       288
Thr Arg Asn Gln Leu Gln Ala Ala Val Asn Ala Leu Lys Ser Asn Gly
                85                      90                      95 att caa gtg tat ggc gat gtt gta atg aat cat aaa ggg gga gca gac       336
Ile Gln Val Tyr Gly Asp Val Val Met Asn His Lys Gly Gly Ala Asp
            100                     105                     110 gct acc gaa atg gtt aaa gca gtc gaa gta aac ccg aat aat aga aat       384
Ala Thr Glu Met Val Lys Ala Val Glu Val Asn Pro Asn Asn Arg Asn
            115                     120                     125 caa gaa gtg tcc ggt gaa tat aca att gag gct tgg aca aag ttt gac       432
Gln Glu Val Ser Gly Glu Tyr Thr Ile Glu Ala Trp Thr Lys Phe Asp
        130                     135                     140 ttt cca gga cga ggt aat act cat tca aac ttc aaa tgg aga tgg tat       480
Phe Pro Gly Arg Gly Asn Thr His Ser Asn Phe Lys Trp Arg Trp Tyr
145                     150                     155                     160 cac ttt gat gga gta gat tgg gat cag tca cgt aag ctg aac aat cga       528
His Phe Asp Gly Val Asp Trp Asp Gln Ser Arg Lys Leu Asn Asn Arg
                165                     170                     175 att tat aaa ttc cgc ggt aaa ggg tgg gat tgg gaa gtc gat aca gaa       576
Ile Tyr Lys Phe Arg Gly Lys Gly Trp Asp Trp Glu Val Asp Thr Glu
            180                     185                     190 ttc ggt aac tat gat tac cta atg tat gca gat att gac atg gat cac       624
Phe Gly Asn Tyr Asp Tyr Leu Met Tyr Ala Asp Ile Asp Met Asp His
            195                     200                     205 cca gag gta gtg aat gag cta aga aat tgg ggt gtt tgg tat acg aat       672
Pro Glu Val Val Asn Glu Leu Arg Asn Trp Gly Val Trp Tyr Thr Asn
        210                     215                     220 aca tta ggc ctt gat ggt ttt aga ata gat gca gta aaa cat ata aaa       720
Thr Leu Gly Leu Asp Gly Phe Arg Ile Asp Ala Val Lys His Ile Lys
225                     230                     235                     240 tac agc ttt act cgt gat tgg att aat cat gtt aga agt gca act ggc       768
Tyr Ser Phe Thr Arg Asp Trp Ile Asn His Val Arg Ser Ala Thr Gly
                245                     250                     255 aaa aat atg ttt gcg gtt gcg gaa ttt tgg aaa aat gat tta ggt gct       816
Lys Asn Met Phe Ala Val Ala Glu Phe Trp Lys Asn Asp Leu Gly Ala
            260                     265                     270 att gaa aac tat tta aac aaa aca aac tgg aac cat tca gtc ttt gat       864
Ile Glu Asn Tyr Leu Asn Lys Thr Asn Trp Asn His Ser Val Phe Asp
            275                     280                     285 gtt ccg ctg cac tat aac ctc tat aat gct tca aaa agc gga ggg aat       912
Val Pro Leu His Tyr Asn Leu Tyr Asn Ala Ser Lys Ser Gly Gly Asn
        290                     295                     300 tat gat atg agg caa ata ttt aat ggt aca gtc gtg caa aag cat cca       960
Tyr Asp Met Arg Gln Ile Phe Asn Gly Thr Val Val Gln Lys His Pro
305                     310                     315                     320 atg cat gct gtt aca ttt gtt gat aat cat gat tcg caa cct gaa gaa      1008
Met His Ala Val Thr Phe Val Asp Asn His Asp Ser Gln Pro Glu Glu
                325                     330                     335 gct tta gag tct ttt gtt gaa gaa tgg ttc aaa cca tta gcg tat gct      1056
Ala Leu Glu Ser Phe Val Glu Glu Trp Phe Lys Pro Leu Ala Tyr Ala
            340                     345                     350 ttg aca tta aca cgt gaa caa ggc tac cct tct gta ttt tat gga gat      1104
Leu Thr Leu Thr Arg Glu Gln Gly Tyr Pro Ser Val Phe Tyr Gly Asp
        355                     360                     365 tat tat ggc att cca acg cat ggt gta cca gcg atg aaa tcg aaa att      1152
Tyr Tyr Gly Ile Pro Thr His Gly Val Pro Ala Met Lys Ser Lys Ile
370                     375                     380 gac ccg att cta gaa gcg cgt caa aag tat gca tat gga aga caa aat      1200
Asp Pro Ile Leu Glu Ala Arg Gln Lys Tyr Ala Tyr Gly Arg Gln Asn
```

```
                385                 390                 395                 400
gac tac tta gac cat cat aat atc atc ggt tgg aca cgt gaa ggg aat         1248
Asp Tyr Leu Asp His His Asn Ile Ile Gly Trp Thr Arg Glu Gly Asn
                        405                 410                 415 aca gca cac ccc aac tcc ggt tta gct act atc atg tcc gat ggg gca         1296
Thr Ala His Pro Asn Ser Gly Leu Ala Thr Ile Met Ser Asp Gly Ala
                420                 425                 430 gga gga aat aag tgg atg ttt gtt ggg cgt aat aaa gct ggt caa gtt         1344
Gly Gly Asn Lys Trp Met Phe Val Gly Arg Asn Lys Ala Gly Gln Val
            435                 440                 445 tgg acc gat atc act gga aat aaa gcc ggt act gtt acg att aat gct         1392
Trp Thr Asp Ile Thr Gly Asn Lys Ala Gly Thr Val Thr Ile Asn Ala
        450                 455                 460 gat gga tgg ggt aat ttt tct gta aat gga gga tca gtt tct att tgg         1440
Asp Gly Trp Gly Asn Phe Ser Val Asn Gly Gly Ser Val Ser Ile Trp
465                 470                 475                 480 gta aac aaa ata agt act act tcc caa ata aca ttt act gta aat aac         1488
Val Asn Lys Ile Ser Thr Thr Ser Gln Ile Thr Phe Thr Val Asn Asn
                        485                 490                 495 gcc aca acc gtt tgg gga caa aat gta tac gtt gtc ggg aat att tcg         1536
Ala Thr Thr Val Trp Gly Gln Asn Val Tyr Val Val Gly Asn Ile Ser
                500                 505                 510 cag ctg ggg aac tgg gat cca gtc cac gca gtt caa atg acg ccg tct         1584
Gln Leu Gly Asn Trp Asp Pro Val His Ala Val Gln Met Thr Pro Ser
            515                 520                 525 tct tat cca aca tgg act gta aca atc cct ctt ctt caa ggg caa aac         1632
Ser Tyr Pro Thr Trp Thr Val Thr Ile Pro Leu Leu Gln Gly Gln Asn
        530                 535                 540 ata caa ttt aaa ttt atc aaa aaa gat tca gct gga aat gtc att tgg         1680
Ile Gln Phe Lys Phe Ile Lys Lys Asp Ser Ala Gly Asn Val Ile Trp
545                 550                 555                 560 gaa gat ata tcg aat cga aca tac acc gtc cca act gct gca tcc gga         1728
Glu Asp Ile Ser Asn Arg Thr Tyr Thr Val Pro Thr Ala Ala Ser Gly
                        565                 570                 575 gca tat aca gcc agc tgg aac gtg ccc                                     1755
Ala Tyr Thr Ala Ser Trp Asn Val Pro
                580                 585

<210> SEQ ID NO 12
<211> LENGTH: 585
<212> TYPE: PRT
<213> ORGANISM: AX379-CBM

<400> SEQUENCE: 12

His His Asn Gly Thr Asn Gly Thr Met Met Gln Tyr Phe Glu Trp Tyr
1               5                   10                  15

Leu Pro Asn Asp Gly Asn His Trp Asn Arg Leu Arg Ser Asp Ala Ser
                20                  25                  30

Asn Leu Lys Asp Lys Gly Ile Ser Ala Val Trp Ile Pro Pro Ala Trp
            35                  40                  45

Lys Gly Ala Ser Gln Asn Asp Val Gly Tyr Gly Ala Tyr Asp Leu Tyr
        50                  55                  60

Asp Leu Gly Glu Phe Asn Gln Lys Gly Thr Ile Arg Thr Lys Tyr Gly
65                  70                  75                  80

Thr Arg Asn Gln Leu Gln Ala Ala Val Asn Ala Leu Lys Ser Asn Gly
                85                  90                  95

Ile Gln Val Tyr Gly Asp Val Val Met Asn His Lys Gly Gly Ala Asp
            100                 105                 110

Ala Thr Glu Met Val Lys Ala Val Glu Val Asn Pro Asn Asn Arg Asn
```

```
            115                 120                 125
Gln Glu Val Ser Gly Glu Tyr Thr Ile Glu Ala Trp Thr Lys Phe Asp
    130                 135                 140

Phe Pro Gly Arg Gly Asn Thr His Ser Asn Phe Lys Trp Arg Trp Tyr
145                 150                 155                 160

His Phe Asp Gly Val Asp Trp Asp Gln Ser Arg Lys Leu Asn Asn Arg
                165                 170                 175

Ile Tyr Lys Phe Arg Gly Lys Gly Trp Asp Trp Glu Val Asp Thr Glu
                180                 185                 190

Phe Gly Asn Tyr Asp Tyr Leu Met Tyr Ala Asp Ile Asp Met Asp His
                195                 200                 205

Pro Glu Val Val Asn Glu Leu Arg Asn Trp Gly Val Trp Tyr Thr Asn
    210                 215                 220

Thr Leu Gly Leu Asp Gly Phe Arg Ile Asp Ala Val Lys His Ile Lys
225                 230                 235                 240

Tyr Ser Phe Thr Arg Asp Trp Ile Asn His Val Arg Ser Ala Thr Gly
                245                 250                 255

Lys Asn Met Phe Ala Val Ala Glu Phe Trp Lys Asn Asp Leu Gly Ala
                260                 265                 270

Ile Glu Asn Tyr Leu Asn Lys Thr Asn Trp Asn His Ser Val Phe Asp
                275                 280                 285

Val Pro Leu His Tyr Asn Leu Tyr Asn Ala Ser Lys Ser Gly Gly Asn
    290                 295                 300

Tyr Asp Met Arg Gln Ile Phe Asn Gly Thr Val Val Gln Lys His Pro
305                 310                 315                 320

Met His Ala Val Thr Phe Val Asp Asn His Asp Ser Gln Pro Glu Glu
                325                 330                 335

Ala Leu Glu Ser Phe Val Glu Glu Trp Phe Lys Pro Leu Ala Tyr Ala
                340                 345                 350

Leu Thr Leu Thr Arg Glu Gln Gly Tyr Pro Ser Val Phe Tyr Gly Asp
                355                 360                 365

Tyr Tyr Gly Ile Pro Thr His Gly Val Pro Ala Met Lys Ser Lys Ile
    370                 375                 380

Asp Pro Ile Leu Glu Ala Arg Gln Lys Tyr Ala Tyr Gly Arg Gln Asn
385                 390                 395                 400

Asp Tyr Leu Asp His His Asn Ile Ile Gly Trp Thr Arg Glu Gly Asn
                405                 410                 415

Thr Ala His Pro Asn Ser Gly Leu Ala Thr Ile Met Ser Asp Gly Ala
                420                 425                 430

Gly Gly Asn Lys Trp Met Phe Val Gly Arg Asn Lys Ala Gly Gln Val
                435                 440                 445

Trp Thr Asp Ile Thr Gly Asn Lys Ala Gly Thr Val Thr Ile Asn Ala
    450                 455                 460

Asp Gly Trp Gly Asn Phe Ser Val Asn Gly Gly Ser Val Ser Ile Trp
465                 470                 475                 480

Val Asn Lys Ile Ser Thr Thr Ser Gln Ile Thr Phe Thr Val Asn Asn
                485                 490                 495

Ala Thr Thr Val Trp Gly Gln Asn Val Tyr Val Val Gly Asn Ile Ser
                500                 505                 510

Gln Leu Gly Asn Trp Asp Pro Val His Ala Val Gln Met Thr Pro Ser
                515                 520                 525

Ser Tyr Pro Thr Trp Thr Val Thr Ile Pro Leu Leu Gln Gly Gln Asn
    530                 535                 540
```

| | | | | | | | | | | | |
|---|---|---|---|---|---|---|---|---|---|---|---|
| Ile | Gln | Phe | Lys | Phe | Ile | Lys | Lys | Asp | Ser | Ala | Gly | Asn | Val | Ile | Trp |
| 545 | | | | 550 | | | | 555 | | | | 560 |

| Glu | Asp | Ile | Ser | Asn | Arg | Thr | Tyr | Thr | Val | Pro | Thr | Ala | Ala | Ser | Gly |
|---|---|---|---|---|---|---|---|---|---|---|---|---|---|---|---|
| | | | | 565 | | | | 570 | | | | 575 |

| Ala | Tyr | Thr | Ala | Ser | Trp | Asn | Val | Pro |
|---|---|---|---|---|---|---|---|---|
| | | 580 | | | | | 585 |

<210> SEQ ID NO 13
<211> LENGTH: 1755
<212> TYPE: DNA
<213> ORGANISM: BAN-CBM
<220> FEATURE:
<221> NAME/KEY: CDS
<222> LOCATION: (1)..(1755)

<400> SEQUENCE: 13

```
gta aat ggc acg ctg atg cag tat ttt gaa tgg tat acg ccg aac gac        48
Val Asn Gly Thr Leu Met Gln Tyr Phe Glu Trp Tyr Thr Pro Asn Asp
1               5                   10                  15 ggc cag cat tgg aaa cga ttg cag aat gat gcg gaa cat tta tcg gat        96
Gly Gln His Trp Lys Arg Leu Gln Asn Asp Ala Glu His Leu Ser Asp
                20                  25                  30 atc gga atc act gcc gtc tgg att cct ccc gca tac aaa gga ttg agc       144
Ile Gly Ile Thr Ala Val Trp Ile Pro Pro Ala Tyr Lys Gly Leu Ser
            35                  40                  45 caa tcc gat aac gga tac gga cct tat gat ttg tat gat tta gga gaa       192
Gln Ser Asp Asn Gly Tyr Gly Pro Tyr Asp Leu Tyr Asp Leu Gly Glu
        50                  55                  60 ttc cag caa aaa ggg acg gtc aga acg aaa tac ggc aca aaa tca gag       240
Phe Gln Gln Lys Gly Thr Val Arg Thr Lys Tyr Gly Thr Lys Ser Glu
65                  70                  75                  80 ctt caa gat gcg atc ggc tca ctg cat tcc cgg aac gtc caa gta tac       288
Leu Gln Asp Ala Ile Gly Ser Leu His Ser Arg Asn Val Gln Val Tyr
                85                  90                  95 gga gat gtg gtt ttg aat cat aag gct ggt gct gat gca aca gaa gat       336
Gly Asp Val Val Leu Asn His Lys Ala Gly Ala Asp Ala Thr Glu Asp
                100                 105                 110 gta act gcc gtc gaa gtc aat ccg gcc aat aga aat cag gaa act tcg       384
Val Thr Ala Val Glu Val Asn Pro Ala Asn Arg Asn Gln Glu Thr Ser
            115                 120                 125 gag gaa tat caa atc aaa gcg tgg acg gat ttt cgt ttt ccg ggc cgt       432
Glu Glu Tyr Gln Ile Lys Ala Trp Thr Asp Phe Arg Phe Pro Gly Arg
        130                 135                 140 gga aac acg tac agt gat ttt aaa tgg cat tgg tat cat ttc gac gga       480
Gly Asn Thr Tyr Ser Asp Phe Lys Trp His Trp Tyr His Phe Asp Gly
145                 150                 155                 160 gcg gac tgg gat gaa tcc cgg aag atc agc cgc atc ttt aag ttt cgt       528
Ala Asp Trp Asp Glu Ser Arg Lys Ile Ser Arg Ile Phe Lys Phe Arg
                165                 170                 175 ggg gaa gga aaa gcg tgg gat tgg gaa gta tca agt gaa aac ggc aac       576
Gly Glu Gly Lys Ala Trp Asp Trp Glu Val Ser Ser Glu Asn Gly Asn
            180                 185                 190 tat gac tat tta atg tat gct gat gtt gac tac gac cac cct gat gtc       624
Tyr Asp Tyr Leu Met Tyr Ala Asp Val Asp Tyr Asp His Pro Asp Val
        195                 200                 205 gtg gca gag aca aaa aaa tgg ggt atc tgg tat gcg aat gaa ctg tca       672
Val Ala Glu Thr Lys Lys Trp Gly Ile Trp Tyr Ala Asn Glu Leu Ser
    210                 215                 220 tta gac ggc ttc cgt att gat gcc gcc aaa cat att aaa ttt tca ttt       720
Leu Asp Gly Phe Arg Ile Asp Ala Ala Lys His Ile Lys Phe Ser Phe
225                 230                 235                 240
```

| | | |
|---|---|---|
| ctg cgt gat tgg gtt cag gcg gtc aga cag gcg acg gga aaa gaa atg<br>Leu Arg Asp Trp Val Gln Ala Val Arg Gln Ala Thr Gly Lys Glu Met<br>                245                      250                     255 | | 768 |
| ttt acg gtt gcg gag tat tgg cag aat aat gcc ggg aaa ctc gaa aac<br>Phe Thr Val Ala Glu Tyr Trp Gln Asn Asn Ala Gly Lys Leu Glu Asn<br>     260                      265                      270 | | 816 |
| tac ttg aat aaa aca agc ttt aat caa tcc gtg ttt gat gtt ccg ctt<br>Tyr Leu Asn Lys Thr Ser Phe Asn Gln Ser Val Phe Asp Val Pro Leu<br>275                     280                      285 | | 864 |
| cat ttc aat tta cag gcg gct tcc tca caa gga ggc gga tat gat atg<br>His Phe Asn Leu Gln Ala Ala Ser Ser Gln Gly Gly Gly Tyr Asp Met<br>    290                     295                      300 | | 912 |
| agg cgt ttg ctg gac ggt acc gtt gtg tcc agg cat ccg gaa aag gcg<br>Arg Arg Leu Leu Asp Gly Thr Val Val Ser Arg His Pro Glu Lys Ala<br>305                     310                      315                     320 | | 960 |
| gtt aca ttt gtt gaa aat cat gac aca cag ccg gga cag tca ttg gaa<br>Val Thr Phe Val Glu Asn His Asp Thr Gln Pro Gly Gln Ser Leu Glu<br>                325                      330                      335 | | 1008 |
| tcg aca gtc caa act tgg ttt aaa ccg ctt gca tac gcc ttt att ttg<br>Ser Thr Val Gln Thr Trp Phe Lys Pro Leu Ala Tyr Ala Phe Ile Leu<br>                    340                      345                      350 | | 1056 |
| aca aga gaa tcc ggt tat cct cag gtg ttc tat ggg gat atg tac ggg<br>Thr Arg Glu Ser Gly Tyr Pro Gln Val Phe Tyr Gly Asp Met Tyr Gly<br>             355                      360                      365 | | 1104 |
| aca aaa ggg aca tcg cca aag gaa att ccc tca ctg aaa gat aat ata<br>Thr Lys Gly Thr Ser Pro Lys Glu Ile Pro Ser Leu Lys Asp Asn Ile<br>        370                     375                      380 | | 1152 |
| gag ccg att tta aaa gcg cgt aag gag tac gca tac ggg ccc cag cac<br>Glu Pro Ile Leu Lys Ala Arg Lys Glu Tyr Ala Tyr Gly Pro Gln His<br>385                     390                      395                     400 | | 1200 |
| gat tat att gac cac ccg gat gtg atc gga tgg acg agg gaa ggt gac<br>Asp Tyr Ile Asp His Pro Asp Val Ile Gly Trp Thr Arg Glu Gly Asp<br>                405                      410                      415 | | 1248 |
| agc tcc gcc gcc aaa tca ggt ttg gcc gct tta atc acg gac gga ccc<br>Ser Ser Ala Ala Lys Ser Gly Leu Ala Ala Leu Ile Thr Asp Gly Pro<br>                    420                      425                      430 | | 1296 |
| ggc gga tca aag cgg atg tat gcc ggc ctg aaa aat gcc ggc gag aca<br>Gly Gly Ser Lys Arg Met Tyr Ala Gly Leu Lys Asn Ala Gly Glu Thr<br>             435                      440                      445 | | 1344 |
| tgg tat gac ata acg ggc aac cgt tca gat act gta aaa atc gga tct<br>Trp Tyr Asp Ile Thr Gly Asn Arg Ser Asp Thr Val Lys Ile Gly Ser<br>        450                     455                      460 | | 1392 |
| gac ggc tgg gga gag ttt cat gta aac gat ggg tcc gtc tcc att tat<br>Asp Gly Trp Gly Glu Phe His Val Asn Asp Gly Ser Val Ser Ile Tyr<br>465                     470                      475                     480 | | 1440 |
| gtt cca aaa ata agt act act tcc caa ata aca ttt act gta aat aac<br>Val Pro Lys Ile Ser Thr Thr Ser Gln Ile Thr Phe Thr Val Asn Asn<br>                485                      490                      495 | | 1488 |
| gcc aca acc gtt tgg gga caa aat gta tac gtt gtc ggg aat att tcg<br>Ala Thr Thr Val Trp Gly Gln Asn Val Tyr Val Val Gly Asn Ile Ser<br>                    500                      505                      510 | | 1536 |
| cag ctg ggg aac tgg gat cca gtc cac gca gtt caa atg acg ccg tct<br>Gln Leu Gly Asn Trp Asp Pro Val His Ala Val Gln Met Thr Pro Ser<br>             515                      520                      525 | | 1584 |
| tct tat cca aca tgg act gta aca atc cct ctt ctt caa ggg caa aac<br>Ser Tyr Pro Thr Trp Thr Val Thr Ile Pro Leu Leu Gln Gly Gln Asn<br>        530                     535                      540 | | 1632 |
| ata caa ttt aaa ttt atc aaa aaa gat tca gct gga aat gtc att tgg<br>Ile Gln Phe Lys Phe Ile Lys Lys Asp Ser Ala Gly Asn Val Ile Trp<br>545                     550                      555                     560 | | 1680 |

```
gaa gat ata tcg aat cga aca tac acc gtc cca act gct gca tcc gga    1728
Glu Asp Ile Ser Asn Arg Thr Tyr Thr Val Pro Thr Ala Ala Ser Gly
        565                 570                 575 gca tat aca gcc agc tgg aac gtg ccc                                1755
Ala Tyr Thr Ala Ser Trp Asn Val Pro
        580                 585

<210> SEQ ID NO 14
<211> LENGTH: 585
<212> TYPE: PRT
<213> ORGANISM: BAN-CBM

<400> SEQUENCE: 14

Val Asn Gly Thr Leu Met Gln Tyr Phe Glu Trp Tyr Thr Pro Asn Asp
1               5                   10                  15

Gly Gln His Trp Lys Arg Leu Gln Asn Asp Ala Glu His Leu Ser Asp
            20                  25                  30

Ile Gly Ile Thr Ala Val Trp Ile Pro Pro Ala Tyr Lys Gly Leu Ser
        35                  40                  45

Gln Ser Asp Asn Gly Tyr Gly Pro Tyr Asp Leu Tyr Asp Leu Gly Glu
    50                  55                  60

Phe Gln Gln Lys Gly Thr Val Arg Thr Lys Tyr Gly Thr Lys Ser Glu
65                  70                  75                  80

Leu Gln Asp Ala Ile Gly Ser Leu His Ser Arg Asn Val Gln Val Tyr
                85                  90                  95

Gly Asp Val Val Leu Asn His Lys Ala Gly Ala Asp Ala Thr Glu Asp
            100                 105                 110

Val Thr Ala Val Glu Val Asn Pro Ala Asn Arg Asn Gln Glu Thr Ser
        115                 120                 125

Glu Glu Tyr Gln Ile Lys Ala Trp Thr Asp Phe Arg Phe Pro Gly Arg
    130                 135                 140

Gly Asn Thr Tyr Ser Asp Phe Lys Trp His Trp Tyr His Phe Asp Gly
145                 150                 155                 160

Ala Asp Trp Asp Glu Ser Arg Lys Ile Ser Arg Ile Phe Lys Phe Arg
                165                 170                 175

Gly Glu Gly Lys Ala Trp Asp Trp Glu Val Ser Ser Glu Asn Gly Asn
            180                 185                 190

Tyr Asp Tyr Leu Met Tyr Ala Asp Val Asp Tyr Asp His Pro Asp Val
        195                 200                 205

Val Ala Glu Thr Lys Lys Trp Gly Ile Trp Tyr Ala Asn Glu Leu Ser
    210                 215                 220

Leu Asp Gly Phe Arg Ile Asp Ala Ala Lys His Ile Lys Phe Ser Phe
225                 230                 235                 240

Leu Arg Asp Trp Val Gln Ala Val Arg Gln Ala Thr Gly Lys Glu Met
                245                 250                 255

Phe Thr Val Ala Glu Tyr Trp Gln Asn Asn Ala Gly Lys Leu Glu Asn
            260                 265                 270

Tyr Leu Asn Lys Thr Ser Phe Asn Gln Ser Val Phe Asp Val Pro Leu
        275                 280                 285

His Phe Asn Leu Gln Ala Ala Ser Ser Gln Gly Gly Gly Tyr Asp Met
    290                 295                 300

Arg Arg Leu Leu Asp Gly Thr Val Val Ser Arg His Pro Glu Lys Ala
305                 310                 315                 320

Val Thr Phe Val Glu Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
```

```
                          340              345              350
Thr Arg Glu Ser Gly Tyr Pro Gln Val Phe Tyr Gly Asp Met Tyr Gly
            355                  360                  365
Thr Lys Gly Thr Ser Pro Lys Glu Ile Pro Ser Leu Lys Asp Asn Ile
        370                  375                  380
Glu Pro Ile Leu Lys Ala Arg Lys Glu Tyr Ala Tyr Gly Pro Gln His
385                  390                  395                  400
Asp Tyr Ile Asp His Pro Asp Val Ile Gly Trp Thr Arg Glu Gly Asp
                405                  410                  415
Ser Ser Ala Ala Lys Ser Gly Leu Ala Ala Leu Ile Thr Asp Gly Pro
            420                  425                  430
Gly Gly Ser Lys Arg Met Tyr Ala Gly Leu Lys Asn Ala Gly Glu Thr
        435                  440                  445
Trp Tyr Asp Ile Thr Gly Asn Arg Ser Asp Thr Val Lys Ile Gly Ser
        450                  455                  460
Asp Gly Trp Gly Glu Phe His Val Asn Asp Gly Ser Val Ser Ile Tyr
465                  470                  475                  480
Val Pro Lys Ile Ser Thr Thr Ser Gln Ile Thr Phe Thr Val Asn Asn
                485                  490                  495
Ala Thr Thr Val Trp Gly Gln Asn Val Tyr Val Val Gly Asn Ile Ser
            500                  505                  510
Gln Leu Gly Asn Trp Asp Pro Val His Ala Val Gln Met Thr Pro Ser
        515                  520                  525
Ser Tyr Pro Thr Trp Thr Val Thr Ile Pro Leu Leu Gln Gly Gln Asn
        530                  535                  540
Ile Gln Phe Lys Phe Ile Lys Lys Asp Ser Ala Gly Asn Val Ile Trp
545                  550                  555                  560
Glu Asp Ile Ser Asn Arg Thr Tyr Thr Val Pro Thr Ala Ala Ser Gly
                565                  570                  575
Ala Tyr Thr Ala Ser Trp Asn Val Pro
            580                  585

<210> SEQ ID NO 15
<211> LENGTH: 87
<212> TYPE: DNA
<213> ORGANISM: Bacillus licheniformis
<220> FEATURE:
<221> NAME/KEY: CDS
<222> LOCATION: (1)..(87)

<400> SEQUENCE: 15 atg aaa caa caa aaa cgg ctt tac gcc cga ttg ctg acg ctg tta ttt     48
Met Lys Gln Gln Lys Arg Leu Tyr Ala Arg Leu Leu Thr Leu Leu Phe
1               5                   10                  15 gcg ctc atc ttc ttg ctg cct cat tct gca gcc gcg gca                 87
Ala Leu Ile Phe Leu Leu Pro His Ser Ala Ala Ala Ala
            20                  25

<210> SEQ ID NO 16
<211> LENGTH: 29
<212> TYPE: PRT
<213> ORGANISM: Bacillus licheniformis

<400> SEQUENCE: 16

Met Lys Gln Gln Lys Arg Leu Tyr Ala Arg Leu Leu Thr Leu Leu Phe
1               5                   10                  15

Ala Leu Ile Phe Leu Leu Pro His Ser Ala Ala Ala Ala
            20                  25
```

<210> SEQ ID NO 17
<211> LENGTH: 1758
<212> TYPE: DNA
<213> ORGANISM: BSG(AB)-CBM
<220> FEATURE:
<221> NAME/KEY: CDS
<222> LOCATION: (1)..(1758)

<400> SEQUENCE: 17

| | | | | | | | | | | | | | | | | |
|---|---|---|---|---|---|---|---|---|---|---|---|---|---|---|---|---|
| gca | ccg | ttt | aac | ggc | ttt | aac | ggc | acc | atg | atg | cag | tat | ttt | gaa | tgg | 48 |
| Ala | Pro | Phe | Asn | Gly | Phe | Asn | Gly | Thr | Met | Met | Gln | Tyr | Phe | Glu | Trp | |
| 1 | | | | 5 | | | | | 10 | | | | | 15 | | |

| | | | | | | | | | | | | | | | | |
|---|---|---|---|---|---|---|---|---|---|---|---|---|---|---|---|---|
| tac | ttg | ccg | gat | gat | ggc | acg | tta | tgg | acc | aaa | gtg | gcc | aat | gaa | gcc | 96 |
| Tyr | Leu | Pro | Asp | Asp | Gly | Thr | Leu | Trp | Thr | Lys | Val | Ala | Asn | Glu | Ala | |
| | | 20 | | | | | 25 | | | | | 30 | | | | |

| | | | | | | | | | | | | | | | | |
|---|---|---|---|---|---|---|---|---|---|---|---|---|---|---|---|---|
| aac | aac | tta | tcc | agc | ctt | ggc | atc | acc | gct | ctt | tgg | ctg | ccg | ccc | gct | 144 |
| Asn | Asn | Leu | Ser | Ser | Leu | Gly | Ile | Thr | Ala | Leu | Trp | Leu | Pro | Pro | Ala | |
| | | | 35 | | | | | 40 | | | | | 45 | | | |

| | | | | | | | | | | | | | | | | |
|---|---|---|---|---|---|---|---|---|---|---|---|---|---|---|---|---|
| tac | aaa | gga | aca | agc | cgc | agc | gac | gta | ggg | tac | gga | gta | tac | gac | ttg | 192 |
| Tyr | Lys | Gly | Thr | Ser | Arg | Ser | Asp | Val | Gly | Tyr | Gly | Val | Tyr | Asp | Leu | |
| 50 | | | | | 55 | | | | | 60 | | | | | | |

| | | | | | | | | | | | | | | | | |
|---|---|---|---|---|---|---|---|---|---|---|---|---|---|---|---|---|
| tat | gac | ctc | ggc | gaa | ttc | aat | caa | aaa | ggg | acc | gtc | cgc | aca | aaa | tac | 240 |
| Tyr | Asp | Leu | Gly | Glu | Phe | Asn | Gln | Lys | Gly | Thr | Val | Arg | Thr | Lys | Tyr | |
| 65 | | | | 70 | | | | | 75 | | | | | 80 | | |

| | | | | | | | | | | | | | | | | |
|---|---|---|---|---|---|---|---|---|---|---|---|---|---|---|---|---|
| gga | aca | aaa | gct | caa | tat | ctt | caa | gcc | att | caa | gcc | gcc | cac | gcc | gct | 288 |
| Gly | Thr | Lys | Ala | Gln | Tyr | Leu | Gln | Ala | Ile | Gln | Ala | Ala | His | Ala | Ala | |
| | | | | 85 | | | | | 90 | | | | | 95 | | |

| | | | | | | | | | | | | | | | | |
|---|---|---|---|---|---|---|---|---|---|---|---|---|---|---|---|---|
| gga | atg | caa | gtg | tac | gcc | gat | gtc | gtg | ttc | gac | cat | aaa | ggc | ggc | gct | 336 |
| Gly | Met | Gln | Val | Tyr | Ala | Asp | Val | Val | Phe | Asp | His | Lys | Gly | Gly | Ala | |
| | | | 100 | | | | | 105 | | | | | 110 | | | |

| | | | | | | | | | | | | | | | | |
|---|---|---|---|---|---|---|---|---|---|---|---|---|---|---|---|---|
| gac | ggc | acg | gaa | tgg | gtg | gac | gcc | gtc | gaa | gtc | aat | ccg | tcc | gac | cgc | 384 |
| Asp | Gly | Thr | Glu | Trp | Val | Asp | Ala | Val | Glu | Val | Asn | Pro | Ser | Asp | Arg | |
| | | 115 | | | | | 120 | | | | | 125 | | | | |

| | | | | | | | | | | | | | | | | |
|---|---|---|---|---|---|---|---|---|---|---|---|---|---|---|---|---|
| aac | caa | gaa | atc | tcg | ggc | acc | tat | caa | atc | caa | gca | tgg | acg | aaa | ttt | 432 |
| Asn | Gln | Glu | Ile | Ser | Gly | Thr | Tyr | Gln | Ile | Gln | Ala | Trp | Thr | Lys | Phe | |
| | 130 | | | | | 135 | | | | | 140 | | | | | |

| | | | | | | | | | | | | | | | | |
|---|---|---|---|---|---|---|---|---|---|---|---|---|---|---|---|---|
| gat | ttt | ccc | ggg | cgg | ggc | aac | acc | tac | tcc | agc | ttt | aag | tgg | cgc | tgg | 480 |
| Asp | Phe | Pro | Gly | Arg | Gly | Asn | Thr | Tyr | Ser | Ser | Phe | Lys | Trp | Arg | Trp | |
| 145 | | | | | 150 | | | | | 155 | | | | | 160 | |

| | | | | | | | | | | | | | | | | |
|---|---|---|---|---|---|---|---|---|---|---|---|---|---|---|---|---|
| tac | cat | ttt | gac | ggc | gtt | gat | tgg | gac | gaa | agc | cga | aaa | ttg | agc | cgc | 528 |
| Tyr | His | Phe | Asp | Gly | Val | Asp | Trp | Asp | Glu | Ser | Arg | Lys | Leu | Ser | Arg | |
| | | | | 165 | | | | | 170 | | | | | 175 | | |

| | | | | | | | | | | | | | | | | |
|---|---|---|---|---|---|---|---|---|---|---|---|---|---|---|---|---|
| att | tac | aaa | ttc | cgt | ggc | aag | gct | tgg | gat | tgg | gaa | gta | gac | acg | gaa | 576 |
| Ile | Tyr | Lys | Phe | Arg | Gly | Lys | Ala | Trp | Asp | Trp | Glu | Val | Asp | Thr | Glu | |
| | | | 180 | | | | | 185 | | | | | 190 | | | |

| | | | | | | | | | | | | | | | | |
|---|---|---|---|---|---|---|---|---|---|---|---|---|---|---|---|---|
| ttc | gga | aac | tat | gac | tac | tta | atg | tat | gcc | gac | ctt | gat | atg | gat | cat | 624 |
| Phe | Gly | Asn | Tyr | Asp | Tyr | Leu | Met | Tyr | Ala | Asp | Leu | Asp | Met | Asp | His | |
| | | 195 | | | | | 200 | | | | | 205 | | | | |

| | | | | | | | | | | | | | | | | |
|---|---|---|---|---|---|---|---|---|---|---|---|---|---|---|---|---|
| ccc | gaa | gtc | gtg | acc | gag | ctg | aaa | aac | tgg | ggg | aaa | tgg | tat | gtc | aac | 672 |
| Pro | Glu | Val | Val | Thr | Glu | Leu | Lys | Asn | Trp | Gly | Lys | Trp | Tyr | Val | Asn | |
| | 210 | | | | | 215 | | | | | 220 | | | | | |

| | | | | | | | | | | | | | | | | |
|---|---|---|---|---|---|---|---|---|---|---|---|---|---|---|---|---|
| aca | acg | aac | att | gat | ggg | ttc | cgg | ctt | gat | gcc | gtc | aag | cat | att | aag | 720 |
| Thr | Thr | Asn | Ile | Asp | Gly | Phe | Arg | Leu | Asp | Ala | Val | Lys | His | Ile | Lys | |
| 225 | | | | | 230 | | | | | 235 | | | | | 240 | |

| | | | | | | | | | | | | | | | | |
|---|---|---|---|---|---|---|---|---|---|---|---|---|---|---|---|---|
| ttc | agt | ttt | ttt | cct | gat | tgg | ttg | tcg | tat | gtg | cgt | tct | cag | act | ggc | 768 |
| Phe | Ser | Phe | Phe | Pro | Asp | Trp | Leu | Ser | Tyr | Val | Arg | Ser | Gln | Thr | Gly | |
| | | | | 245 | | | | | 250 | | | | | 255 | | |

| | | | | | | | | | | | | | | | | |
|---|---|---|---|---|---|---|---|---|---|---|---|---|---|---|---|---|
| aag | ccg | cta | ttt | acc | gtc | ggg | gaa | tat | tgg | agc | tat | gac | atc | aac | aag | 816 |
| Lys | Pro | Leu | Phe | Thr | Val | Gly | Glu | Tyr | Trp | Ser | Tyr | Asp | Ile | Asn | Lys | |
| | | | 260 | | | | | 265 | | | | | 270 | | | |

| | | | | | | | | | | | | | | | | |
|---|---|---|---|---|---|---|---|---|---|---|---|---|---|---|---|---|
| ttg | cac | aat | tac | att | acg | aaa | aca | gac | gga | acg | atg | tct | ttg | ttt | gat | 864 |

-continued

```
                Leu His Asn Tyr Ile Thr Lys Thr Asp Gly Thr Met Ser Leu Phe Asp
                        275                 280                 285 gcc ccg tta cac aac aaa ttt tat acc gct tcc aaa tca ggg ggc gca          912
Ala Pro Leu His Asn Lys Phe Tyr Thr Ala Ser Lys Ser Gly Gly Ala
    290                 295                 300 ttt gat atg cgc acg tta atg acc aat act ctc atg aaa gat caa ccg          960
Phe Asp Met Arg Thr Leu Met Thr Asn Thr Leu Met Lys Asp Gln Pro
305                 310                 315                 320 aca ttg gcc gtc acc ttc gtt gat aat cat gac acc gaa ccc ggc caa         1008
Thr Leu Ala Val Thr Phe Val Asp Asn His Asp Thr Glu Pro Gly Gln
                325                 330                 335 gcg ctg caa tca tgg gtc gac cca tgg ttc aaa ccg ttg gct tac gcc         1056
Ala Leu Gln Ser Trp Val Asp Pro Trp Phe Lys Pro Leu Ala Tyr Ala
            340                 345                 350 ttt att cta act cgg cag gaa gga tac ccg tgc gtc ttt tat ggt gac         1104
Phe Ile Leu Thr Arg Gln Glu Gly Tyr Pro Cys Val Phe Tyr Gly Asp
        355                 360                 365 tat tat ggc att cca caa tat aac att cct tcg ctg aaa agc aaa atc         1152
Tyr Tyr Gly Ile Pro Gln Tyr Asn Ile Pro Ser Leu Lys Ser Lys Ile
    370                 375                 380 gat ccg ctc ctc atc gcg cgc agg gat tat gct tac gga aca cag cac         1200
Asp Pro Leu Leu Ile Ala Arg Arg Asp Tyr Ala Tyr Gly Thr Gln His
385                 390                 395                 400 gac tat att gac agt gcg gat att atc ggt tgg acg cgg gaa gga gtg         1248
Asp Tyr Ile Asp Ser Ala Asp Ile Ile Gly Trp Thr Arg Glu Gly Val
                405                 410                 415 gct gaa aaa gca aat tca gga ctg gct gca ctc att acc gac ggg cct         1296
Ala Glu Lys Ala Asn Ser Gly Leu Ala Ala Leu Ile Thr Asp Gly Pro
            420                 425                 430 ggc gga agc aaa tgg atg tat gtt gga aaa caa cac gct ggc aaa acg         1344
Gly Gly Ser Lys Trp Met Tyr Val Gly Lys Gln His Ala Gly Lys Thr
        435                 440                 445 ttt tat gat tta acc ggc aat cga agt gat aca gtg aca atc aat gct         1392
Phe Tyr Asp Leu Thr Gly Asn Arg Ser Asp Thr Val Thr Ile Asn Ala
    450                 455                 460 gat gga tgg gga gaa ttt aaa gtc aat gga ggg tct gta tcc ata tgg         1440
Asp Gly Trp Gly Glu Phe Lys Val Asn Gly Gly Ser Val Ser Ile Trp
465                 470                 475                 480 gtt cca aaa ata agt act act tcc caa ata aca ttt act gta aat aac         1488
Val Pro Lys Ile Ser Thr Thr Ser Gln Ile Thr Phe Thr Val Asn Asn
                485                 490                 495 gcc aca acc gtt tgg gga caa aat gta tac gtt gtc ggg aat att tcg         1536
Ala Thr Thr Val Trp Gly Gln Asn Val Tyr Val Val Gly Asn Ile Ser
            500                 505                 510 cag ctg ggg aac tgg gat cca gtc cac gca gtt caa atg acg ccg tct         1584
Gln Leu Gly Asn Trp Asp Pro Val His Ala Val Gln Met Thr Pro Ser
        515                 520                 525 tct tat cca aca tgg act gta aca atc cct ctt ctt caa ggg caa aac         1632
Ser Tyr Pro Thr Trp Thr Val Thr Ile Pro Leu Leu Gln Gly Gln Asn
    530                 535                 540 ata caa ttt aaa ttt atc aaa aaa gat tca gct gga aat gtc att tgg         1680
Ile Gln Phe Lys Phe Ile Lys Lys Asp Ser Ala Gly Asn Val Ile Trp
545                 550                 555                 560 gaa gat ata tcg aat cga aca tac acc gtc cca act gct gca tcc gga         1728
Glu Asp Ile Ser Asn Arg Thr Tyr Thr Val Pro Thr Ala Ala Ser Gly
                565                 570                 575 gca tat aca gcc agc tgg aac gtg ccc tag                                  1758
Ala Tyr Thr Ala Ser Trp Asn Val Pro
            580                 585
```

```
<210> SEQ ID NO 18
<211> LENGTH: 585
<212> TYPE: PRT
<213> ORGANISM: BSG(AB)-CBM

<400> SEQUENCE: 18

Ala Pro Phe Asn Gly Phe Asn Gly Thr Met Met Gln Tyr Phe Glu Trp
 1               5                  10                  15

Tyr Leu Pro Asp Asp Gly Thr Leu Trp Thr Lys Val Ala Asn Glu Ala
             20                  25                  30

Asn Asn Leu Ser Ser Leu Gly Ile Thr Ala Leu Trp Leu Pro Pro Ala
         35                  40                  45

Tyr Lys Gly Thr Ser Arg Ser Asp Val Gly Tyr Gly Val Tyr Asp Leu
     50                  55                  60

Tyr Asp Leu Gly Glu Phe Asn Gln Lys Gly Thr Val Arg Thr Lys Tyr
 65                  70                  75                  80

Gly Thr Lys Ala Gln Tyr Leu Gln Ala Ile Gln Ala Ala His Ala Ala
                 85                  90                  95

Gly Met Gln Val Tyr Ala Asp Val Val Phe Asp His Lys Gly Gly Ala
            100                 105                 110

Asp Gly Thr Glu Trp Val Asp Ala Val Glu Val Asn Pro Ser Asp Arg
        115                 120                 125

Asn Gln Glu Ile Ser Gly Thr Tyr Gln Ile Gln Ala Trp Thr Lys Phe
    130                 135                 140

Asp Phe Pro Gly Arg Gly Asn Thr Tyr Ser Ser Phe Lys Trp Arg Trp
145                 150                 155                 160

Tyr His Phe Asp Gly Val Asp Trp Asp Glu Ser Arg Lys Leu Ser Arg
                165                 170                 175

Ile Tyr Lys Phe Arg Gly Lys Ala Trp Asp Trp Glu Val Asp Thr Glu
            180                 185                 190

Phe Gly Asn Tyr Asp Tyr Leu Met Tyr Ala Asp Leu Asp Met Asp His
        195                 200                 205

Pro Glu Val Val Thr Glu Leu Lys Asn Trp Gly Lys Trp Tyr Val Asn
    210                 215                 220

Thr Thr Asn Ile Asp Gly Phe Arg Leu Asp Ala Val Lys His Ile Lys
225                 230                 235                 240

Phe Ser Phe Phe Pro Asp Trp Leu Ser Tyr Val Arg Ser Gln Thr Gly
                245                 250                 255

Lys Pro Leu Phe Thr Val Gly Glu Tyr Trp Ser Tyr Asp Ile Asn Lys
            260                 265                 270

Leu His Asn Tyr Ile Thr Lys Thr Asp Gly Thr Met Ser Leu Phe Asp
        275                 280                 285

Ala Pro Leu His Asn Lys Phe Tyr Thr Ala Ser Lys Ser Gly Gly Ala
    290                 295                 300

Phe Asp Met Arg Thr Leu Met Thr Asn Thr Leu Met Lys Asp Gln Pro
305                 310                 315                 320

Thr Leu Ala Val Thr Phe Val Asp Asn His Asp Thr Glu Pro Gly Gln
                325                 330                 335

Ala Leu Gln Ser Trp Val Asp Pro Trp Phe Lys Pro Leu Ala Tyr Ala
            340                 345                 350

Phe Ile Leu Thr Arg Gln Glu Gly Tyr Pro Cys Val Phe Tyr Gly Asp
        355                 360                 365

Tyr Tyr Gly Ile Pro Gln Tyr Asn Ile Pro Ser Leu Lys Ser Lys Ile
    370                 375                 380

Asp Pro Leu Leu Ile Ala Arg Arg Asp Tyr Ala Tyr Gly Thr Gln His
```

```
                385                 390                 395                 400
Asp Tyr Ile Asp Ser Ala Asp Ile Ile Gly Trp Thr Arg Glu Gly Val
                405                 410                 415

Ala Glu Lys Ala Asn Ser Gly Leu Ala Ala Leu Ile Thr Asp Gly Pro
            420                 425                 430

Gly Gly Ser Lys Trp Met Tyr Val Gly Lys Gln His Ala Gly Lys Thr
        435                 440                 445

Phe Tyr Asp Leu Thr Gly Asn Arg Ser Asp Thr Val Thr Ile Asn Ala
    450                 455                 460

Asp Gly Trp Gly Glu Phe Lys Val Asn Gly Gly Ser Val Ser Ile Trp
465                 470                 475                 480

Val Pro Lys Ile Ser Thr Thr Ser Gln Ile Thr Phe Thr Val Asn Asn
                485                 490                 495

Ala Thr Thr Val Trp Gly Gln Asn Val Tyr Val Gly Asn Ile Ser
            500                 505                 510

Gln Leu Gly Asn Trp Asp Pro Val His Ala Val Gln Met Thr Pro Ser
        515                 520                 525

Ser Tyr Pro Thr Trp Thr Val Thr Ile Pro Leu Leu Gln Gly Gln Asn
    530                 535                 540

Ile Gln Phe Lys Phe Ile Lys Lys Asp Ser Ala Gly Asn Val Ile Trp
545                 550                 555                 560

Glu Asp Ile Ser Asn Arg Thr Tyr Thr Val Pro Thr Ala Ala Ser Gly
                565                 570                 575

Ala Tyr Thr Ala Ser Trp Asn Val Pro
            580                 585

<210> SEQ ID NO 19
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 19
ctcattctgc agccgcggca gcaaatctta atgggacgct                          40

<210> SEQ ID NO 20
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 20
atttgggaag tagtacttat tctttgaaca taaattgaaa                          40

<210> SEQ ID NO 21
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 21
```

```
ctcattctgc agccgcggca gtaaatggca cgctgatgca                                40
```

<210> SEQ ID NO 22
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 22

```
atttgggaag tagtacttat ttttggaaca taaattgaaa                                40
```

<210> SEQ ID NO 23
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 23

```
ctcattctgc agccgcggca gcaccgttta acggctttaa                                40
```

<210> SEQ ID NO 24
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 24

```
atttgggaag tagtacttat tttaggaacc caaaccgaaa                                40
```

<210> SEQ ID NO 25
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 25

```
ctcattctgc agccgcggca catcataatg ggacaaatgg                                40
```

<210> SEQ ID NO 26
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 26

```
atttgggaag tagtacttat ccatttgtcc cattatgatg                                40
```

<210> SEQ ID NO 27

```
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 27
ctcattctgc agccgcggca caccataatg gtacgaacgg                              40

<210> SEQ ID NO 28
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 28
atttgggaag tagtacttat tttgtttacc caaatagaaa                              40

<210> SEQ ID NO 29
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 29
ctcattctgc agccgcggca gtaaatggca cgctgatgca                              40

<210> SEQ ID NO 30
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 30
atttgggaag tagtacttat ttttggaaca taaatggaga                              40

<210> SEQ ID NO 31
<211> LENGTH: 40
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(40)

<400> SEQUENCE: 31
ctcattctgc agccgcggca gcaccgttta acggctttaa                              40

<210> SEQ ID NO 32
<211> LENGTH: 40
<212> TYPE: DNA
<213> ORGANISM: Artificial
<220> FEATURE:
<223> OTHER INFORMATION: Primer
```

```
<220> FEATURE:
<221> NAME/KEY: misc_feature
<222> LOCATION: (1)..(40)

<400> SEQUENCE: 32
atatagtcgt gctgtgttcc gtaagcataa tccctgcgcg                               40

<210> SEQ ID NO 33
<211> LENGTH: 22
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(22)

<400> SEQUENCE: 33
ctgcatcagg gctgcggcat cc                                                  22

<210> SEQ ID NO 34
<211> LENGTH: 22
<212> TYPE: DNA
<213> ORGANISM: Artificial
<220> FEATURE:
<223> OTHER INFORMATION: Primer
<220> FEATURE:
<221> NAME/KEY: misc_feature
<222> LOCATION: (1)..(22)

<400> SEQUENCE: 34
ctgcatcagg gctgcggcat cc                                                  22

<210> SEQ ID NO 35
<211> LENGTH: 483
<212> TYPE: PRT
<213> ORGANISM: BLA B. licheniformis
<220> FEATURE:
<221> NAME/KEY: mat_peptide
<222> LOCATION: (1)..(483)

<400> SEQUENCE: 35
```

Ala Asn Leu Asn Gly Thr Leu Met Gln Tyr Phe Glu Trp Tyr Met Pro
1               5                   10                  15

Asn Asp Gly Gln His Trp Arg Arg Leu Gln Asn Asp Ser Ala Tyr Leu
            20                  25                  30

Ala Glu His Gly Ile Thr Ala Val Trp Ile Pro Pro Ala Tyr Lys Gly
        35                  40                  45

Thr Ser Gln Ala Asp Val Gly Tyr Gly Ala Tyr Asp Leu Tyr Asp Leu
    50                  55                  60

Gly Glu Phe His Gln Lys Gly Thr Val Arg Thr Lys Tyr Gly Thr Lys
65                  70                  75                  80

Gly Glu Leu Gln Ser Ala Ile Lys Ser Leu His Ser Arg Asp Ile Asn
                85                  90                  95

Val Tyr Gly Asp Val Val Ile Asn His Lys Gly Gly Ala Asp Ala Thr
            100                 105                 110

Glu Asp Val Thr Ala Val Glu Val Asp Pro Ala Asp Arg Asn Arg Val
        115                 120                 125

Ile Ser Gly Glu His Leu Ile Lys Ala Trp Thr His Phe His Phe Pro
    130                 135                 140

Gly Arg Gly Ser Thr Tyr Ser Asp Phe Lys Trp His Trp Tyr His Phe
145                 150                 155                 160

Asp Gly Thr Asp Trp Asp Glu Ser Arg Lys Leu Asn Arg Ile Tyr Lys

```
                    165                 170                 175
Phe Gln Gly Lys Ala Trp Asp Trp Glu Val Ser Asn Glu Asn Gly Asn
                180                 185                 190

Tyr Asp Tyr Leu Met Tyr Ala Asp Ile Asp Tyr Asp His Pro Asp Val
            195                 200                 205

Ala Ala Glu Ile Lys Arg Trp Gly Thr Trp Tyr Ala Asn Glu Leu Gln
        210                 215                 220

Leu Asp Gly Phe Arg Leu Asp Ala Val Lys His Ile Lys Phe Ser Phe
225                 230                 235                 240

Leu Arg Asp Trp Val Asn His Val Arg Glu Lys Thr Gly Lys Glu Met
                245                 250                 255

Phe Thr Val Ala Glu Tyr Trp Gln Asn Asp Leu Gly Ala Leu Glu Asn
            260                 265                 270

Tyr Leu Asn Lys Thr Asn Phe Asn His Ser Val Phe Asp Val Pro Leu
        275                 280                 285

His Tyr Gln Phe His Ala Ala Ser Thr Gln Gly Gly Gly Tyr Asp Met
290                 295                 300

Arg Lys Leu Leu Asn Gly Thr Val Val Ser Lys His Pro Leu Lys Ser
305                 310                 315                 320

Val Thr Phe Val Asp Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Asp Ser Gln Arg Glu Ile Pro Ala Leu Lys His Lys Ile
370                 375                 380

Glu Pro Ile Leu Lys Ala Arg Lys Gln Tyr Ala Tyr Gly Ala Gln His
385                 390                 395                 400

Asp Tyr Phe Asp His His Asp Ile Val Gly Trp Thr Arg Glu Gly Asp
                405                 410                 415

Ser Ser Val Ala Asn Ser Gly Leu Ala Ala Leu Ile Thr Asp Gly Pro
            420                 425                 430

Gly Gly Ala Lys Arg Met Tyr Val Gly Arg Gln Asn Ala Gly Glu Thr
        435                 440                 445

Trp His Asp Ile Thr Gly Asn Arg Ser Glu Pro Val Val Ile Asn Ser
450                 455                 460

Glu Gly Trp Gly Glu Phe His Val Asn Gly Gly Ser Val Ser Ile Tyr
465                 470                 475                 480

Val Gln Arg

<210> SEQ ID NO 36
<211> LENGTH: 514
<212> TYPE: PRT
<213> ORGANISM: BSG B. stearothermophilus
<220> FEATURE:
<221> NAME/KEY: mat_peptide
<222> LOCATION: (1)..(514)

<400> SEQUENCE: 36

Ala Ala Pro Phe Asn Gly Thr Met Met Gln Tyr Phe Glu Trp Tyr Leu
1               5                   10                  15

Pro Asp Asp Gly Thr Leu Trp Thr Lys Val Ala Asn Glu Ala Asn Asn
                20                  25                  30

Leu Ser Ser Leu Gly Ile Thr Ala Leu Trp Leu Pro Pro Ala Tyr Lys
            35                  40                  45
```

-continued

```
Gly Thr Ser Arg Ser Asp Val Gly Tyr Gly Val Tyr Asp Leu Tyr Asp
     50                  55                  60

Leu Gly Glu Phe Asn Gln Lys Gly Thr Val Arg Thr Lys Tyr Gly Thr
 65                  70                  75                  80

Lys Ala Gln Tyr Leu Gln Ala Ile Gln Ala Ala His Ala Ala Gly Met
                 85                  90                  95

Gln Val Tyr Ala Asp Val Val Phe Asp His Lys Gly Gly Ala Asp Gly
             100                 105                 110

Thr Glu Trp Val Asp Ala Val Glu Val Asn Pro Ser Asp Arg Asn Gln
         115                 120                 125

Glu Ile Ser Gly Thr Tyr Gln Ile Gln Ala Trp Thr Lys Phe Asp Phe
     130                 135                 140

Pro Gly Arg Gly Asn Thr Tyr Ser Ser Phe Lys Trp Arg Trp Tyr His
145                 150                 155                 160

Phe Asp Gly Val Asp Trp Asp Glu Ser Arg Lys Leu Ser Arg Ile Tyr
                 165                 170                 175

Lys Phe Arg Gly Ile Gly Lys Ala Trp Asp Trp Glu Val Asp Thr Glu
             180                 185                 190

Asn Gly Asn Tyr Asp Tyr Leu Met Tyr Ala Asp Leu Asp Met Asp His
         195                 200                 205

Pro Glu Val Val Thr Glu Leu Lys Asn Trp Gly Lys Trp Tyr Val Asn
     210                 215                 220

Thr Thr Asn Ile Asp Gly Phe Arg Leu Asp Ala Val Lys His Ile Lys
225                 230                 235                 240

Phe Ser Phe Phe Pro Asp Trp Leu Ser Tyr Val Arg Ser Gln Thr Gly
                 245                 250                 255

Lys Pro Leu Phe Thr Val Gly Glu Tyr Trp Ser Tyr Asp Ile Asn Lys
             260                 265                 270

Leu His Asn Tyr Ile Thr Lys Thr Asp Gly Thr Met Ser Leu Phe Asp
         275                 280                 285

Ala Pro Leu His Asn Lys Phe Tyr Thr Ala Ser Lys Ser Gly Gly Ala
     290                 295                 300

Phe Asp Met Arg Thr Leu Met Thr Asn Thr Leu Met Lys Asp Gln Pro
305                 310                 315                 320

Thr Leu Ala Val Thr Phe Val Asp Asn His Asp Thr Glu Pro Gly Gln
                 325                 330                 335

Ala Leu Gln Ser Trp Val Asp Pro Trp Phe Lys Pro Leu Ala Tyr Ala
             340                 345                 350

Phe Ile Leu Thr Arg Gln Glu Gly Tyr Pro Cys Val Phe Tyr Gly Asp
         355                 360                 365

Tyr Tyr Gly Ile Pro Gln Tyr Asn Ile Pro Ser Leu Lys Ser Lys Ile
     370                 375                 380

Asp Pro Leu Leu Ile Ala Arg Arg Asp Tyr Ala Tyr Gly Thr Gln His
385                 390                 395                 400

Asp Tyr Leu Asp His Ser Asp Ile Ile Gly Trp Thr Arg Glu Gly Gly
                 405                 410                 415

Thr Glu Lys Pro Gly Ser Gly Leu Ala Ala Leu Ile Thr Asp Gly Pro
             420                 425                 430

Gly Gly Ser Lys Trp Met Tyr Val Gly Lys Gln His Ala Gly Lys Val
         435                 440                 445

Phe Tyr Asp Leu Thr Gly Asn Arg Ser Asp Thr Val Thr Ile Asn Ser
     450                 455                 460

Asp Gly Trp Gly Glu Phe Lys Val Asn Gly Gly Ser Val Ser Val Trp
```

```
                          465                 470                 475                 480

Val Pro Arg Lys Thr Thr Val Ser Thr Ile Ala Arg Pro Ile Thr Thr
                    485                 490                 495

Arg Pro Trp Thr Gly Glu Phe Val Arg Trp Thr Glu Pro Arg Leu Val
                    500                 505                 510

Ala Trp

<210> SEQ ID NO 37
<211> LENGTH: 482
<212> TYPE: PRT
<213> ORGANISM: BAN B. amyloliquefacience
<220> FEATURE:
<221> NAME/KEY: mat_peptide
<222> LOCATION: (1)..(482)

<400> SEQUENCE: 37

Val Asn Gly Thr Leu Met Gln Tyr Phe Glu Trp Tyr Thr Pro Asn Asp
    1               5                   10                  15

Gly Gln His Trp Lys Arg Leu Gln Asn Asp Ala Glu His Leu Ser Asp
                    20                  25                  30

Ile Gly Ile Thr Ala Val Trp Ile Pro Pro Ala Tyr Lys Gly Leu Ser
                35                  40                  45

Gln Ser Asp Asn Gly Tyr Gly Pro Tyr Asp Leu Tyr Asp Leu Gly Glu
            50                  55                  60

Phe Gln Gln Lys Gly Thr Val Arg Thr Lys Tyr Gly Thr Lys Ser Glu
    65                  70                  75                  80

Leu Gln Asp Ala Ile Gly Ser Leu His Ser Arg Asn Val Gln Val Tyr
                    85                  90                  95

Gly Asp Val Val Leu Asn His Lys Ala Gly Ala Asp Ala Thr Glu Asp
                100                 105                 110

Val Thr Ala Val Glu Val Asn Pro Ala Asn Arg Asn Gln Glu Thr Ser
                115                 120                 125

Glu Glu Tyr Gln Ile Lys Ala Trp Thr Asp Phe Arg Phe Pro Gly Arg
            130                 135                 140

Gly Asn Thr Tyr Ser Asp Phe Lys Trp His Trp Tyr His Phe Asp Gly
    145                 150                 155                 160

Ala Asp Trp Asp Glu Ser Arg Lys Ile Ser Arg Ile Phe Lys Phe Arg
                    165                 170                 175

Gly Glu Gly Lys Ala Trp Asp Trp Glu Val Ser Ser Glu Asn Gly Asn
                180                 185                 190

Tyr Asp Tyr Leu Met Tyr Ala Asp Val Asp Tyr Asp His Pro Asp Val
                195                 200                 205

Val Ala Glu Thr Lys Lys Trp Gly Ile Trp Tyr Ala Asn Glu Leu Ser
            210                 215                 220

Leu Asp Gly Phe Arg Ile Asp Ala Ala Lys His Ile Lys Phe Ser Phe
    225                 230                 235                 240

Leu Arg Asp Trp Val Gln Ala Val Arg Gln Ala Thr Gly Lys Glu Met
                    245                 250                 255

Phe Thr Val Ala Glu Tyr Trp Gln Asn Asn Ala Gly Lys Leu Glu Asn
                260                 265                 270

Tyr Leu Asn Lys Thr Ser Phe Asn Gln Ser Val Phe Asp Val Pro Leu
                275                 280                 285

His Phe Asn Leu Gln Ala Ala Ser Ser Gln Gly Gly Gly Tyr Asp Met
            290                 295                 300

Arg Arg Leu Leu Asp Gly Thr Val Val Ser Arg His Pro Glu Lys Ala
    305                 310                 315                 320
```

```
Val Thr Phe Val Glu Asn His Asp Thr Gln Pro Gly Gln Ser Leu Glu
                325                 330                 335

Ser Thr Val Gln Thr Trp Phe Lys Pro Leu Ala Tyr Ala Phe Ile Leu
            340                 345                 350

Thr Arg Glu Ser Gly Tyr Pro Gln Val Phe Tyr Gly Asp Met Tyr Gly
        355                 360                 365

Thr Lys Gly Thr Ser Pro Lys Glu Ile Pro Ser Leu Lys Asp Asn Ile
    370                 375                 380

Glu Pro Ile Leu Lys Ala Arg Lys Glu Tyr Ala Tyr Gly Pro Gln His
385                 390                 395                 400

Asp Tyr Ile Asp His Pro Asp Val Ile Gly Trp Thr Arg Glu Gly Asp
                405                 410                 415

Ser Ser Ala Ala Lys Ser Gly Leu Ala Ala Leu Ile Thr Asp Gly Pro
            420                 425                 430

Gly Gly Ser Lys Arg Met Tyr Ala Gly Leu Lys Asn Ala Gly Glu Thr
        435                 440                 445

Trp Tyr Asp Ile Thr Gly Asn Arg Ser Asp Thr Val Lys Ile Gly Ser
    450                 455                 460

Asp Gly Trp Gly Glu Phe His Val Asn Asp Gly Ser Val Ser Ile Tyr
465                 470                 475                 480

Val Gln

<210> SEQ ID NO 38
<211> LENGTH: 485
<212> TYPE: PRT
<213> ORGANISM: SP722 Bacillus sp.
<220> FEATURE:
<221> NAME/KEY: mat_peptide
<222> LOCATION: (1)..(485)

<400> SEQUENCE: 38

His His Asn Gly Thr Asn Gly Thr Met Met Gln Tyr Phe Glu Trp His
1               5                   10                  15

Leu Pro Asn Asp Gly Asn His Trp Asn Arg Leu Arg Asp Asp Ala Ser
                20                  25                  30

Asn Leu Arg Asn Arg Gly Ile Thr Ala Ile Trp Ile Pro Pro Ala Trp
            35                  40                  45

Lys Gly Thr Ser Gln Asn Asp Val Gly Tyr Gly Ala Tyr Asp Leu Tyr
    50                  55                  60

Asp Leu Gly Glu Phe Asn Gln Lys Gly Thr Val Arg Thr Lys Tyr Gly
65                  70                  75                  80

Thr Arg Ser Gln Leu Glu Ser Ala Ile His Ala Leu Lys Asn Asn Gly
                85                  90                  95

Val Gln Val Tyr Gly Asp Val Val Met Asn His Lys Gly Gly Ala Asp
            100                 105                 110

Ala Thr Glu Asn Val Leu Ala Val Glu Val Asn Pro Asn Asn Arg Asn
    115                 120                 125

Gln Glu Ile Ser Gly Asp Tyr Thr Ile Glu Ala Trp Thr Lys Phe Asp
130                 135                 140

Phe Pro Gly Arg Gly Asn Thr Tyr Ser Asp Phe Lys Trp Arg Trp Tyr
145                 150                 155                 160

His Phe Asp Gly Val Asp Trp Asp Gln Ser Arg Gln Phe Gln Asn Arg
                165                 170                 175

Ile Tyr Lys Phe Arg Gly Asp Gly Lys Ala Trp Asp Trp Glu Val Asp
            180                 185                 190
```

```
Ser Glu Asn Gly Asn Tyr Asp Tyr Leu Met Tyr Ala Asp Val Asp Met
    195                 200                 205

Asp His Pro Glu Val Val Asn Glu Leu Arg Arg Trp Gly Glu Trp Tyr
    210                 215                 220

Thr Asn Thr Leu Asn Leu Asp Gly Phe Arg Ile Asp Ala Val Lys His
225                 230                 235                 240

Ile Lys Tyr Ser Phe Thr Arg Asp Trp Leu Thr His Val Arg Asn Ala
                245                 250                 255

Thr Gly Lys Glu Met Phe Ala Val Ala Glu Phe Trp Lys Asn Asp Leu
                260                 265                 270

Gly Ala Leu Glu Asn Tyr Leu Asn Lys Thr Asn Trp Asn His Ser Val
            275                 280                 285

Phe Asp Val Pro Leu His Tyr Asn Leu Tyr Asn Ala Ser Asn Ser Gly
        290                 295                 300

Gly Asn Tyr Asp Met Ala Lys Leu Leu Asn Gly Thr Val Val Gln Lys
305                 310                 315                 320

His Pro Met His Ala Val Thr Phe Val Asp Asn His Asp Ser Gln Pro
                325                 330                 335

Gly Glu Ser Leu Glu Ser Phe Val Gln Glu Trp Phe Lys Pro Leu Ala
                340                 345                 350

Tyr Ala Leu Ile Leu Thr Arg Glu Gln Gly Tyr Pro Ser Val Phe Tyr
            355                 360                 365

Gly Asp Tyr Tyr Gly Ile Pro Thr His Ser Val Pro Ala Met Lys Ala
        370                 375                 380

Lys Ile Asp Pro Ile Leu Glu Ala Arg Gln Asn Phe Ala Tyr Gly Thr
385                 390                 395                 400

Gln His Asp Tyr Phe Asp His His Asn Ile Ile Gly Trp Thr Arg Glu
                405                 410                 415

Gly Asn Thr Thr His Pro Asn Ser Gly Leu Ala Thr Ile Met Ser Asp
                420                 425                 430

Gly Pro Gly Gly Glu Lys Trp Met Tyr Val Gly Gln Asn Lys Ala Gly
            435                 440                 445

Gln Val Trp His Asp Ile Thr Gly Asn Lys Pro Gly Thr Val Thr Ile
        450                 455                 460

Asn Ala Asp Gly Trp Ala Asn Phe Ser Val Asn Gly Gly Ser Val Ser
465                 470                 475                 480

Ile Trp Val Lys Arg
                485

<210> SEQ ID NO 39
<211> LENGTH: 485
<212> TYPE: PRT
<213> ORGANISM: SP690 Bacillus sp.
<220> FEATURE:
<221> NAME/KEY: mat_peptide
<222> LOCATION: (1)..(485)

<400> SEQUENCE: 39

His His Asn Gly Thr Asn Gly Thr Met Met Gln Tyr Phe Glu Trp Tyr
1               5                   10                  15

Leu Pro Asn Asp Gly Asn His Trp Asn Arg Leu Arg Asp Asp Ala Ala
                20                  25                  30

Asn Leu Lys Ser Lys Gly Ile Thr Ala Val Trp Ile Pro Pro Ala Trp
            35                  40                  45

Lys Gly Thr Ser Gln Asn Asp Val Gly Tyr Gly Ala Tyr Asp Leu Tyr
        50                  55                  60
```

-continued

```
Asp Leu Gly Glu Phe Asn Gln Lys Gly Thr Val Arg Thr Lys Tyr Gly
 65                  70                  75                  80

Thr Arg Asn Gln Leu Gln Ala Ala Val Thr Ser Leu Lys Asn Asn Gly
                 85                  90                  95

Ile Gln Val Tyr Gly Asp Val Val Met Asn His Lys Gly Gly Ala Asp
            100                 105                 110

Gly Thr Glu Ile Val Asn Ala Val Glu Val Asn Arg Ser Asn Arg Asn
        115                 120                 125

Gln Glu Thr Ser Gly Glu Tyr Ala Ile Glu Ala Trp Thr Lys Phe Asp
    130                 135                 140

Phe Pro Gly Arg Gly Asn Asn His Ser Ser Phe Lys Trp Arg Trp Tyr
145                 150                 155                 160

His Phe Asp Gly Thr Asp Trp Asp Gln Ser Arg Gln Leu Gln Asn Lys
                165                 170                 175

Ile Tyr Lys Phe Arg Gly Thr Gly Lys Ala Trp Asp Trp Glu Val Asp
            180                 185                 190

Thr Glu Asn Gly Asn Tyr Asp Tyr Leu Met Tyr Ala Asp Val Asp Met
        195                 200                 205

Asp His Pro Glu Val Ile His Glu Leu Arg Asn Trp Gly Val Trp Tyr
    210                 215                 220

Thr Asn Thr Leu Asn Leu Asp Gly Phe Arg Ile Asp Ala Val Lys His
225                 230                 235                 240

Ile Lys Tyr Ser Phe Thr Arg Asp Trp Leu Thr His Val Arg Asn Thr
                245                 250                 255

Thr Gly Lys Pro Met Phe Ala Val Ala Glu Phe Trp Lys Asn Asp Leu
            260                 265                 270

Gly Ala Ile Glu Asn Tyr Leu Asn Lys Thr Ser Trp Asn His Ser Ala
        275                 280                 285

Phe Asp Val Pro Leu His Tyr Asn Leu Tyr Asn Ala Ser Asn Ser Gly
    290                 295                 300

Gly Tyr Tyr Asp Met Arg Asn Ile Leu Asn Gly Ser Val Val Gln Lys
305                 310                 315                 320

His Pro Thr His Ala Val Thr Phe Val Asp Asn His Asp Ser Gln Pro
                325                 330                 335

Gly Glu Ala Leu Glu Ser Phe Val Gln Gln Trp Phe Lys Pro Leu Ala
            340                 345                 350

Tyr Ala Leu Val Leu Thr Arg Glu Gln Gly Tyr Pro Ser Val Phe Tyr
        355                 360                 365

Gly Asp Tyr Tyr Gly Ile Pro Thr His Gly Val Pro Ala Met Lys Ser
    370                 375                 380

Lys Ile Asp Pro Leu Leu Gln Ala Arg Gln Thr Phe Ala Tyr Gly Thr
385                 390                 395                 400

Gln His Asp Tyr Phe Asp His His Asp Ile Ile Gly Trp Thr Arg Glu
                405                 410                 415

Gly Asn Ser Ser His Pro Asn Ser Gly Leu Ala Thr Ile Met Ser Asp
            420                 425                 430

Gly Pro Gly Gly Asn Lys Trp Met Tyr Val Gly Lys Asn Lys Ala Gly
        435                 440                 445

Gln Val Trp Arg Asp Ile Thr Gly Asn Arg Thr Gly Thr Val Thr Ile
    450                 455                 460

Asn Ala Asp Gly Trp Gly Asn Phe Ser Val Asn Gly Gly Ser Val Ser
465                 470                 475                 480

Val Trp Val Lys Gln
                485
```

<210> SEQ ID NO 40
<211> LENGTH: 485
<212> TYPE: PRT
<213> ORGANISM: AA560 Bacillus sp.
<220> FEATURE:
<221> NAME/KEY: mat_peptide
<222> LOCATION: (1)..(485)

<400> SEQUENCE: 40

```
His His Asn Gly Thr Asn Gly Thr Met Met Gln Tyr Phe Glu Trp Tyr
1               5                   10                  15

Leu Pro Asn Asp Gly Asn His Trp Asn Arg Leu Arg Ser Asp Ala Ser
            20                  25                  30

Asn Leu Lys Asp Lys Gly Ile Ser Ala Val Trp Ile Pro Pro Ala Trp
        35                  40                  45

Lys Gly Ala Ser Gln Asn Asp Val Gly Tyr Gly Ala Tyr Asp Leu Tyr
    50                  55                  60

Asp Leu Gly Glu Phe Asn Gln Lys Gly Thr Ile Arg Thr Lys Tyr Gly
65                  70                  75                  80

Thr Arg Asn Gln Leu Gln Ala Ala Val Asn Ala Leu Lys Ser Asn Gly
                85                  90                  95

Ile Gln Val Tyr Gly Asp Val Val Met Asn His Lys Gly Gly Ala Asp
            100                 105                 110

Ala Thr Glu Met Val Arg Ala Val Glu Val Asn Pro Asn Asn Arg Asn
        115                 120                 125

Gln Glu Val Ser Gly Glu Tyr Thr Ile Glu Ala Trp Thr Lys Phe Asp
    130                 135                 140

Phe Pro Gly Arg Gly Asn Thr His Ser Asn Phe Lys Trp Arg Trp Tyr
145                 150                 155                 160

His Phe Asp Gly Val Asp Trp Asp Gln Ser Arg Lys Leu Asn Asn Arg
                165                 170                 175

Ile Tyr Lys Phe Arg Gly Asp Gly Lys Gly Trp Asp Trp Glu Val Asp
            180                 185                 190

Thr Glu Asn Gly Asn Tyr Asp Tyr Leu Met Tyr Ala Asp Ile Asp Met
        195                 200                 205

Asp His Pro Glu Val Val Asn Glu Leu Arg Asn Trp Gly Val Trp Tyr
    210                 215                 220

Thr Asn Thr Leu Gly Leu Asp Gly Phe Arg Ile Asp Ala Val Lys His
225                 230                 235                 240

Ile Lys Tyr Ser Phe Thr Arg Asp Trp Ile Asn His Val Arg Ser Ala
                245                 250                 255

Thr Gly Lys Asn Met Phe Ala Val Ala Glu Phe Trp Lys Asn Asp Leu
            260                 265                 270

Gly Ala Ile Glu Asn Tyr Leu Asn Lys Thr Asn Trp Asn His Ser Val
        275                 280                 285

Phe Asp Val Pro Leu His Tyr Asn Leu Tyr Asn Ala Ser Lys Ser Gly
    290                 295                 300

Gly Asn Tyr Asp Met Arg Gln Ile Phe Asn Gly Thr Val Val Gln Arg
305                 310                 315                 320

His Pro Met His Ala Val Thr Phe Val Asp Asn His Asp Ser Gln Pro
                325                 330                 335

Glu Glu Ala Leu Glu Ser Phe Val Glu Glu Trp Phe Lys Pro Leu Ala
            340                 345                 350

Tyr Ala Leu Thr Leu Thr Arg Glu Gln Gly Tyr Pro Ser Val Phe Tyr
        355                 360                 365
```

-continued

```
Gly Asp Tyr Tyr Gly Ile Pro Thr His Gly Val Pro Ala Met Lys Ser
    370                 375                 380

Lys Ile Asp Pro Ile Leu Glu Ala Arg Gln Lys Tyr Ala Tyr Gly Arg
385                 390                 395                 400

Gln Asn Asp Tyr Leu Asp His His Asn Ile Ile Gly Trp Thr Arg Glu
                405                 410                 415

Gly Asn Thr Ala His Pro Asn Ser Gly Leu Ala Thr Ile Met Ser Asp
            420                 425                 430

Gly Ala Gly Gly Asn Lys Trp Met Phe Val Gly Arg Asn Lys Ala Gly
        435                 440                 445

Gln Val Trp Thr Asp Ile Thr Gly Asn Arg Ala Gly Thr Val Thr Ile
    450                 455                 460

Asn Ala Asp Gly Trp Gly Asn Phe Ser Val Asn Gly Gly Ser Val Ser
465                 470                 475                 480

Ile Trp Val Asn Lys
                485

<210> SEQ ID NO 41
<211> LENGTH: 481
<212> TYPE: PRT
<213> ORGANISM: LE429 B. lich. variant
<220> FEATURE:
<221> NAME/KEY: mat_peptide
<222> LOCATION: (1)..(481)

<400> SEQUENCE: 41

Val Asn Gly Thr Leu Met Gln Tyr Phe Glu Trp Tyr Thr Pro Asn Asp
1               5                   10                  15

Gly Gln His Trp Lys Arg Leu Gln Asn Asp Ala Glu His Leu Ser Asp
            20                  25                  30

Ile Gly Ile Thr Ala Val Trp Ile Pro Pro Ala Tyr Lys Gly Thr Ser
        35                  40                  45

Gln Ala Asp Val Gly Tyr Gly Ala Tyr Asp Leu Tyr Asp Leu Gly Glu
    50                  55                  60

Phe His Gln Lys Gly Thr Val Arg Thr Lys Tyr Gly Thr Lys Gly Glu
65                  70                  75                  80

Leu Gln Ser Ala Ile Lys Ser Leu His Ser Arg Asp Ile Asn Val Tyr
                85                  90                  95

Gly Asp Val Val Ile Asn His Lys Gly Gly Ala Asp Ala Thr Glu Asp
            100                 105                 110

Val Thr Ala Val Glu Val Asp Pro Ala Asp Arg Asn Arg Val Ile Ser
        115                 120                 125

Gly Glu His Leu Ile Lys Ala Trp Thr His Phe His Phe Pro Gly Arg
    130                 135                 140

Gly Ser Thr Tyr Ser Asp Phe Lys Trp Tyr Trp Tyr His Phe Asp Gly
145                 150                 155                 160

Thr Asp Trp Asp Glu Ser Arg Lys Leu Asn Arg Ile Tyr Lys Phe Gln
                165                 170                 175

Gly Lys Thr Trp Asp Trp Glu Val Ser Asn Glu Phe Gly Asn Tyr Asp
            180                 185                 190

Tyr Leu Met Tyr Ala Asp Phe Asp Tyr Asp His Pro Asp Val Val Ala
        195                 200                 205

Glu Ile Lys Arg Trp Gly Thr Trp Tyr Ala Asn Glu Leu Gln Leu Asp
    210                 215                 220

Gly Phe Arg Leu Asp Ala Val Lys His Ile Lys Phe Ser Phe Leu Arg
225                 230                 235                 240
```

Asp Trp Val Asn His Val Arg Glu Lys Thr Gly Lys Glu Met Phe Thr
              245                 250                 255

Val Ala Glu Tyr Trp Ser Asn Asp Leu Gly Ala Leu Glu Asn Tyr Leu
        260                 265                 270

Asn Lys Thr Asn Phe Asn His Ser Val Phe Asp Val Pro Leu His Tyr
            275                 280                 285

Gln Phe His Ala Ala Ser Thr Gln Gly Gly Tyr Asp Met Arg Lys
    290                 295                 300

Leu Leu Asn Gly Thr Val Val Ser Lys His Pro Leu Lys Ser Val Thr
305                 310                 315                 320

Phe Val Asp Asn His Asp Thr Gln Pro Gly Gln Ser Leu Glu Ser Thr
                325                 330                 335

Val Gln Thr Trp Phe Lys Pro Leu Ala Tyr Ala Phe Ile Leu Thr Arg
        340                 345                 350

Glu Ser Gly Tyr Pro Gln Val Phe Tyr Gly Asp Met Tyr Gly Thr Lys
            355                 360                 365

Gly Asp Ser Gln Arg Glu Ile Pro Ala Leu Lys His Lys Ile Glu Pro
    370                 375                 380

Ile Leu Lys Ala Arg Lys Gln Tyr Ala Tyr Gly Ala Gln His Asp Tyr
385                 390                 395                 400

Phe Asp His His Asp Ile Val Gly Trp Thr Arg Glu Gly Asp Ser Ser
                405                 410                 415

Val Ala Asn Ser Gly Leu Ala Ala Leu Ile Thr Asp Gly Pro Gly Gly
        420                 425                 430

Ala Lys Arg Met Tyr Val Gly Arg Gln Asn Ala Gly Glu Thr Trp His
            435                 440                 445

Asp Ile Thr Gly Asn Arg Ser Glu Pro Val Val Ile Asn Ser Glu Gly
    450                 455                 460

Trp Gly Glu Phe His Val Asn Gly Gly Ser Val Ser Ile Tyr Val Gln
465                 470                 475                 480

Arg

<210> SEQ ID NO 42
<211> LENGTH: 417
<212> TYPE: PRT
<213> ORGANISM: Pseudomonas saccharophila
<220> FEATURE:
<221> NAME/KEY: mat_peptide
<222> LOCATION: (1)..(417)

<400> SEQUENCE: 42

Asp Gln Ala Gly Lys Ser Pro Ala Gly Val Arg Tyr His Gly Gly Asp
1               5                   10                  15

Glu Ile Ile Leu Gln Gly Phe His Trp Asn Val Val Arg Glu Ala Pro
            20                  25                  30

Asn Asp Trp Tyr Asn Ile Leu Arg Gln Gln Ala Ser Thr Ile Ala Ala
        35                  40                  45

Asp Gly Phe Ser Ala Ile Trp Met Pro Val Pro Trp Arg Asp Phe Ser
    50                  55                  60

Ser Trp Thr Asp Gly Gly Lys Ser Gly Gly Gly Glu Gly Tyr Phe Trp
65                  70                  75                  80

His Asp Phe Asn Lys Asn Gly Arg Tyr Gly Ser Asp Ala Gln Leu Arg
                85                  90                  95

Gln Ala Ala Gly Ala Leu Gly Gly Ala Gly Val Lys Val Leu Tyr Asp
            100                 105                 110

-continued

```
Val Val Pro Asn His Met Asn Arg Gly Tyr Pro Asp Lys Glu Ile Asn
        115                 120                 125
Leu Pro Ala Gly Gln Gly Phe Trp Arg Asn Asp Cys Ala Asp Pro Gly
    130                 135                 140
Asn Tyr Pro Asn Asp Cys Asp Asp Gly Asp Arg Phe Ile Gly Gly Glu
145                 150                 155                 160
Ser Asp Leu Asn Thr Gly His Pro Gln Ile Tyr Gly Met Phe Arg Asp
                165                 170                 175
Glu Leu Ala Asn Leu Arg Ser Gly Tyr Gly Ala Gly Gly Phe Arg Phe
                180                 185                 190
Asp Phe Val Arg Gly Tyr Ala Pro Glu Arg Val Asp Ser Trp Met Ser
            195                 200                 205
Asp Ser Ala Asp Ser Ser Phe Cys Val Gly Glu Leu Trp Lys Gly Pro
            210                 215                 220
Ser Glu Tyr Pro Ser Trp Asp Trp Arg Asn Thr Ala Ser Trp Gln Gln
225                 230                 235                 240
Ile Ile Lys Asp Trp Ser Asp Arg Ala Lys Cys Pro Val Phe Asp Phe
                245                 250                 255
Ala Leu Lys Glu Arg Met Gln Asn Gly Ser Val Ala Asp Trp Lys His
            260                 265                 270
Gly Leu Asn Gly Asn Pro Asp Pro Arg Trp Arg Glu Val Ala Val Thr
        275                 280                 285
Phe Val Asp Asn His Asp Thr Gly Tyr Ser Pro Gly Gln Asn Gly Gly
    290                 295                 300
Gln His His Trp Ala Leu Gln Asp Gly Leu Ile Arg Gln Ala Tyr Ala
305                 310                 315                 320
Tyr Ile Leu Thr Ser Pro Gly Thr Pro Val Val Tyr Trp Ser His Met
                325                 330                 335
Tyr Asp Trp Gly Tyr Gly Asp Phe Ile Arg Gln Leu Ile Gln Val Arg
            340                 345                 350
Arg Thr Ala Gly Val Arg Ala Asp Ser Ala Ile Ser Phe His Ser Gly
        355                 360                 365
Tyr Ser Gly Leu Val Ala Thr Val Ser Gly Ser Gln Gln Thr Leu Val
    370                 375                 380
Val Ala Leu Asn Ser Asp Leu Ala Asn Pro Gly Gln Val Ala Ser Gly
385                 390                 395                 400
Ser Phe Ser Glu Ala Val Asn Ala Ser Asn Gly Gln Val Arg Val Trp
                405                 410                 415
Arg
```